United States Patent
Dixon et al.

(10) Patent No.: US 11,859,263 B2
(45) Date of Patent: Jan. 2, 2024

(54) PROCESS FOR LEACHING METAL SULFIDES WITH REAGENTS HAVING THIOCARBONYL FUNCTIONAL GROUPS

(71) Applicant: Jetti Resources, LLC, Boulder, CO (US)

(72) Inventors: David Dixon, Delta (CA); Edouard Asselin, Richmond (CA); Zihe Ren, Vancouver (CA); Nelson Mora Huertas, Boulder, CO (US)

(73) Assignee: Jetti Resources, LLC, Boulder, CO (US)

( * ) Notice: Subject to any disclaimer, the term of this patent is extended or adjusted under 35 U.S.C. 154(b) by 954 days.

(21) Appl. No.: 16/342,934

(22) PCT Filed: Oct. 19, 2017

(86) PCT No.: PCT/CA2017/051250
§ 371 (c)(1),
(2) Date: Apr. 17, 2019

(87) PCT Pub. No.: WO2018/072029
PCT Pub. Date: Apr. 26, 2018

(65) Prior Publication Data
US 2020/0048736 A1    Feb. 13, 2020

Related U.S. Application Data

(60) Provisional application No. 62/430,333, filed on Dec. 5, 2016, provisional application No. 62/410,331, filed
(Continued)

(51) Int. Cl.
C22B 3/00 (2006.01)
C01G 3/00 (2006.01)
(Continued)

(52) U.S. Cl.
CPC ............ *C22B 23/043* (2013.01); *C01G 3/003* (2013.01); *C01G 11/003* (2013.01);
(Continued)

(58) Field of Classification Search
CPC ..... C22B 23/043; C22B 3/08; C22B 15/0071; C22B 17/04; C22B 3/20; C22B 3/04;
(Continued)

(56) References Cited

U.S. PATENT DOCUMENTS 2,716,600 A    8/1955  Frick et al.
2,902,345 A    9/1959  Hyde et al.
(Continued)

FOREIGN PATENT DOCUMENTS

BR    112017020592 A2    7/2018
CA         2023119           2/1991
(Continued)

OTHER PUBLICATIONS

Elsayed A. Oraby, Gold Leaching in Thiosulfate Solutions and Its Environmental Effects Compared with Cyanide, Thesis from Curtin University of Technology (2009) (Year: 2009).*
(Continued)

*Primary Examiner* — Brian D Walck
*Assistant Examiner* — Danielle M. Carda
(74) *Attorney, Agent, or Firm* — Deborah A. Peacock; Marco H. Santamaria; Peacock Law P.C.

(57) ABSTRACT

This application pertains to methods of recovering metals from metal sulfides that involve contacting the metal sulfide with an acidic sulfate solution containing ferric sulfate and a reagent that has a thiocarbonyl functional group, wherein the concentration of reagent in the acidic sulfate solution is sufficient to increase the rate of metal ion extraction relative
(Continued)

to an acidic sulfate solution that does not contain the reagent, to produce a pregnant solution containing the metal ions.

71 Claims, 26 Drawing Sheets

Related U.S. Application Data on Oct. 19, 2016, provisional application No. 62/410,348, filed on Oct. 19, 2016, provisional application No. 62/410,351, filed on Oct. 19, 2016.

(51) Int. Cl.
*C01G 11/00* (2006.01)
*C01G 53/00* (2006.01)
*C22B 3/08* (2006.01)
*C22B 15/00* (2006.01)

(52) U.S. Cl.
CPC .............. *C01G 53/003* (2013.01); *C22B 3/08* (2013.01); *C22B 15/0071* (2013.01); *C22B 17/04* (2013.01)

(58) Field of Classification Search
CPC .... C01G 3/003; C01G 11/003; C01G 53/003; C01G 3/10; C01G 49/14; Y02P 10/20
USPC .......................................................... 75/743
See application file for complete search history.

(56) References Cited

U.S. PATENT DOCUMENTS

| | | | |
|---|---|---|---|
| 3,679,397 | A | 7/1972 | O'Connor et al. |
| 3,761,566 | A | 9/1973 | Michal |
| 3,884,831 | A | 5/1975 | Bloom |
| 4,082,833 | A | 4/1978 | Wyndham et al. |
| 4,556,483 | A | 12/1985 | Fu et al. |
| 4,561,947 | A | 12/1985 | Schulze |
| 4,913,730 | A | 4/1990 | Deschenes et al. |
| 5,260,040 | A | 11/1993 | Kenna |
| 5,795,465 | A | 8/1998 | Arbiter |
| 5,989,311 | A | 11/1999 | Han et al. |
| 6,146,444 | A | 11/2000 | Kohr |
| 8,163,063 | B2 | 4/2012 | Manabe |
| 8,287,623 | B2 | 10/2012 | Manabe |
| 8,865,119 | B2 | 10/2014 | Kuwano et al. |
| 9,068,242 | B2 | 6/2015 | Ishida et al. |
| 9,290,827 | B2 | 9/2016 | Hatano et al. |
| 10,344,353 | B2 | 7/2019 | Mujicic et al. |
| 10,745,778 | B2 | 8/2020 | Bender et al. |
| 10,781,502 | B2 | 9/2020 | Dixon et al. |
| 2004/0197249 | A1 | 10/2004 | Wan et al. |
| 2006/0193762 | A1* | 8/2006 | Misra .................. C22B 15/0071 423/42 |
| 2008/0026450 | A1 | 1/2008 | Ohtsuka et al. |
| 2008/0286180 | A1 | 11/2008 | Jones |
| 2010/0021370 | A1 | 1/2010 | Nagaraj et al. |
| 2011/0290657 | A1 | 12/2011 | Lavin et al. |
| 2012/0251417 | A1 | 10/2012 | Yuka et al. |
| 2013/0140186 | A1 | 6/2013 | Lapidus et al. |
| 2013/0333524 | A1 | 12/2013 | Aghemio Rodriguez |
| 2014/0212346 | A1 | 7/2014 | Xia |
| 2016/0145714 | A1 | 5/2016 | Liddell et al. |
| 2016/0298209 | A1* | 10/2016 | Mujicic ..................... C22B 3/06 |
| 2017/0159153 | A1 | 6/2017 | Bender et al. |
| 2017/0335428 | A1 | 11/2017 | Gutiérrez et al. |
| 2018/0135148 | A1 | 5/2018 | Dixon et al. |

FOREIGN PATENT DOCUMENTS

| | | |
|---|---|---|
| CA | 2597937 | 8/2006 |
| CA | 2976958 | 9/2016 |
| CA | 2973612 A1 | 10/2016 |
| CA | 2973612 | 1/2019 |
| CL | 2004000703 | 3/2005 |
| CL | 2007002165 | 2/2008 |
| CL | 2008001423 | 8/2008 |
| CL | 2009000554 | 3/2009 |
| CL | 2016001188 | 2/2017 |
| CL | 2017002632 A1 | 3/2018 |
| CN | 1081471 | 2/1994 |
| CN | 101033508 | 9/2007 |
| CN | 101818258 | 9/2010 |
| CN | 103789546 A | 5/2014 |
| CN | 103993171 | 8/2014 |
| EP | 0536914 A1 | 4/1993 |
| GB | 2180829 | 4/1987 |
| GB | 2349876 | 11/2000 |
| JP | 09131127 | 1/1997 |
| JP | 11506808 | 6/1999 |
| JP | 2010180450 A | 8/2010 |
| JP | 2011161386 A | 8/2011 |
| MX | 2008003249 | 9/2009 |
| SU | 1636463 | 3/1991 |
| WO | WO 9808585 | 3/1998 |
| WO | 9814623 A1 | 4/1998 |
| WO | 03080879 A1 | 10/2003 |
| WO | WO 2004029306 | 4/2004 |
| WO | WO 2004029360 | 4/2004 |
| WO | 2006070052 A1 | 7/2006 |
| WO | WO 2007/042604 | 4/2007 |
| WO | WO 2012/081953 | 6/2012 |
| WO | WO 2015059551 | 9/2015 |
| WO | WO 2016/141438 | 9/2016 |
| WO | WO 2016165027 | 10/2016 |
| WO | WO-2016165027 A1 * 10/2016 ............... C01G 1/00 |

OTHER PUBLICATIONS

"Noble Metals" Encyclopaedia Britannica (Year: 2021).*
Djamal-Eddine Akretche et al. Selective leaching of a polymetallic complex ore by sulphuric acid and thiourea mixed with sea water, Hydrometallurgy 38pg. 189-204 (Year: 1995).*
Castromil, Portugal Resume. Source https://medgoldresources.com (Jan. 13, 2015).
Chen et al., (1980) A Study of the Leaching of Gold and Silver by Acidothioureation, Hydrometallurgy, 5: 207-212.
Deschenes et al., (1988) "Leaching of Gold from a Chalcopyirite Concentrate by Thiourea", Hydrometallurgy 20: 179-202.
Doona and Stanbury (1996) "Equilibrium and Redox Kinetics of Copper(II)-Thiourea Complexs," Inorganic Chemistry 35(11): 3210-3216.
Grgorova and Wright (1986) "Simultaneous determination of thiourea and formamidine disulphide, using reversed-phase high-performance liquid chromatography and a UV detector," Journal of Chromalography 368: 444-449.
Groenewald (1976) "The Dissolution of Gold in Acidic Solutions of Thiourea," Hydrometallurgy, 1: 277-290.
Jansons (1976), "Dithiocarboxylic Acids, Their Esters, and Metal Dithiocarboxylates", Russian Chemical Reviews 45(11):1035-1051.
Li et al., (2002) "Reaction Kinetics for Gold Dissolution in Acid Thiourea Solution using Formamidine as Oxidant", Hydrometallurgy, 63: 215-223.
Mironov and Tsvelodub (1996) "Complexation of Copper(I) by Thiourea in Acidic Aqueous Solution," Journal of Solution Chemistry 25(3) 315-325.
Olvera et al., (2018) "Electrocheical dissolution of chalcopyrite in the presence of thiourea and formamidine disulfide," Hydrometallurgy, 179, 110-117.
Orgul and Atalay (2000) "Gold Extraction from Kaymaz Gold Ore by Thiourea Leaching," Proceedings of the XXI International Mineral Processing Congress, Hydro and Biohydrometallurgy, 13: C6-22-C6-28.
Ren et al., (2020) "Catalytic effect of ethylene thiourea on the leaching of chalcopyrite" Hydrometallurgy, 196 (105410)1-9.
"Thioaldehydes", Wikipedia, accessed online Oct. 16, 2020; https://ru.wikipedia.org/wiki/thioaldehydes; 1 page.

(56) References Cited

OTHER PUBLICATIONS

"Thioketones", Wikipedia, accessed online Oct. 16, 2020;https://ru.wikipedia.org/wiki/thioketones; 3 pages.
Ubaldini et al., (1998) "An innovative thiourea gold leaching process," Hydrometallurgy, 48: 113-124.
Umland et al., (1975) "Complex Compounds in Analytical Chemistry", Moscow, 70-72 English translation.
Umland et al., (1975) "Coordination compounds in analytical chemistry. Theory and practice." Mir, Moscow, 127-128 English translation and Russian.
Wang et al., (2019) "Mineralogy and Pretreatment of a Refractory Gold Deposit in Zambia," Minerals, 9 (406): 1-16.
Yang et al., (2010) "The Interaction of Thiourea and Formamidinee Disulfide in the Dissolution of Gold in Sulfuric Acid Solutions", Minerals Engineering, 23: 698-704.
Cerda, C.P., et al., Effect of Pretreatment on Leaching Primary Copper Sulfide in Acid-Chloride Media. Minerals, 2018. 8(1): p. 1.
Lu, Z.Y., M.I. Jeffrey, and F. Lawson, The effect of chloride ions on the dissolution of chalcopyrite in acidic solutions. Hydrometallurgy, 2000. 56(2): p. 189-202.
Quezada, V., et al., Effect of pretreatment prior to leaching on a chalcopyrite mineral in acid media using NaCl and KNO3. Journal of Materials Research and Technology, 2020. 9(5): p. 10316-10324.
Sequeira, C.A.C., et al., Chemical metathesis of chalcopyrite in acidic solutions. Hydrometallurgy, 2008. 92(3): p. 135-140.
Velásquez-Yévenes, L., M. Nicol, and H. Miki, The dissolution of chalcopyrite in chloride solutions: Part 1. The effect of solution potential. Hydrometallurgy, 2010. 103(1): p. 108-113.
Watling, H.R., Chalcopyrite hydrometallurgy at atmospheric pressure: 2. Review of acidic chloride process options. Hydrometallurgy, 2014. 146: p. 96-110.
Wilson, J.P. and W.W. Fisher, Cupric Chloride Leaching of Chalcopyrite. JOM, 1981. 33(2): p. 52-57.
Winand, R., Chloride hydrometallurgy. Hydrometallurgy, 1991. 27(3): p. 285-316.
Bombicz et al., (2004) "Synthesis, Vibrational Spectra and X-Ray Structures of Copper(I) Thiourea Complexes", Inorganica Chimica Acta 357:513-525.
Bowmaker et al., (2009) "Crystal Structures and Vibrational Spectroscopy of Copper(I) Thiourea Complexes", Inorg. Chem., 48, 350-368.
Piro et al., (2002) "Two Thiourea-Containing Gold(I) Complexes", Acta Cryst., C58, m252-m255.
Armstrong et al., (2000) "Cross-Referenced Combinatorial Libraries for the Discovery of Metal-Complexing Ligands: Library Deconvolution by LC-MS", Analyst 125: 2206-2215.
Whitehead et al., (2007) "Application of 1-alkyl-3methyl-imidazolium Ionic Liquids in the Oxidative Leaching of Sulphidic Copper, Gold and Silver Ores", Hydrometallurgy 88(1-4):109-120.
Winand (1991) "Chloride hydrometallurgy," Hydrometallurgy 27, 285-316.
Zhu et al. (1992) "The redox reaction between thiourea and ferric iron and catalysis of sulphide ores," Hydrometallurgy, 28, 381-397.
Ando et al.; (1991) The First Stable Enethiolizable Thioaldehyde via a Zirconocene q2-Thioacyl Complex, J. Am. Chem. Soc. 113, 7782-7784.
Okazaki et al.; (1982) "Synthesis of 2,4,6-Tri-t-butyl t h io benzaldehyde, the Fi rst Stable Thiobenzaldehyde," J. Chem. Soc. Chem. Commun. 1187-1188.
Bouffard et al., (2009) "Use of Lignosulfonate for Elemental Sulfur Biooxidation and Copper Leaching", Minerals Engineering, vol. 22, p. 100-103.
Castineiras et al., 1988 "Thione Complexes of Group IIB Dihalides. X-Ray Crystal Structure of Cd(ETTC)212", Polyhedron, vol. 7, No. 24, p. 2503-2508.
Dixon et al., (2011) "Mathematical Modeling of Heap Leaching Under Drip Irrigation, The Southern African Institute of Mining and Metallurgy Percolation Leaching: The status globally and in southern Africa," p. 1-29.
Duncan et al., (1964) "Leaching of Chalcopyrite with Thiobacillus Ferrooxidans: Effect of Surfactants and Shaking", Applied Microbiology, vol. 12, No. 2, p. 122-126.
Fiscor (2021) "Pinto Valley's Optimization Program Pays Big Dividends," Arizona Mining, AZ4-AZ8.
Garcia & Druschel (2014) "Elemental Sulfur Coarsening Kinetics", Geochemical Transactions, vol. 15, No. 11, 11 pages.
Ghadiri et al., (2019) "Effect of Surfactant on the Growth and Activity of Microorganisms in a Heap Bioleaching System", Minerals Engineering, vol. 138, p. 43-51.
Ghahremaninezhad et al., (2010) "Electrochemical Evaluation of the Surface of Chalcopyrite during Dissolution in Sulfuric Acid Solution", Electrochimica Acta, vol. 55, p. 5041-5056.
Hackl et al., (1995) "Passivation of Chalcopyrite During Oxidative Leaching in Sulfate Media", Hydrometallurgy, vol. 39, p. 25-48.
Hiroyoshi et al., (1999) "Effects of Several Inhibitors to Thiobacillus Ferrooxidans on Ferrous Promoted Chalcopyrite Leaching, Shigen-to-Sozai", vol. 115, p. 172-176.
Itakura et al., (2005) "Branching Mechanism of Intergranular Crack Propagation in Three Dimensions", Physical Review E, vol. 71, p. 055102-1-4.
Kingma et al., (1979) "Autotrophic Growth of Thiobacillus acidophilus in the Presence of a Surface-Active Agent, Tween 80", Applied and Environmental Microbiology, vol. 38, No. 5, p. 795-799.
Krishnamoorthy et al., (2019) "Adsorption Modeling of Catalyzed Heap Leaching", Second Canada-China Nonferrous Metallurgy Forum, Poster abstract.
Krishnamoorthy et al., (2019) "Modeling Solute Distribution in a Column", Second Canada-China Nonferrous Metallurgy Forum, Poster.
Leonida (2021) "Disruptive Metallurgy for Cleaner, Greener Battery Metals," Engineering & Mining Journal, p. 34-39.
Montero et al., (1994) "A Solute Transport Model for the Acid Leaching of Copper in Soil Columns", Soil Sci. Soc. Am. J., vol. 58, p. 678-686.
Okazaki et al., (1982) "Synthesis of 2,4,6-Tri-t-butylthiobenzaldehyde, the First Stable Thiobenzaldehyde," J. Chem. Soc., Chem. Commun., vol. 105, p. 1187-1188.
Okazaki et al., (1987) "First Isolation of a Stable Aliphatic Thioaldehyde, Tris(trimethlsilyl)ethanethial", J. Am. Chem. Soc., vol. 109, p. 279-280.
Olvera et al., (2018) "Electrochemical Dissolution of Chalcopyrite in the Presence of Thiourea and Formamidine Disulfide," Hydrometallurgy, 179, 110-117.
Peng et al., (2012) "Effect of Surfactant Tween-80 on Sulfur Oxidation and Expression of Sulfur Metabolism Relevant Genes of Acidithiobacillus Ferrooxidans", Transactions of Nonferrous Metals Society of China, vol. 22, p. 3147-3155.
Reguly (2021) "New Technologies Speed Low-Carbon Future", The Globe and Mail, p. B8.
Ren et al., (2019) "Depassivation of Chalcopyrite with Jetti Catalyst", Second Canada-China Nonferrous Metallurgy Forum, Poster.
Sand (1985) "The Influence of Four Detergents on the Substrate Oxidation by Thiobacillus Ferrooxidans", Environmental Technology Letters, vol. 6, p. 439-444.
Sandoval et al., (1990) "Effect of Nonionic Surfactants on Chalcopyrite Leaching Under Dump Chemical Conditions", Report of Investigations, Bureau of Mines, 18 pages.
Selim et al., (2001) "Modeling Nonlinear Kinetic Behavior of Copper Adsorption-Desorption in Soil in Physical and Chemical Processes of Water and Solute Transport/Retention in Soil", SSA Special Publication No. 56, 555A, Madison, WI, p. 189-212.
Torma & Gabra (1976) "Effects of Surface Active Agents on the Oxidation of Chalcopyrite by Thiobacillus Ferrooxidans", Hydrometallurgy, vol. 1, p. 301-309.
Vedejs et al., (1983) "2,2-Dimethylpropanethial: A Long-Lived Aliphatic Thioaldehyde", J. Am. Chem. Soc., p. 1683-1684.
Yanez et al., (2019) "Heap Leaching Improvements Using a New Leaching Aid Reagent", 11th International Seminar on Process Hydrometallurgy, Jun. 19, 2019-Jun. 21, 2019, Santiago, Chile, 8 pages.

(56) References Cited

OTHER PUBLICATIONS

Yang et al., (2013) "A Copper and Iron k-edge XANES Study on Chalcopyrite Leached by Mesophiles and Moderate Thermophiles", Minerals Engineering, vol. 48, p. 31-35.

Zhang et al., (2016) "Effects of Triton X-100 on Oxidative Activity of Acidithiobacillus Ferrooxidans and on Chalcopyrite Bioleaching", Journal of Northeastern University (Natural Science), vol. 37, No. 6, p. 861-864.

Zhang et al., (2016) "Catalytic Effect of Polyethylene Glycol on Sulfur Oxidation in Chalcopyrite Bioleaching by Acidithiobacillus Ferrooxidans", Minerals Engineering, vol. 95, p. 74-78.

Zhang et al., (2019) "Enhancing the Leaching of Chalcopyrite Using Acidithiobacillus ferrooxidans under the Induction of Surfactant Triton X-100", Minerals, vol. 1, No. 11, p. 1-15.

Garcia, et al., "Growth of Thiobacillus Ferrooxidens on Solid Medium: Effects of Some Surface Active Agents on Colony Formation", J. Gen. Appl. Microbiol., vol. 38, 1992, 279-282.

Hiroyoshi, et al., "Enhancement in Bacterial Leaching of Chalcopyrite by Polyoxyethylene Sorbitan Monolaurate Addition", Shigen-to-Sozi, vol. 111, 1995.

Xing, et al., "A Review on the Recovery of Noble Metals from Anode Slimes", Mineral Processing and Extractive Metallurgy Review, 2019, 1-14.

\* cited by examiner

PROCESS FOR LEACHING METAL SULFIDES WITH REAGENTS HAVING THIOCARBONYL FUNCTIONAL GROUPS

This application claims priority to U.S. patent application Nos. 62/410,331, 62/410,348, and 62/410,351, filed Oct. 19, 2016; and U.S. patent application No. 62/430,333, filed Dec. 5, 2016. The contents of each of these applications is incorporated herein by reference.

BACKGROUND

1. Field of the Disclosure

This disclosure pertains to methods for leaching metals from metal sulfide-containing ores. More particularly it pertains to a hydrometallurgical process for the extraction of base metals from base metal sulfide-containing ores using reagents having a thiocarbonyl functional group. This disclosure further pertains to recovery of reagents having a thiocarbonyl functional group from a pregnant leach solution for recirculation to a hydrometallurgical process for the extraction of base metals from base metal sulfide-containing ores using such reagents. This disclosure yet further pertains to methods for recovering catalysts from spent leaching materials and, in particular, to recovery of reagents having a thiocarbonyl functional group from spent leach materials containing base metal sulfides from which the base metal has been leached.

2. Description of Related Art

Aqueous processing of minerals presents several advantages over pyrometallurgical approaches, particularly when dealing with complex and/or low-grade ores. The main disadvantage of hydrometallurgical processes, when applied to several metal sulfide ores, is the low extraction rates that are observed. It is desirable to develop a process where high metal extractions can be achieved in time scales that are of industrial interest.

Chalcopyrite, for example, is a semiconductor, and therefore corrodes electrochemically in oxidizing solutions. In ferric sulfate media, the overall leaching reaction is as follows:

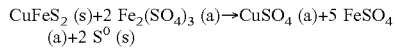
$$CuFeS_2 \text{ (s)} + 2 Fe_2(SO_4)_3 \text{ (a)} \rightarrow CuSO_4 \text{ (a)} + 5 FeSO_4 \text{ (a)} + 2 S^0 \text{ (s)}$$

This reaction may be represented as a combination of anodic and cathodic half-cell reactions:

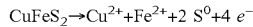
$CuFeS_2 \rightarrow Cu^{2+} + Fe^{2+} + 2 S^0 + 4 e^-$  Anodic half-cell reaction:

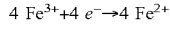
$4 Fe^{3+} + 4 e^- \rightarrow 4 Fe^{2+}$  Cathodic half-cell reaction:

A fundamental problem with chalcopyrite oxidation is that chalcopyrite mineral surfaces become resistant to electrochemical breakdown at solution potentials above a certain level (generally considered to be about 550 to 600 mV vs Ag/AgCl). It is widely held that this results from the formation of some sort of passivating film on the mineral surface that most likely consists of an altered, partially Fe-depleted form of chalcopyrite. It is desirable to provide leaching processes in which such passivation is reduced or avoided.

Some work has been done in extractive hydrometallurgy to recover precious metals such as gold and silver from copper concentrates or chalcopyrite residues after copper extraction. Deschênes and Ghali (Hydrometallurgy 20:129-202) demonstrated the potential application of thiourea in acidic sulfate leaching of sulfide concentrates, such as those containing chalcopyrite, to selectively recover gold and silver. Thiourea is an organosulfur compound having a thiocarbonyl functional group. However, thiourea did not appear to have an effect on the recovery of copper from copper sulfides.

Leaching of metals in the presence of halogens has also been investigated extensively over the past several decades. Use of chloride at elevated temperature can result in high recoveries of copper (Winand, Hydrometallurgy, 27: 285-316) from chalcopyrite. Chloride leaching at room temperature has also been demonstrated to be effective, thus rendering it suitable for heap leaching (WO2015059551). Bromide leaching has mostly been investigated for gold (Li et al. Proceedings of the 3rd Pan American Materials Congress, 2017: 653-660). However, several technologies also demonstrate its beneficial effect in copper extraction from sulfide ores (U.S. Pat. Nos. 5,989,311, 9,290,827). Iodide leaching has also been proven effective under various conditions (U.S. Pat. Nos. 5,989,311, 8,163,063, 8,287,623, and 8,865,119).

SUMMARY

This disclosure relates, at least in part, to the unexpected discovery that several reagents comprising a thiocarbonyl function group (e.g. thiourea) can be used to facilitate the leaching of metal from several metal sulfides (e.g. copper from chalcopyrite) with acidic leach solutions, for example an acidic sulfate leach solution or a halide leach solution. When added in small amounts, such reagents may increase the rate of metal leaching over that observed in its absence.

This disclosure relates to a method of recovering at least one metal from at least one metal sulfide in an ore, the method comprising: contacting the ore with an acidic sulfate solution containing ferric sulfate and a reagent having a thiocarbonyl functional group to produce a pregnant solution containing metal ions; and recovering the at least one metal from the pregnant solution, wherein the at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure relates to a method of recovering at least one metal from at least one metal sulfide in a concentrate, the method comprising: contacting the concentrate with an acidic sulfate solution containing a reagent having a thiocarbonyl functional group to produce a pregnant solution containing metal ions; and recovering the at least one metal from the pregnant solution, wherein the at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure relates to a method of recovering at least one metal from at least one metal sulfide in a material, the method comprising: contacting the material with an acidic sulfate solution containing a reagent having a thiocarbonyl functional group to produce a pregnant solution containing metal ions; and recovering the at least one metal from the pregnant solution, wherein the at least one metal includes:

copper, wherein the at least one metal sulfide includes chalcopyrite, covellite, bornite, enargite, a copper sulfide of the formula $Cu_xS_y$, wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

The concentrate, ore, or other material may be provided as coarse particles. The coarse particles may be agglomerated particles.

In the methods described above, the concentration of the reagent in the acidic sulfate solution may be in the range of about 0.2 mM to 100 mM, about 0.2 mM to about 20 mM, about 0.2 mM to about 10 mM, about 0.2 mM to about 5 mM, about 0.2 mM to about 4 mM, about 0.2 mM to about 3 mM, about 0.2 mM to about 2 mM, about 0.2 mM to about 1.5 mM, about 0.2 mM to about 1.0 mM, or about 0.2 mM to about 0.5 mM.

Where the metal is a copper sulfide of the formula $Cu_xS_y$, wherein the x:y ratio is between 1 and 2, the copper sulfide may includes chalcocite, djurleite, digenite, or a combination thereof.

In the methods described above, the reagent may be thiourea (Tu), ethylene thiourea (Etu), thioacetamide (TA), sodium-dimethyldithiocarbamate (SDDC), ethylene trithiocarbonate (ETC), thiosemicarbazide (TSCA), or a combination thereof.

This disclosure yet further relates to a method of recovering at least one metal from at least one metal sulfide in an ore, the method comprising: contacting the ore with an acidic sulfate solution comprising ferric sulfate and formamidine disulfide (FDS) to produce a pregnant solution containing metal ions; and recovering the metal from the pregnant solution, wherein the at least one metal includes: copper, wherein the at least one metal sulfide includes chalcopyrite, covellite, bornite, enargite, a copper sulfide of the formula $Cu_xS_y$, wherein the x:y ratio is between 1 and 2, or a combination thereof, cadmium, wherein the at least one metal sulfide is greenockite; nickel, wherein the at least one metal sulfide is pentlandite, violarite, or a combination thereof; or a combination thereof.

This disclosure yet further relates to a method of recovering at least one metal from at least one metal sulfide in a concentrate, the method comprising: contacting the concentrate with an acidic sulfate solution comprising ferric sulfate and formamidine disulfide (FDS) to produce a pregnant solution containing the metal ions; and recovering the metal from the pregnant solution, wherein the at least one metal includes: copper, wherein the at least one metal sulfide includes chalcopyrite, covellite, bornite, enargite, a copper sulfide of the formula $Cu_xS_y$, wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure yet further relates to a method of recovering at least one metal from at least one metal sulfide in a material, the method comprising: contacting the material with an acidic sulfate solution comprising ferric sulfate and formamidine disulfide (FDS) to produce a pregnant solution containing the metal ions; and recovering the metal from the pregnant solution, wherein the at least one metal includes: copper, wherein the at least one metal sulfide includes chalcopyrite, covellite, bornite, enargite, a copper sulfide of the formula $Cu_xS_y$, wherein the x:y ratio is between 1 and 2, or a combination thereof; cadmium, wherein the at least one metal sulfide is pentlandite, violarite, or a combination thereof; or a combination thereof.

The concentrate, ore, or other material may be provided as coarse particles. The coarse particles may be agglomerated particles.

The concentration of FDS in the acidic sulfate solution may be in the range of about 0.1 mM to 50 mM, about 0.1 mM to about 15 mM, about 0.1 mM to about 10 mM, about 0.2 mM to about 5 mM, about 0.1 mM to about 2.5 mM, about 0.1 mM to about 2 mM, about 0.1 mM to about 1.5 mM, about 0.1 mM to about 1.0 mM, about 0.1 mM to about 0.5 mM, or about 0.1 mM to about 0.25 mM. Where the metal is a copper sulfide of the formula $Cu_xS_y$, wherein the x:y ratio is between 1 and 2, the copper sulfide may includes chalcocite, djurleite, digenite, or a combination thereof.

The concentration of FDS in the acidic sulfate solution may be sufficient to provide sufficient thiourea to increase the rate of the metal ion extraction relative to an acidic sulfate solution that does not contain the reagent to produce the pregnant leach solution containing the metal ions In the methods described above, wherein the ore may be provided as coarse particles, which may be agglomerated particles. Ferric ions may be used to oxidize the metal sulfide. In the methods described above, the ferric ions may be generated at least in part by bacteria.

The methods may involve a percolation leach. The percolation leach may be a heap leach. The percolation leach may be a vat leach. The leach may be a tank leach.

Recovering metal from the pregnant leach solution may include solvent extraction and electrowinning.

In the methods described above, the acidic sulfate solution may comprise halide ions. The halide ions comprise chloride ions, bromide ions, iodide ions, or a combination thereof. The concentration of chloride in the acidic sulfate solution may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the acidic sulfate solution may be about 300 ppm or less, about 100 ppm or less, or in a range of about 100 ppm to about 300 ppm. The concentration of bromide in the acidic sulfate solution may be about 10 g/L or less, about 30 g/L or less, or in a range of about 10 g/L to about 30 g/L.

This disclosure yet further relates to use of a reagent having a thiocarbonyl functional group for extracting at least one base metal from at least one base metal sulfide in a material. The reagent may be, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or combinations thereof. The concentration of the reagent may be in the range of about 0.2 mM to 100 mM, or in the range of about 0.2 mM to about 30 mM.

This disclosure yet further relates to use of formamidine disulfide (FDS) for extracting at least one base metal from at least one base metal sulfide in a material.

The FDS may be at a concentration in the range of about 0.1 mM to 50 mM, or in the range of about 0.1 mM to about 15 mM.

In the uses described above, the at least one base metal may include include copper, cadmium, nickel, or a combination thereof. The at least one base metal may comprise: copper, wherein the at least one base metal sulfide is chalcopyrite, covellite, bornite, enargite, a copper sulfide of the formula $Cu_xS_y$, wherein the x:y ratio is between 1 and 2, or a combination thereof; cadmium, wherein the at least one base metal sulfide is greenockite; nickel, wherein the at least one base metal sulfide is pentlandite, violarite, or a combination thereof; or a combination thereof.

The material may be an ore or a concentrate.

Such use may be made in the presence of presence halide ions. The halide ions may include chloride ions, bromide ions, iodide ions, or a combination thereof. The concentration of chloride in the acidic sulfate solution may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the acidic sulfate solution may be about 300 ppm or less, about 100 ppm or less, or in a range of about 100 ppm to about 300 ppm. The concentration of bromide in the acidic sulfate solution may be about 10 g/L or less, about 30 g/L or less, or in a range of about 10 g/L to about 30 g/L.

This disclosure yet further relates to a method of recovering a reagent having a thiocarbonyl functional group from a aqueous pregnant leach solution (PLS), wherein the aqueous PLS comprises the reagent and base metal ions, wherein a portion of the reagent is complexed with based metal ions, the method comprising: mixing the PLS with an organic solvent containing a base metal ion extractant to form a mixture; extracting the base metal ions from the PLS into the organic solvent; and separating the mixture into a base metal ion-depleted raffinate comprising the reagent and a base metal ion-enriched organic phase comprising the organic solvent and base metal ions. Extracting the base metal ions from the PLS into the organic solvent may comprise de-complexing reagent from base metal ions to increase the amount of free reagent in the raffinate compared to the PLS. The reagent may be thiourea (Tu), ethylene thiourea (ETu), thioacetamide (TA), sodium-dimethyldithiocarbamate (SDDC), ethylene trithiocarbonate (ETC), thiosemicarbazide (TSCA), or a combination thereof. The raffinate may further comprise formamidine disulfide (FDS), in which case the method may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

This disclosure yet further relates to a method of recovering FDS from a aqueous pregnant leach solution (PLS), wherein the aqueous PLS comprises the reagent and base metal ions, the method comprising: mixing the PLS with an organic solvent containing a base metal ion extractant to form a mixture; extracting the base metal ions from the PLS into the organic solvent; and separating the mixture into a base metal ion-depleted raffinate comprising FDS and a base metal ion-enriched organic phase comprising the organic solvent and base metal ions.

The base metal ions may include cadmium, nickel, copper, or a combination thereof.

The organic solvent may be an aliphatic solvent, an aromatic solvent, or a combination thereof. The organic solvent may be kerosene, alkyl aromatics, cyclo-paraffins, or a combination thereof.

The base metal ion extractant may be an aldoxime, a ketoxime, or a combination thereof. The base metal ion extract may further comprise an ester modifier, an alkylphenol modifier, or a combination thereof.

The PLS may further comprise Tu complexed to base metal ions, and extracting the base metal ions from the PLS comprises de-complexing Tu from base metal ions to increase the amount of free Tu in the raffinate compared to the PLS.

This disclosure yet further relates a method of recovering at least one base metal from at least one base metal sulfide in a material containing the at least one base metal sulfide, the method comprising: contacting the material with a lixiviant, wherein the lixiviant comprises an acidic sulfate solution containing ferric sulfate and a reagent having a thiocarbonyl functional group, to extract base metal ions from the at least one base metal sulfide to produce a pregnant leach solution (PLS); mixing the PLS with an organic solvent containing a base metal ion extractant to form a mixture; extracting base metal ions from the PLS into the organic solvent; and separating the mixture into a base metal ion-depleted raffinate comprising the reagent and a base metal ion-enriched organic phase comprising the organic solvent and base metal ions.

Extracting the base metal ions from the PLS into the organic solvent comprises de-complexing reagent from base metal ions to increase the amount of free reagent in the raffinate compared to the PLS. The reagent may be, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or combinations thereof. Where the reagent comprises Tu, the raffinate may further comprise formamidine disulfide (FDS), wherein the method further comprises contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

This disclosure yet further relates a method of recovering at least one base metal from at least one base metal sulfide in a material containing the at least one base metal sulfide, the method comprising: contacting the material with a lixiviant, wherein the lixiviant comprises an acidic sulfate solution containing ferric sulfate and formamidine disulfide (FDS), to extract base metal ions from the at least one base metal sulfide to produce a pregnant leach solution (PLS); mixing the PLS with an organic solvent containing a base metal ion extractant to form a mixture; extracting base metal ions from the PLS into the organic solvent; and separating the mixture into a base metal ion-depleted raffinate comprising the reagent and a base metal ion-enriched organic phase comprising the organic solvent and base metal ions. The PLS may further comprise thiourea (Tu) complexed to base metal ions, wherein the method further comprises extracting the base metal ions from the PLS comprises de-complexing Tu from base metal ions to increase the amount of free Tu in the raffinate compared to the PLS. The method may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The lixiviant and/or the PLS may comprise halide ions. The halide ions may include chloride ions, bromide ions, iodide ions, or a combination thereof. The concentration of chloride in the lixiviant or PLS may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the lixiviant or PLS may be about 300 ppm or less, about 100 ppm or less, or in a range of about 100 ppm to about 300 ppm. The concentration of bromide in the lixiviant or PLS may be about 10 g/L or less, about 30 g/L or less, or in a range of about 10 g/L to about 30 g/L.

The methods may further comprise recirculating a portion of the raffinate comprising the reagent having a thiocarbonyl functional group to the lixiviant. The lixiviant comprising the portion of the raffinate that is recirculated from solvent extraction may be supplemented with fresh reagent having a thiocarbonyl functional group to obtain desired concentration of reagent having a thiocarbonyl functional group in the lixiviant.

This disclosure yet further relates a method of recovering a reagent comprising a thiocarbonyl functional group sequestered in leach materials comprising at least one base metal sulfide, the method comprising rinsing the leach materials with a wash solution comprising base metal ions to produce a pregnant wash solution (PWS) comprising the reagent. The method may further comprise: mixing the PWS with an organic solvent containing a base metal ion extractant to form a mixture; extracting the base metal ions from the PWS into the organic solvent; and separating the mixture into a base metal ion-depleted solution comprising the reagent and a base metal ion-enriched solution comprising the organic solvent and base metal ions. Extracting the base metal ions from the PWS into the organic solvent comprises de-complexing reagent from base metal ions to increase the amount of free reagent in the base metal ion-depleted solution compared to the PWS. The organic solvent may include an aliphatic solvent, an aromatic solvent, or a combination thereof. The organic solvent may comprise kerosene, alkyl aromatics, cyclo-paraffins, or a combination thereof. The reagent may include, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or a combination thereof. Where the reagent comprises Tu, the base metal ion-depleted solution further comprises FDS, wherein the method may further comprise contacting the base metal ion-depleted solution with a reducing agent to reduce FDS to Tu. Contacting the base metal ion-depleted solution with a reducing agent to reduce FDS to Tu comprises reducing FDS to obtain a ratio of Tu:FDS in the range of about 0.5:1 to about 9:1. The reducing agent may be $H_2S$, $SO_2$, or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The concentration of base metal ions in the wash solution may be at least 100 ppm, at least 400 ppm, or at least 1000 ppm.

The method may further include, prior to rinsing the leach materials with the wash solution, rinsing the leach materials with an acidic solution. The acidic solution may have a pH of about 1.8.

The disclosure further relates to a method of recovering at least one base metal from a material containing at least one base metal sulfide, the method comprising: recovering a reagent comprising a thiocarbonyl functional group sequestered in leach materials comprising at least one base metal sulfide according to a method as described above; mixing the recovered agent with an acidic sulfate solution containing ferric sulfate to form a lixiviant; contacting the material with the lixiviant to extract base metal ions from the at least one base metal sulfide to produce a pregnant leach solution (PLS) comprising base metal ions. The the acidic sulfate solution, prior to mixing with the recovered agent, may comprise a pre-existing reagent comprising a thiocarbonyl function group, pre-existing FDS, or a combination thereof. The pre-existing reagent is thiourea (Tu), thioacetamide (TA), sodium-dimethyldithiocarbamate (SDDC), ethylene trithiocarbonate (ETC), thiosemicarbazide (TSCA), or a combination thereof. The method may further comprising: mixing the PLS with an organic solvent containing a base metal ion extractant to form a mixture; extracting base metal ions from the PLS into the organic solvent, and separating the mixture into a base metal ion-depleted raffinate comprising the reagent and a base metal ion-enriched solution comprising the organic solvent and base metal ions. Extracting the base metal ions from the PLS into the organic solvent comprises de-complexing reagent from base metal ions to increase the amount of free reagent in the raffinate compared to the PLS. Where the the reagent is Tu, the raffinate may further comprise FDS, wherein the method further may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent is $H_2S$, $SO_2$ or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The lixiviant and/or the PLS may comprise halide ions. The halide ions may include chloride ions, bromide ions, iodide ions, or a combination thereof. The concentration of chloride in the lixiviant or PLS may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the lixiviant or PLS may be about 300 ppm or less, about 100 ppm or less, or in a range of about 100 ppm to about 300 ppm. The concentration of bromide in the lixiviant or PLS may be about 10 g/L or less, about 30 g/L or less, or in a range of about 10 g/L to about 30 g/L.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
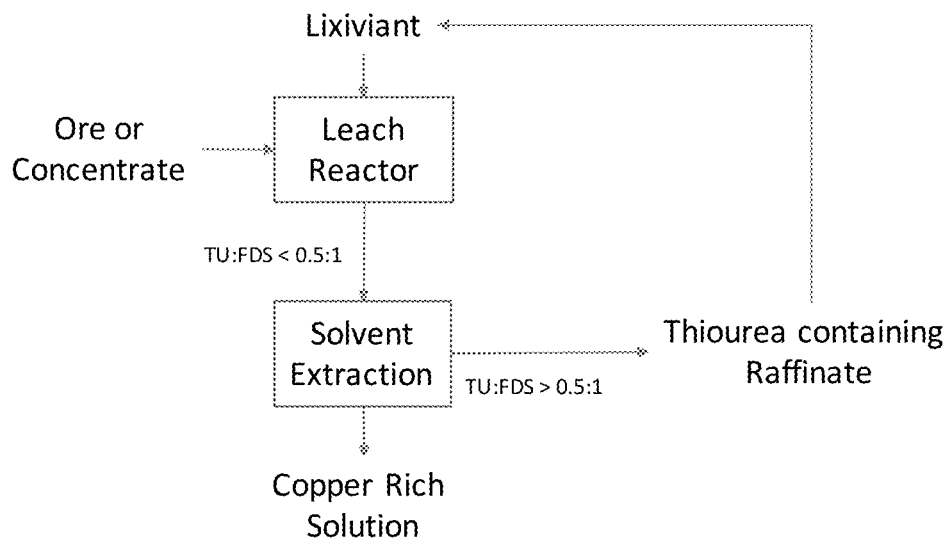
FIG. 1 is a flow diagram of the recovery of a leach process according to embodiments of the invention.
Figure 2:
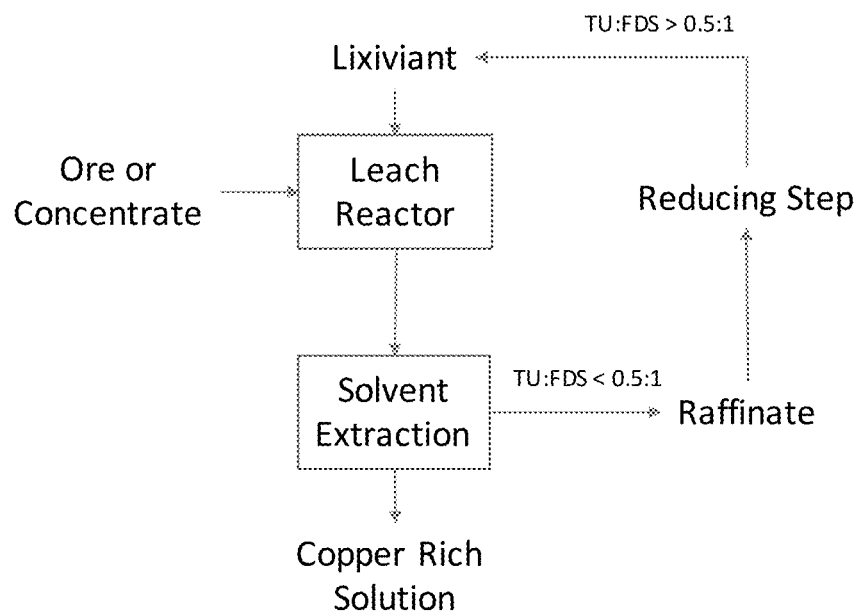
FIG. 2 is a flow diagram of the recovery of a leach process according to embodiments of the invention that involves a reducing step prior to recirculation of the raffinate to the lixiviant.

This disclosure relates to methods of recovering base metals from base metal sulfide minerals, and relates in particular to the unexpected discovery that various reagents having a thiocarbonyl functional group, e.g. thiourea ("Tu", also known as thiocarbamide), can be used to facilitate the leaching of base metals from base metal sulfides in various minerals with acidic sulfate leach solutions, even in the presence of halide species. Such reagents can increase the rate of metal sulfide leaching.

Further aspects of this disclosure relate to the recovery of reagents having a thiocarbonyl functional group from the pregnant leach solution ("PLS") for recirculation to the leach solution (i.e. the lixiviant). Such recirculation may provide an advantage of reducing the amount of fresh reagent that must be added to the lixiviant over time.

The skilled person will understand that an equilibrium exists between Tu and formamidine disulfide (FDS) in solution. The equilibrium between FDS and Tu in solution can be described by the following equation:

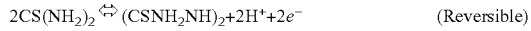      (Reversible)

      (Reversible)

Tu provides a stronger effect on enhancing leaching of base metals from materials containing base metal sulfides. For example, copper leaches more quickly from sulfide ores/concentrates in the presence of TU than FDS or the TU-Cu complex. Therefore the leaching process will be enhanced by the recirculation of a solution with higher free TU to the leach. Accordingly, more particular aspects of this disclosure relate to the addition of a reducing agent to raffinate comprising Tu (Tu) and formamidine disulfide (FDS) to bias the equilibrium in favor of Tu prior to recirculation to the leach solution.

This disclosure also pertains to methods for recovering catalysts from spent leaching materials. More particularly it pertains to recovery of reagents having a thiocarbonyl functional group from depleted leach materials containing base metal sulfides from which the base metal has been leached.

"Base metal" as used herein refers to non-ferrous metals excluding precious metals. These may include copper, lead, nickel, and cadmium. These may further include zinc, aluminum, tin, tungsten, molybdenum, cobalt, bismuth, cadmium, titanium, zirconium, antimony, manganese, beryllium, chromium, germanium, vanadium, gallium, hafnium, indium, niobium, rhenium and thallium.

Such methods may be particularly useful in the recovery of metal from low grade ores that do not contain the base metal sulfide mineral in high proportions. The method involves contacting the base metal sulfide mineral with an acidic sulfate solution containing the reagent having a thiocarbonyl functional group.

The skilled person further understands that just because a reagent having a thiocarbonyl functional group may be useful in extracting a base metal from a metal sulfide, or mineral containing such metal sulfide, does not mean that such reagent will be useful in the extraction of the same metal from other metal sulfides comprising the metal.

Minerals

Chalcopyrite ($CuFeS_2$)

The leaching of chalcopyrite is accomplished in acidic ferric sulfate solution according to the following reaction formula:

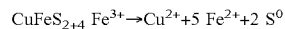

Covellite (CuS)

Leaching of covellite in ferric sulfate solution proceeds according to the following reaction formula:

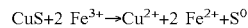

Chalcocite ($Cu_2S$)

Leaching of chalcocite in ferric solution proceeds according to the following formula:

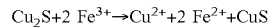

The skilled person understands that that "chalcocite" ores frequently contain a mixture of minerals with the formula $Cu_xS_y$, where the x:y ratio is between 1 and 2. Additional minerals within this formula include digenite and djurleite.

Bornite ($Cu_5FeS_4$)

Bornite is an important copper mineral that usually coexists with chalcopyrite. The leaching process of bornite in ferric solution is described in two stages:

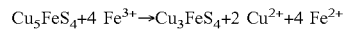

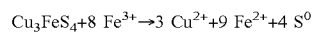

Enargite ($Cu_3AsS_4$)

Unlike the other copper minerals mentioned above (chalcopyrite, covellite, charcocite and bornite), the copper in enargite is mainly Cu(II) instead of Cu(I). The difference in copper's oxidation state will also influence its leaching kinetics under catalyzed conditions. Previous study showed that the leaching of enargite at atmospheric pressure is extremely slow. The dissolution of enargite in ferric sulfate media can take various paths. Two of them are described as follows:

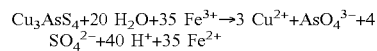

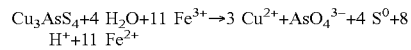

Greenockite (CdS)

Cadmium metal and compounds are mainly used for alloys, coatings, batteries and plastic stabilizers. There are no mines specifically for cadmium extraction. Cadmium sulfide is usually associated with zinc sulfides and is recovered as a byproduct of zinc leaching from roasted sulfide concentrates.

Violarite (FeNi$_5$S$_4$)

Violarite is a nickel (III) sulfide mineral that is usually associated with primary pentlandite nickel sulfide ores.

Reagents

A person skilled in the art will understand that any compound having a thiocarbonyl functional group could be potentially be used in accordance with the technology disclosed herein. The skilled person also understands that reagents having a thiocarbonyl functional group include, but are not limited to Tu, ethylene thiourea (ETu), thioacetamide (TA), sodium-dimethyldithiocarbamate (SDDC), ethylene trithiocarbonate (ETC) and thiosemicarbazide (TSCA).

A non-exhaustive list of additional compounds having a thiocarbonyl functional group is: isothiourea; N—N' substituted thioureas, of which ETu (also known as 2-Thioxoimidazolidine or N,N'-Ethylenethiourea) is an example; 2,5-dithiobiurea; dithiobiuret; Thiosemicarbazide purum, Thiosemicarbazide; Methyl chlorothiolformate; Dithiooxamide; Thioacetamide; 2-Methyl-3-thiosemicarbazide; 4-Methyl-3-thiosemicarbazide; Vinylene trithiocarbonate purum; Vinylene trithiocarbonate; 2-Cyanothioacetamide; Ethylene trithiocarbonate; Potassium ethyl xanthogenate; Dimethylthiocarbamoyl chloride; dimethyldithiocarbamate; S,S'-Dimethyl dithiocarbonate; Dimethyl trithiocarbonate; N,N-Dimethylthioformamide; 4,4-Dimethyl-3-thiosemicarbazide; 4-Ethyl-3-thiosemicarbazide; O-Isopropylxanthic acid; Ethyl thiooxamate; Ethyl dithioacetate; Pyrazine-2-thiocarboxamide; Diethylthiocarbamoyl chloride; diethyldithiocarbamate; Tetramethylthiuram monosulfide; Tetramethylthiuram disulfide; Pentafluorophenyl chlorothionoformate; 4-Fluorophenyl chlorothionoformate; O-Phenyl chlorothionoformate; O-Phenyl chlorothionoformate; Phenyl chlorodithioformate; 3,4-Difluorothiobenzamide; 2-Bromothiobenzamide; 3-Bromothiobenzamide; 4-Bromothiobenzamide; 4-Chlorothiobenzamide; 4-Fluorothiobenzamide; Thiobenzoic acid; Thiobenzamide; 4-Phenylthiosemicarbazide; O-(p-Tolyl) chlorothionoformate; 4-Bromo-2-methylthiobenzamide; 3-Methoxythiobenzamide; 4-Methoxythiobenzamide; 4-Methylbenzenethioamide; Thioacetanilide; Salicylaldehyde thiosemicarbazone; Indole-3-thiocarboxamide; S-(Thiobenzoyl)thioglycolic acid; 3-(Acetoxy)thiobenzamide; 4-(Acetoxy)thiobenzamide; methyl N'-[(e)-(4-chlorophenyl)methylidene]hydrazonothiocarbamate; 3-Ethoxythiobenzamide; 4-Ethylbenzene-1-thiocarboxamide; tert-Butyl 3-[(methylsulfonyl)oxy]-1-azetanecarboxylate; Diethyldithiocarbamic acid; 2-(Phenylcarbonothioylthio)propanoic acid; 2-Hydroxybenzaldehyde N-ethylthiosemicarbazone; (1R,4R)-1,7,7-Trimethylbicyclo[2.2.1]heptane-2-thione; Tetraethylthiuram disulfide; Tetraethylthiuram disulfide; 4'-Hydroxybiphenyl-4-thiocarboxamide; 4-Biphenylthioamide; Dithizone; 4'-Methylbiphenyl-4-thiocarboxamide; tetraisopropylthiuram disulfide; Anthracene-9-thiocarboxamide; Phenanthrene-9-thiocarboxamide; Sodium dibenzyldithiocarbamate; and 4,4'-Bis(dimethylamino)thiobenzophenone. Such agents are ready available from, for example, Sigma Aldrich.

Each of Tu, ETu, TA, SDDC, ETC and TSCA feature a thiocarbonyl functional group having a sulfur that 1) bears a partial negative charge, 2) bears negative electrostatic potential surface, and 3) has an empty $\pi^*$-antibonding orbital as its lowest unoccupied molecular orbital (LUMO). Accordingly, the skilled person may reasonably expect that other reagents, including those additional reagents listed above, that share such criteria and are sufficiently soluble in water may be useful in the performance of the methods disclosed herein (provided that they do not complex with the metal or iron oxidant to form precipitates). It will be within the purview of the skilled person to identify potentially useful reagents and test them to determine efficacy with any particular ore, if any at all.

For example, Tu has a thiocarbonyl functional group with the sulfur bearing a partial charge of −0.371 as calculated using Gaussian 09 software, a negative electrostatic potential around the Sulfur, and $\pi^*$-antibonding orbital as its LUMO. Hence, Tu satisfies all three criteria and has demonstrated catalytic effect.

TA has a similar structure as Tu, but with a CH$_3$ side chain instead of NH$_2$. It has a thiocarbonyl functional group with the sulfur bearing a partial charge of −0.305 as calculated using Gaussian 09 software, which is slightly lower than that for Tu, a negative electrostatic potential around the sulfur, and a $\pi^*$-antibonding orbital as its LUMO. Accordingly, TA also satisfies all three criteria and has demonstrated catalytic effect.

ETC differs from Tu and TA as it does not contain any thioamide group. It has a thiocarbonyl functional group with the two sulfur atoms σ-bonded to carbon as the side chain. The sulfur in the thiocarbonyl group bears a partial charge of −0.122 as calculated using Gaussian 09 software, which is much lower than Tu, a negative electrostatic potential around the Sulfur, and $\pi^*$-antibonding orbital as its LUMO. Accordingly, ETC also satisfies all three criteria and has demonstrated catalytic effect.

In comparison, urea has a carbonyl functional group with a C=O bond instead of C=S. The oxygen in the C=O bond bears a partial charge of −0.634 as calculated using Gaussian 09 software, and a negative electrostatic potential around it, which is very similar to the sulfur atom in Tu. However, its LUMO does not contain $\pi^*$-antibonding. Accordingly, urea is not predicted to have a catalytic effect in metal leaching.

Carbon disulfide (CS$_2$) contains two thiocarbonyl functional groups. Although the sulfur atoms of each functional group contain a $\pi^*$-antibonding orbitals as their LUMO, they bear a partial positive charge of +0.012 as calculated using Gaussian 09 software. Therefore, CS$_2$ is not predicted to have catalytic effect.

Of course, the reagent should also be water soluble. ETC, for example, is only sparingly soluble in water, which may explain why it appears less effective than Tu in leaching copper from chalcopyrite.

Preferentially, the reagent will not form complexes/precipitate with Fe$^{2+}$/Fe$^{3+}$ ions. TSCA, for example, is able to form a red-color complex with Fe$^{3+}$ in solution, which may explain why it is less effective than Tu in leaching copper from chalcopyrite.

The reagent also should not complex/precipitate with target metal ions such as Cu$^+$, Cu$^{2+}$, Cd$^{2+}$, or Ni$^{2+}$. Dithiooxamide forms an insoluble complex with copper ions and therefore cannot be used for the leaching of copper sulfide minerals, whereas TA complexes with Cd$^{2+}$ ions to form an insoluble complex and therefore cannot be used for leaching cadmium sulfide minerals such as greenockite.

Again, the skilled person will appreciate that not all compounds comprising a thiocarbonyl functional group will be useful in increasing the rate of metal extraction from a metal sulfide. Furthermore, the skilled person will appreciate that a reagent that works to increase the rate of extraction of metal from one metal sulfide may not be useful to increase the rate of extraction of a metal from a different metal sulfide. Again, it will be within the purview of the skilled person to identify potentially useful reagents and test them to determine efficacy with any particular ore, concentrate, or other material, if any at all.

Formamidine Disulfide (FDS)

Formamidine disulfide (FDS) is generated by oxidation of Tu. In the presence of an oxidant such as ferric sulfate, Tu will oxidize partially to formamidine disulfide (FDS) according to the following half-cell reaction:

$$2\ SC(NH_2)_2 \rightarrow [(NH_2)_2CS]_2^{2+} + 2\ e^-$$

FDS contains no thiocarbonyl functional group but a sulfur-sulfur sigma bond instead. An equilibrium exists between FDS and Tu in a ferric sulfate solution, such that a leach solution prepared with FDS rather than Tu will provide the Tu necessary for catalysis of the metal sulfide leach. That is, a molecule of FDS will dissociate into two molecules of Tu upon dissolution in the ferric sulfate leach solution. Accordingly, a leaching solution employing Tu as the reagent having the thiocarbonyl functional group may be effectively be prepared using either Tu or FDS.

The skilled person will understand that, due to this equilibrium, the concentration of Tu (and FDS) may fluctuate over time. Accordingly, "concentration" or "Tu equivalent" as used herein to refer to the concentration of Tu in the leach solution, relates to the amount of Tu present in the solution as if all FDS in the solution was dissociated into Tu (i.e ignoring interconversion between the two forms). Similarly, "concentration" as used herein to refer to the concentration of FDS in the leach solution relates to the amount of FDS present in the solution as if all Tu in the solution was converted into FDS (i.e ignoring interconversion between the two forms).

"Initial concentration" is used herein to refer to the initial concentration of the reagent at the time the leach solution is applied to the ore sample. However, the skilled person will understand that the concentration of the reagent may diminish over time (e.g. through precipitation or decay) as the solution percolates through the column or the heap. Accordingly, the skilled person will appreciate that the processes disclosed herein should work to increase the rate of metal extraction from the metal sulfide provided that the concentration of the reagent is within a suitable range during some portion of the percolation through the ore. Accordingly, "contacting" material (e.g. ore or concentrate, or any other material comprising a base metal sulfide) as used herein refers to contact of the material at any point in the leach process. For greater certainty, "contacting" is not limited to the initial action by which lixiviant and/or reagent is applied to the material to be leached, but rather is includes contact between lixiviant and/or reagent at any point during the leach process.

In the presence of FDS and ferric sulfate (or another suitable oxidant), the anodic dissolution of a copper sulfide mineral such as chalcopyrite may proceed according to the following two reactions, with oxidation of the chalcopyrite by either FDS or ferric, respectively:

$$CuFeS_2(s) + 2\ [(NH_2)_2CS]_2SO_4(aq) \rightarrow CuSO_4(aq) + FeSO_4(aq) + 2\ S^0(s) + 4\ SC(NH_2)_2(aq)$$

$$CuFeS_2(s) + 2\ Fe_2(SO_4)_3(a) \rightarrow CuSO_4(a) + 5\ FeSO_4(a) + 2\ S^0(s)$$

After chalcopyrite is oxidized, and the copper is leached from the concentrate, it is desirable to recover the copper from the pregnant leach solution.

The methods disclosed herein involve two basic steps, namely, leaching and metal recovery, e.g. solvent extraction (SX) and electrowinning (EW), collectively SX-EW. The leaching process may be carried out as a percolation leach (such as a heap leach), a vat leach, or a tank leach as is known in the field.

For the purposes of this disclosure, the words "containing" and "comprising" are used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of these elements.

A "percolation leach", as used herein, refers to the selective removal of a mineral by causing a suitable solvent to seep into and through a mass or pile of material containing the desired soluble mineral, e.g. a column leach or a heap leach.

A "column leach", as used herein, refers to leaching through the use of a long narrow column in which ore sample and solution are in contact for measuring the effects of typical variables encountered in actual heap leaching.

A "heap leach", as used herein, is a process through which metals are extracted from the ore in which they are found, i.e. without beneficiation. A heap leach is often chosen for its efficiency and cost-effectiveness. After being removed from the ground, ore is typically sent through a crusher to break the ore down into smaller particles (although heap ores can be "run-of-mine" in which the ore is leached in an "as-blasted" state with no further crushing). Heap ores may be the product of primary, secondary, or tertiary crushing. Traditionally, the crushed particles are then "heaped", or "stacked" into a large pile.

A persistent cause of failure of heap leach operations is the presence of excess fines in the materials placed on the pad. Excess fines results in a low permeability material and thus the seepage rate of the lixiviant is too slow, or ore-solution contact is insufficient, for economic pad operations. Accordingly, the efficiency of a heap leach may be increased by agglomeration after crushing. "Agglomeration", as used herein, refers to a technique that binds together material fines or particles to create a larger product. Agglomeration may be achieved by different methods known in the art. Typically, heap leach agglomeration is performed in a drum agglomerator with sulfuric acid and no binder, or on conveyor belts with acid sprayed onto the ore at drop points.

The heap is irrigated with a solution that is dependent upon the type of ore being extracted. Acid for the leach will preferably be generated by bacteria using processes known in the art. Alternatively, additional acid could be added as necessary.

The irrigated solution is allowed to percolate through the ore, and drain to the bottom of the heap. The ore pile sits over an impermeable layer, such as plastic sheet, which collects the pregnant leach solution as it drains through and directs it to a collection pond. Once the solution is collected, it is pumped to a recovery plant to extract the copper by solvent extraction and electrowinning (SX-EW).

Applying the methods disclosed herein to a heap leach, ore containing an appropriate sulfide mineral is leached selectively in the presence of the acid sulfate and the reagent having a thiocarbonyl functional group. The concentration of the reagent having a thiocarbonyl functional group in the leach solution may be about 30 mM or perhaps even higher. The skilled person will understand that it is only necessary that the reagent concentration be within a range sufficient to increase the leach rate of the metal sulfide.

Moreover, while reagent concentrations of about 100 mM or less are sufficiently low to facilitate the leaching of metal from a particular metal sulfide, 100 mM concentrations may not be economically feasible at the present time. Accordingly, it may be preferable to use lower concentrations of reagent that are feasible from economic and operational points of view, e.g. about 90 mM or less, about 80 mM or less, about 70 mM or less, about 60 mM or less, about 50 mM or less, about 40 mM or less, about 30 mM or less, about 20 mM or less, about 10 mM or less, about 5 mM or less, about 4 mM or less, about 3 mM or less, about 2 mM or less, about 1.5 mM or less, about 1 mM or less, about 0.9 mM or less, about 0.8 mM or less, about 0.7 mM or less, about 0.6 mM or less, about 0.5 mM or less, about 0.4 mM or less, 0.3 mM or less, or about 0.2 mM.

Accordingly, the concentration of the reagent in the acidic sulfate solution may in the range of about 0.2 mM to about 0.3 mM, about 0.2 mM to about 0.4 mM, about 0.2 mM to about 0.5 mM, about 0.2 mM to about 0.6 mM, about 0.2 mM to about 0.7 mM, about 0.2 mM to about 0.8 mM, about 0.2 mM to about 0.9 mM, about 0.2 mM to about 1.0 mM, about 0.2 to about 1.5 mM, about 0.2 to about 2.0 mM, about 0.2 to about 2.5 mM, about 0.2 to about 3 mM, about 0.2 to about 4 mM, about 0.2 to about 5 mM, about 0.2 to about 10 mM, about 0.2 to about 20 mM, about 0.2 to about 30 mM, about 0.2 to about 40 mM, about 0.2 to about 50 mM., about 0.2 to about 60 mM., about 0.2 to about 70 mM, about 0.2 to about 80 mM, about 0.2 to about 90 mM, or about 0.2 to 100 mM.

The leaching process may be run at temperatures between 0° C. (i.e. the freezing point of water) and 80° C. However, the process would typically be carried out at ambient temperature and atmospheric pressure.

In some situations, it may be necessary or preferable to run the leach with a lixiviant comprising a halide. A halide may include chloride, bromide, or iodide. For example, it may be necessary to perform the leach with brackish water, sea water, or a brine. Accordingly, the leaching process disclosed herein may be performed with a leach solution comprising chloride at a concentration of as much as 120 g/L. The concentration of chloride in the acidic sulfate solution may in the range of about 1 g/L to about 10 g/L, about 1 g/L to about 20 g/L, about 1 g/L to about 30 g/L, about 1 g/L to about 40 g/L, about 1 g/L to about 50 g/L, about 1 g/L to about 60 g/L, about 1 g/L to about 700 g/L, about 1 g/L to about 80 g/L, about 1 g/L to about 120 g/L, about 1 g/L to about 90 g/L, about 1 g/L to about 100 g/L, about 1 g/L to about 110 g/L, or about 1 g/L to about 120 g/L. In specific embodiments, the concentration of chloride in the acidic sulfate solution is in the range of about 20 g/L to about 120 g/L, 20 g/L to about 80 g/L, or 20 g/L to about 50 g/L.

Alternatively, the leaching process disclosed herein may be performed with a leach solution comprising bromide at a concentration of as much as 30 g/L. The concentration of bromide in the acidic sulfate solution may in the range of about 1 g/L to about 10 g/L, about 1 g/L to about 20 g/L, or about 1 g/L to about 30 g/L. In specific embodiments, the concentration of chloride in the acidic sulfate solution is in the range of about 10 g/L to about 30 g/L.

Alternatively, the leaching process disclosed herein may be performed with a leach solution comprising iodide at a concentration of as much as 300 ppm. The concentration of chloride in the acidic sulfate solution may in the range of about 1 g/L to about 10 ppm, about 1 ppm to about 20 ppm, about 1 ppm to about 30 ppm, about 1 ppm to about 40 ppm, about 1 ppm to about 50 ppm, about 1 ppm to about 60 ppm, about 1 ppm to about 70 ppm, about 1 ppm to about 80 ppm, about 1 ppm to about 90 ppm, about 1 ppm to about 100 ppm, about 1 ppm to about 110 ppm, about 1 ppm to about 120 ppm, about 1 ppm to about 130 ppm, about 1 ppm to about 140 ppm, about 1 ppm to about 150 ppm, about 1 ppm to about 160 ppm, about 1 ppm to about 170 ppm, about 1 ppm to about 180 ppm, about 1 ppm to about 190 ppm, about 1 ppm to about 200 ppm, about 1 ppm to about 210 ppm, about 1 ppm to about 220 ppm, about 1 ppm to about 230 ppm, about 1 ppm to about 240 ppm, about 1 ppm to about 250 ppm, about 1 ppm to about 260 ppm, about 1 ppm to about 270 ppm, about 1 ppm to about 280 ppm, about 1 ppm to about 290 ppm, or about 1 ppm to about 300 ppm. In specific embodiments, the concentration of chloride in the acidic sulfate solution is in the range of about 100 ppm to about 300 ppm.

Solvent Extraction

Following the leaching process, copper can be extracted from the leach solution. After a solid-liquid separation, i.e. drainage of the pregnant leach solution containing the copper from the heap, the pregnant solution is preferably subjected to conventional solvent extraction and electrowinning to produce pure copper cathodes according to the following overall reaction:

$$CuSO_4 \text{ (a)} + H_2O \text{ (l)} \rightarrow Cu \text{ (s)} + H_2SO_4 \text{ (a)} + \tfrac{1}{2}O_2 \text{ (g)} \qquad \text{SX-EW:}$$

Reagents having a thiocarbonyl functional group in the pregnant leach solution should not present any problem in the electrowinning operation and, as a matter of fact, may even be useful as a leveling agent. Raffinate containing Tu may then be recirculated to the heap for further leaching. The recirculated leach solution may also be supplemented with Tu to arrive at the desired initial Tu concentration for the leach.

PLS recovered from heap leaching will contain iron and copper ions. It is known that reagents comprising thiocarbonyl functional can form various stable complexes with copper ions (Doona and Stanbury, Inorg Chem 35:3210-3216; Mironov and Tsvelodub, J Solution Chem 25:315-325; Bowmaker et al., Inorg Chem 48:350-368). Extractants commonly used for copper solvent extraction (SX), such as hydroxyoximes and aldoximes, are strong complexing agents for copper ions. The solvent extractants can change the equilibrium between copper ions and thiocarbonyl ligands, releasing the thiocarbonyl ligands from the copper complexes. As the free thiocarbonyl ligands enter the raffinate solution, they can be returned to the heap and continue to catalyze the leaching.

Accordingly, PLS recovered from the leach through solid-liquid separation is then mixed with an organic solvent containing a base metal ion extractant to form a mixture. The skilled person will be able to select an appropriate solvent depending on the metal ion to be extracted. The organic solvent may be an aliphatic solvent, an aromatic solvent, or a combination thereof. The organic solvent may include kerosene, alkyl aromatics, cyclo-paraffins, or a combination thereof.

The skilled person will also be able to select an appropriate extractant. The base metal ion extractant may be an aldoxime, a ketoxime, or a combination thereof. The base metal ion extractant may further include an ester modifier, analkylphenol modifier, or a combination thereof.

During the solvent extraction, base metal cations are decomplexed from the reagent, thus liberating the reagent, and allowing the base metal cations to be extracted from the PLS into the organic solvent. The free reagent remains in the aqueous phase. Separation of the organic solvent from the aqueous phase results in a base metal ion-depleted raffinate comprising the free reagent, and a base metal ion-enriched organic phase comprising the organic solvent and base metal ions.

The base metal ion-enriched solution can then be processed to recover the base metal. The raffinate on the other hand, can be recirculated for use in the lixiviant.

The retention of the free reagent in the aqueous phase during solvent extraction to produce the raffinate comprising the free reagent can be accomplished with halides, e.g. chloride, bromide, or iodide, present in the PLS at concentrations as discussed above.

As discussed above, the skilled person will understand that an equilibrium exists between Tu and FDS, such that the proportion of FDS and TU-Cu complexes to Tu in the PLS is higher than that in the lixiviant. Since Tu has a stronger effect on enhancing leaching of base metals from the sulfide ores/concentrates than FDS or the TU-Cu complex, increasing the proportion of free Tu in the raffinate prior to recirculation to the leach, e.g. by decomplexing Tu from the base metal ions in the PLS or by adding a reducing agent to bias the equilibrium in favor of Tu, may enhance the leaching process.

Figure 5:
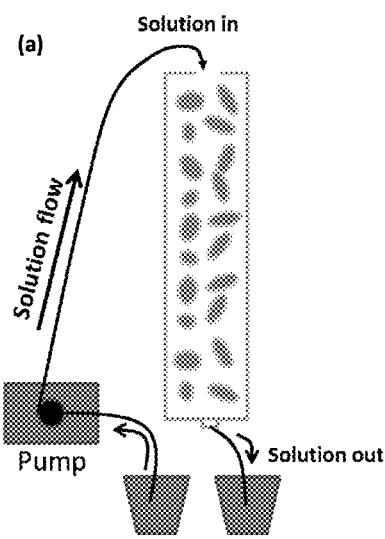
FIG. 5 is a schematic diagram for the leaching column used in respect of the leaching experiments pertaining to FIGS. 4, 5, and 6.

Referring to FIG. 5, a method for recovering a base metal from a base metal sulfide is shown at 500. The method begins by contacting material comprising at least one base metal sulfide, e.g. ore or concentrate, with a lixiviant. The lixiviant comprises an acidic sulfate solution and a reagent having a thiocarbonyl function group as described above to extract base metal ions from the at least one base metal sulfide to produce a pregnant leach solution (PLS) comprising reagent and base metal ions. A portion of the reagent is complexed with base metal ions. The leach may take place in a reactor (i.e. a reaction vessel), or in a heap that does not involve a reactor Referring to FIG. 6, in particular embodiments in which the reagent is Tu, the raffinate is blended with a reducing agent prior to returning the raffinate to the leach in order to bias the equilibrium between FDS and Tu from FDS to Tu. The skilled person will be able to select an appropriate reducing agent. For example, the reducing agent may be H$_2$S, NaSH, or Zinc. The reducing agent may be added to obtain a ratio of Tu:FDS in the range of about 0.5:1 to about 9:1.

EXAMPLES

To facilitate the extraction of metal ions from the minerals listed above, reagents having a thiocarbonyl functional group were added to acidic ferric sulfate solutions as catalysts. In the experiments disclosed herein, it was found that the reagents that contain thiocarbonyl functional groups have positive catalytic effect on the extraction of the minerals. Among all the reagents, Tu consistently provided the highest catalytic performance. Accordingly, Tu was the most heavily studied reagent of those identified. However, the results of experiments with other reagents having thiocarbonyl functional groups are provided to compare their catalytic effects. FDS, which does not contain a thiocarbonyl functional group but has comparable catalytic effect as Tu, was studied as a special case due to its equilibrium with Tu. Leaching reactions were carried out at atmospheric pressure on a variety of ore compositions, reagent concentrations, ferric concentrations, and under various other conditions, as described below.

Example 1 Extraction of Copper from Chalcopyrite Using Thiourea

Example 1.1

The effect of Tu on the electrochemical behavior of a chalcopyrite electrode was studied in a conventional 3-electrode glass-jacketed cell. A CuFeS$_2$ electrode was using as working electrode, a saturated calomel electrode (SCE) was used as reference, and a graphite bar was used as counter-electrode. The CuFeS$_2$ electrode was polished using 600 and 1200 grit carbide paper. All experiments were conducted at 25° C. using a controlled temperature water bath. The electrolyte composition was 500 mM H$_2$SO$_4$, 20 mM Fe$_2$SO$_4$ and 0-100 mM Tu. Before starting any measurement, solutions were bubbled with N$_2$ for 30 minutes to reduce the concentration of dissolved 02. Open circuit potential (OCP) was recorded until changes of no more than 0.1 mV/min were observed. After a steady OCP value was observed, electrochemical impedance spectroscopy (EIS) was conducted at OCP using a 5 mV a.c. sinusoidal perturbation from 10 kHz to 10 mHz. Linear polarization resistance (LPR) tests were also conducted using a scan rate of 0.05 mV/s at ±15 mV from OCP.

Linear potential scans were conducted at electrode potentials ±15 mV from the OCP measured at each Tu concentration. All scans showed a linear behavior within the electrode potential range analyzed. An increase in the slope of the experimental plots was observed with increasing Tu concentration. The slope of these curves was used to estimate the value of the polarization resistance (Rct) at each concentration. These values were then used to estimate the values of the dissolution current density using equation 1:

$$i_{dissol} \approx \frac{RT}{nFR_{ct}} \qquad \text{Eq. (1)}$$

Figure 3:
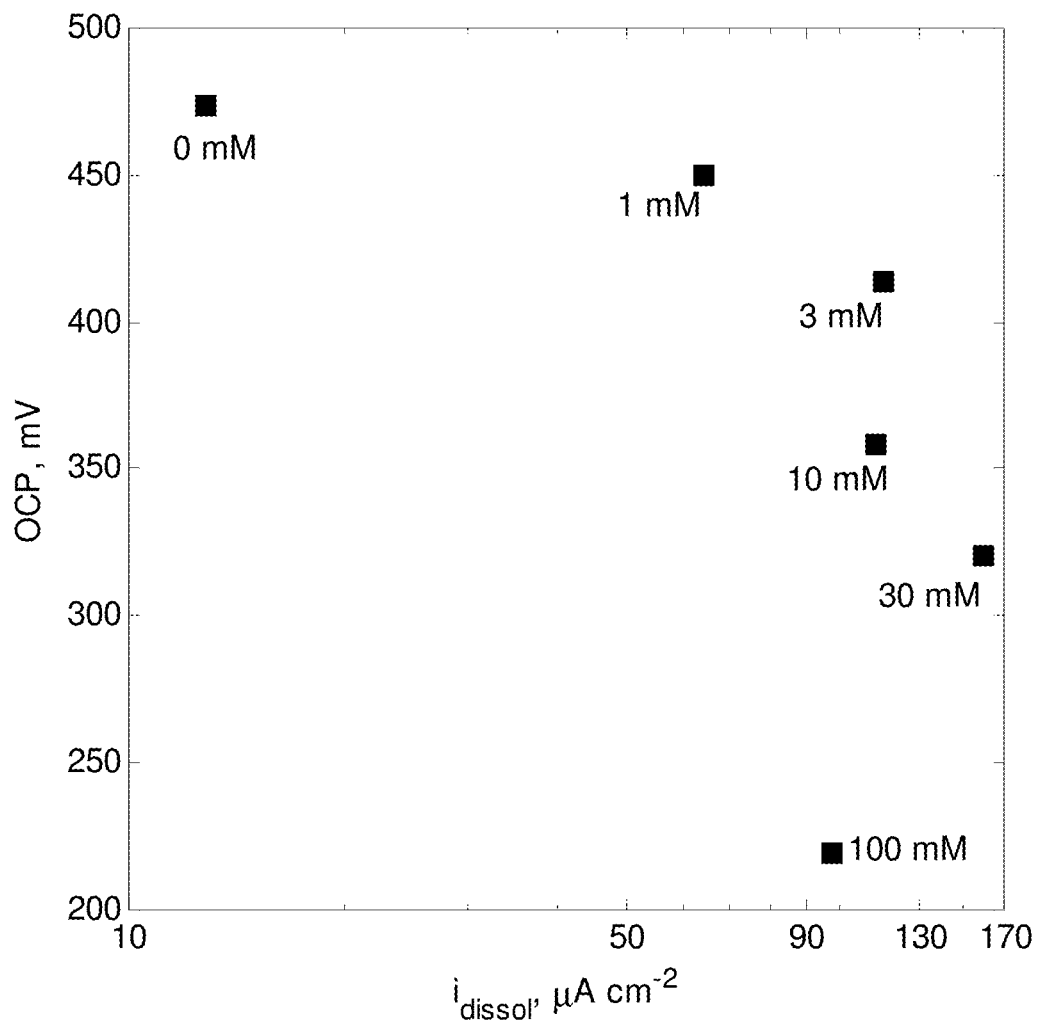
FIG. 3 is a plot showing the effect of thiourea concentration on mixed potential and dissolution current density ($i_{dissol}$) of the $CuFeS_2$ electrode.

FIG. 3 shows the effect of Tu on the dissolution current density and mixed potential of the CuFeS$_2$ electrode, and indicates that a maximum dissolution current density was achieved when Tu concentration is 30 mM. Increasing Tu concentration to 100 mM resulted in a decrease in the current density and mixed potential of the CuFeS$_2$ electrode. Moreover, after immersing the CuFeS$_2$ electrode in the 100 mM Tu solution, a copper-like film was observed on the surface of the electrode, which film could only be removed by polishing the electrode with carbide paper.

Example 1.2

Figure 4:
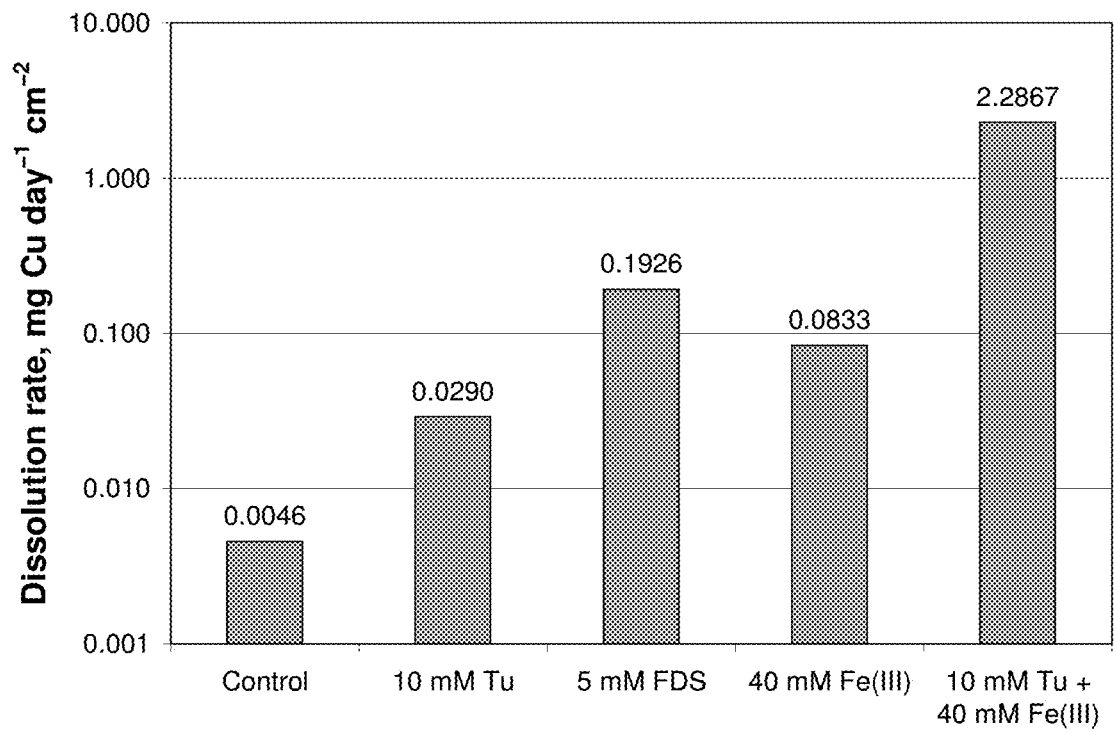
FIG. 4 is a bar graph showing electrochemical dissolution rates of a $CuFeS_2$ electrode in sulfuric acid solution at pH 2 and 25° C. with varying initial concentrations of thiourea, formamidine disulfide (FDS), and Fe(III)

FIG. 4 is a bar graph showing the effect of initial Tu or FDS concentration on the electrochemical dissolution of a chalcopyrite electrode in sulfuric acid solution at pH 2 and 25° C. A concentration of 10 mM Tu in the leach solution resulted in a six fold increase in dissolution rate compared to no Tu, and a concentration of 5 mM FDS resulted in a six fold increase relative to 10 mM Tu. A concentration of 10 mM Tu in leach solution also containing 40 mM Fe(III) resulted in a thirty fold increase in dissolution rate compared to 40 mM Fe(III) alone.

Example 1.3

A column leach of different acid-cured copper ores was conducted with Tu added to the leach solution. A schematic description of the column setup is shown in FIG. 5. The column diameter was 8.84 cm, the column height was 21.6 cm, and the column stack height was 15.9 cm. The irrigation rate was 0.77 mL/min or 8 L/m²/h. The pregnant leach solution emitted from these columns was sampled for copper every 2 or 3 days using Atomic Absorption Spectroscopy (AAS).

The specific mineralogical composition of these ores are provided in Table 1. The Cu contents of Ore A, Ore B, and Ore C were 0.52%, 1.03%, and 1.22% w/w, respectively. Prior to leaching, ore was "acid cured" to neutralize the acid-consuming material present in the ore.

That is, the ore was mixed with a concentrated sulfuric acid solution composed of 80% concentrated sulfuric acid and 20% de-ionized water and allowed to sit for 72 hours. For one treatment using Ore C, Tu was added to the sulfuric acid curing solutions.

The initial composition of the leaching solutions included 2.2 g/L Fe (i.e. 40 mM, provided as ferric sulfate) and pH 2 for the control experiment, with or without 0.76 g/L Tu (i.e. 10 mM). The initial load of mineral in each column was 1.6 to 1.8 kg of ore. The superficial velocity of solution through the ore column was 7.4 L m$^{-2}$ h$^{-1}$. The pH was adjusted using diluted sulfuric acid. These two columns were maintained in an open-loop or open cycle configuration (i.e. no solution recycle) for the entire leaching period.

Figure 6:
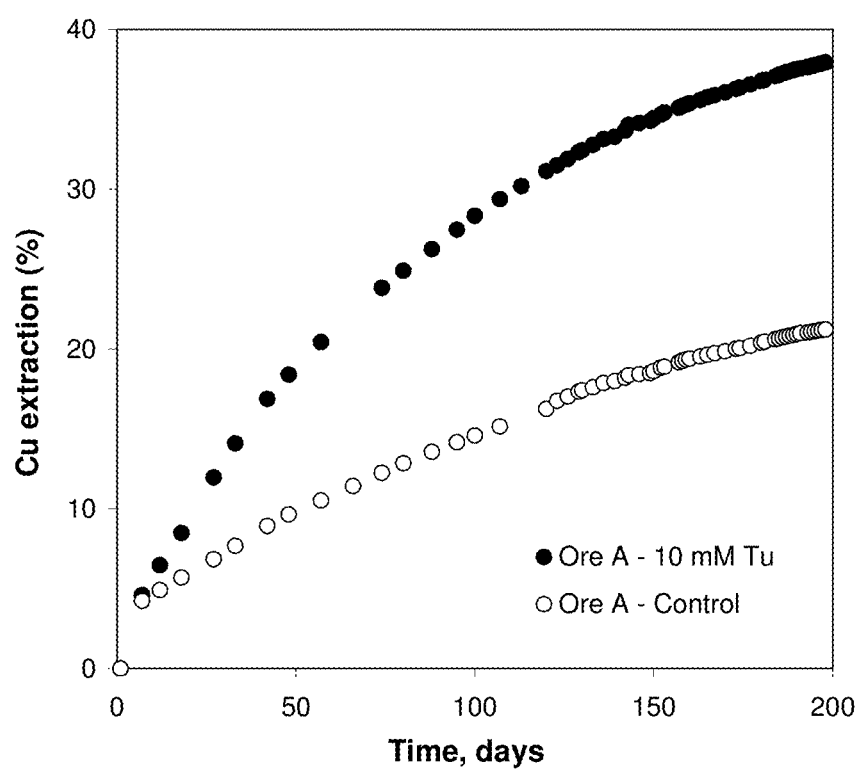
FIG. 6 is a graph showing the effect of thiourea concentration on the leaching of copper from Ore A in column leach experiments.
Figure 7:
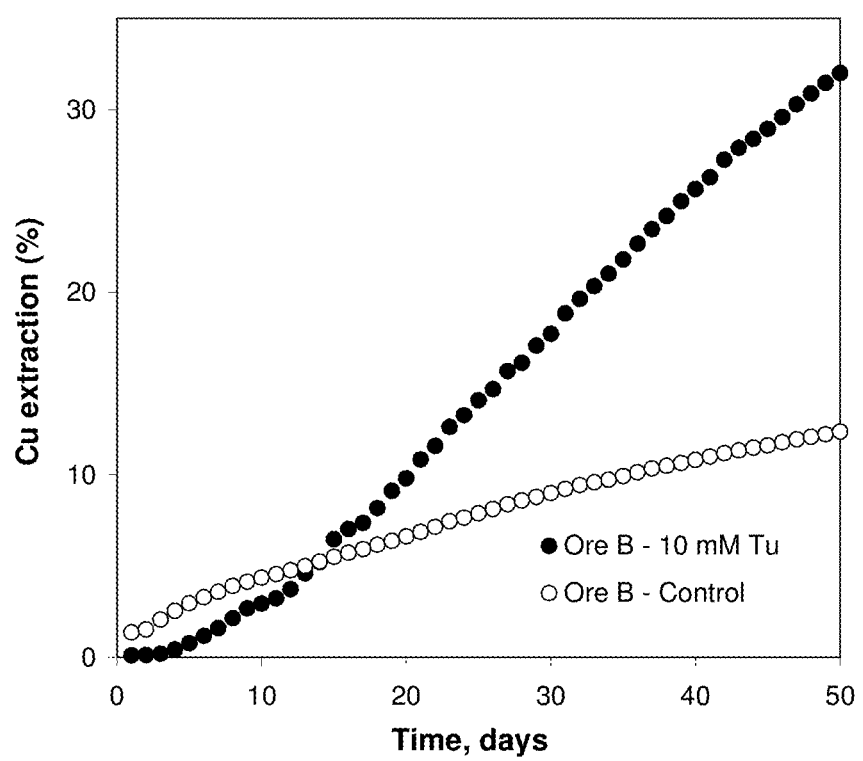
FIG. 7 is a graph showing the effect of thiourea concentration on the leaching of copper from Ore B in column leach experiments.
Figure 8:
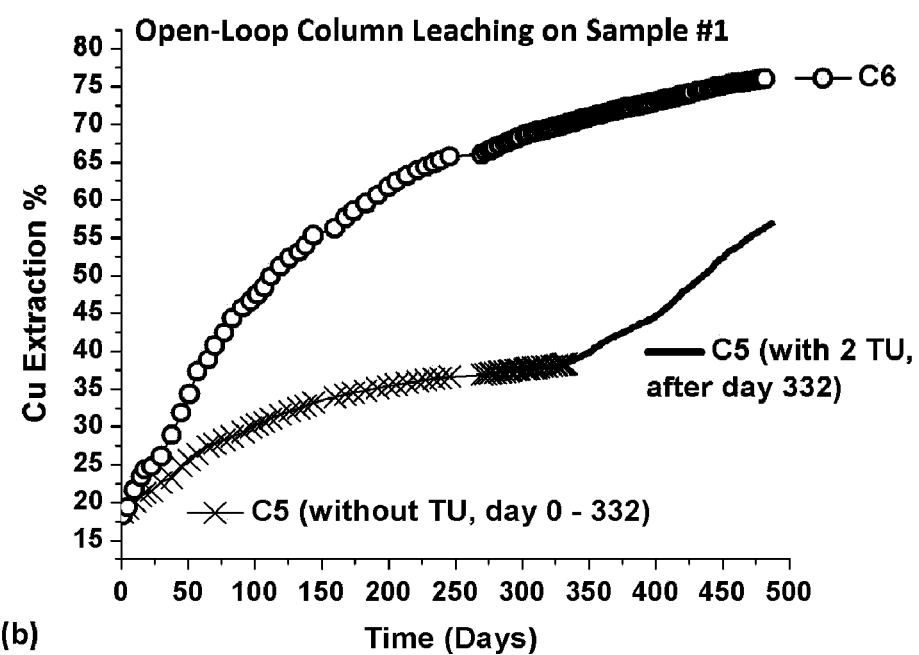
FIG. 8 is a graph showing the effect of thiourea concentration on the leaching of copper from Ore C in column leach experiments.

The results of leaching tests on the Ore A, Ore B and Ore C are shown in FIGS. 6, 7, and 8, respectively. The presence of Tu in the lixiviant clearly has a positive effect on the leaching of copper from the chalcopyrite. On average, the leaching rate in the presence of Tu was increased by a factor of 1.5 to 2.4 compared to the control tests in which the leach solutions did not contain Tu. As of the last time points depicted in FIGS. 6 to 8, copper extractions for columns containing Ore A, Ore B, and Ore C leached with a solution containing sulfuric acid and ferric sulfate alone, without added Tu, were 21.2% (after 198 days), 12.4% (after 50 days), and 40.6% (after 322 days), respectively. With 10 mM of added Tu, these extractions were 37.9%, 32.0%, and 72.3%, respectively.

Referring to FIG. 8, 2 mM Tu was added to the leach solution originally containing no Tu from day 322 onward, after which the leach rate increased sharply. From day 332 to day 448, the copper leached from this column increased from 40% to 58%, and rapid leaching was maintained throughout that period.

Figure 9:
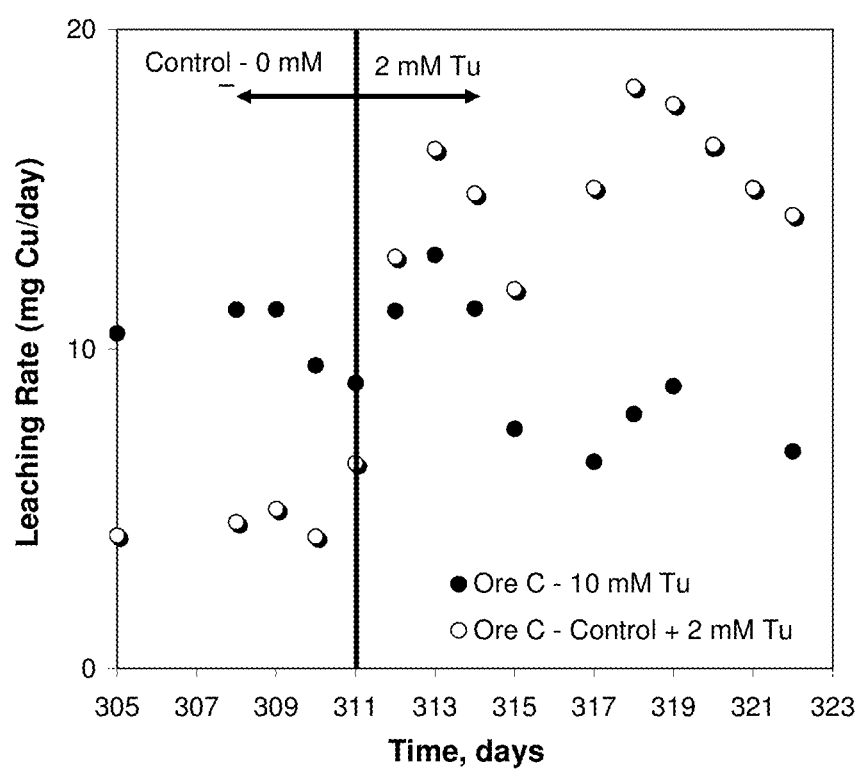
FIG. 9 is a graph showing the effect of thiourea concentration on the leaching rate of copper from Ore C in column leach experiments.

The averages for the last 7 days reported in FIG. 9 indicate that the leaching rate for acid-cured Ore C leached in the presence of 10 mM Tu is 3.3 times higher than for acid-cured Ore C leached in the absence of Tu, and 4.0 times higher than acid-cured and Tu-cured Ore C leached in the absence of Tu.

Figure 10:
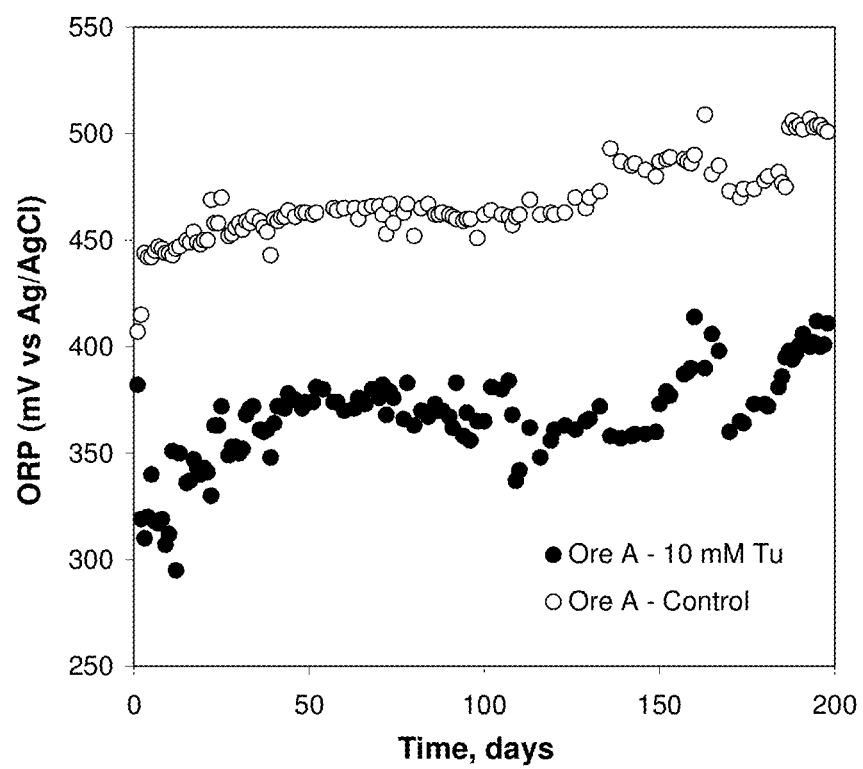
FIG. 10 is a graph showing the effect of thiourea concentration on ORP over time.

FIG. 10 shows the effect of Tu on solution potential. All potentials are reported against a Ag/AgCl (saturated) reference electrode. The solution potential of the leach solutions containing Tu was generally between 75 and 100 mV lower than the solution potential of leach solution that did not include Tu. Lower solution potentials are consistent with Tu working to prevent the passivation of chalcopyrite.

Example 1.4 Bottle Roll Leaching

"Bottle roll" leaching experiments in the presence of various concentrations of Tu were conducted for coarse Ore A and Ore B. The tests were conducted using coarsely crushed (100% passing ½ inch) ore.

Prior to leaching, the ore was cured using a procedure similar to what was performed on the ore used in the column leaching experiments. The ore was mixed with a concentrated sulfuric acid solution composed of 80% concentrated sulfuric acid and 20% de-ionized water and allowed to settle for 72 hours to neutralize the acid-consuming material present in the ore. For several experiments, different concentrations of Tu were added to the ore using the sulfuric acid curing solutions.

The bottles used for the experiments were 20 cm long and 12.5 cm in diameter. Each bottle was loaded with 180 g of cured ore and 420 g of leaching solution, filling up to around one third of the bottle's volume.

The leaching solution from each bottle was sampled at 2, 4, 6 and 8 hours, and then every 24 hours thereafter. Samples were analyzed using atomic absorption spectroscopy (AAS) for their copper content.

The conditions for the bottle roll experiments are listed in Table 2. Experiments #1 to #6 were conducted using only the original addition of Tu into the bottles. For experiments #7 to #11, Tu was added every 24 hours to re-establish the Tu concentration.

A positive effect of Tu on copper leaching was observed. For the coarse ore experiments, a plateau was not observed until after 80 to 120 hours. Tu was added periodically to the coarse ore experiments, yielding positive results on copper dissolution.

Figure 11:
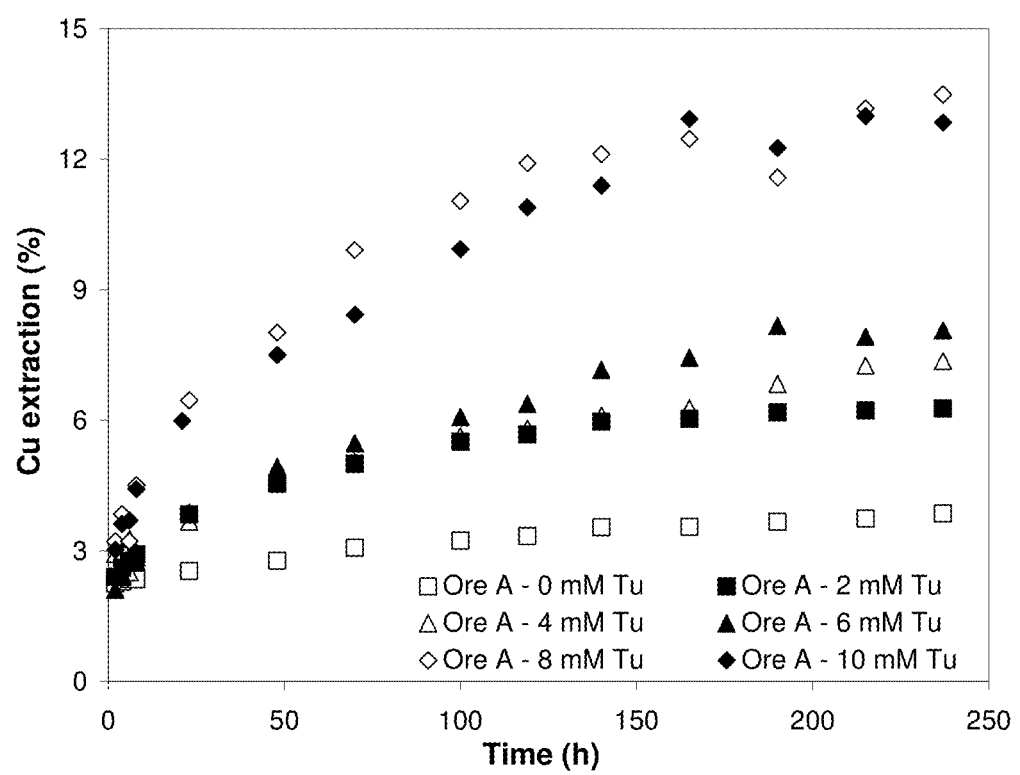
FIG. 11 is a graph showing the effect of thiourea concentration on copper dissolution for coarse Ore A in bottle roll experiments.

The effect of different concentrations of Tu in the leach solution on the leaching of coarse ore (experiments #1 to #11 as described in Table 2) is shown in FIGS. 11 and 10.

For ore B, Tu was periodically added every 24 hours to re-establish the thioruea concentration in the system and thus better emulate the conditions in the column leach experiments. As may be observed from FIG. 9, 8 mM and 10 mM Tu yielded higher copper dissolution results than the other Tu concentrations tested for ore A. A plateau in dissolution is not observed until after approximately 120 hours, which varied with Tu concentration as shown in FIG. 11.

TABLE 1

| Mineral | Ideal Formula | Ore A | Ore B | Ore C |
|---|---|---|---|---|
| Actinolite | $Ca_2(Mg,Fe^{2+})_5Si_8O_{22}(OH)_2$ | — | 1.8 | — |
| Biotite | $K(Mg,Fe^{2+})_3AlSi_3O_{10}(OH)_2$ | — | 4.2 | — |
| Calcite | $CaCO_3$ | — | 19.3 | — |
| Chalcopyrite | $CuFeS_2$ | 1.4 | 3.5 | 2.6 |
| Clinochlore | $(Mg,Fe^{2+})_5Al(Si_3Al)O_{10}(OH)_8$ | — | 15.0 | — |
| Diopside | $CaMgSi_2O_6$ | — | 3.5 | — |
| Galena | $PbS$ | — | — | 0.1 |
| Gypsum | $CaSO_4 2H_2O$ | — | 1.2 | — |
| Hematite | $\alpha$-$Fe_2O_3$ | — | 0.2 | — |
| K-feldspar | $KAlSi_3O_8$ | 17.9 | 10.8 | — |
| Kaolinite | $Al_2Si_2O_5(OH)_4$ | 2.3 | — | 2.3 |
| Magnetite | $Fe_3O_4$ | — | 0.8 | — |
| Molybdenite | $MoS_2$ | <0.1 | — | — |
| Muscovite | $KAl_2AlSi_3O_{10}(OH)_2$ | 21.9 | 6.0 | 41.6 |
| Plagioclase | $NaAlSi_3O_8$—$CaAlSi_2O_8$ | 13.6 | 25.4 | — |
| Pyrite | $FeS_2$ | 2.3 | — | 8.0 |
| Quartz | $SiO_2$ | 40.0 | 8.3 | 44.4 |
| Rutile | $TiO_2$ | 0.5 | — | 0.9 |
| Siderite | $Fe^{2+}CO_3$ | — | 0.1 | — |
| Total | | 100 | 100 | 100 |

Figure 12:
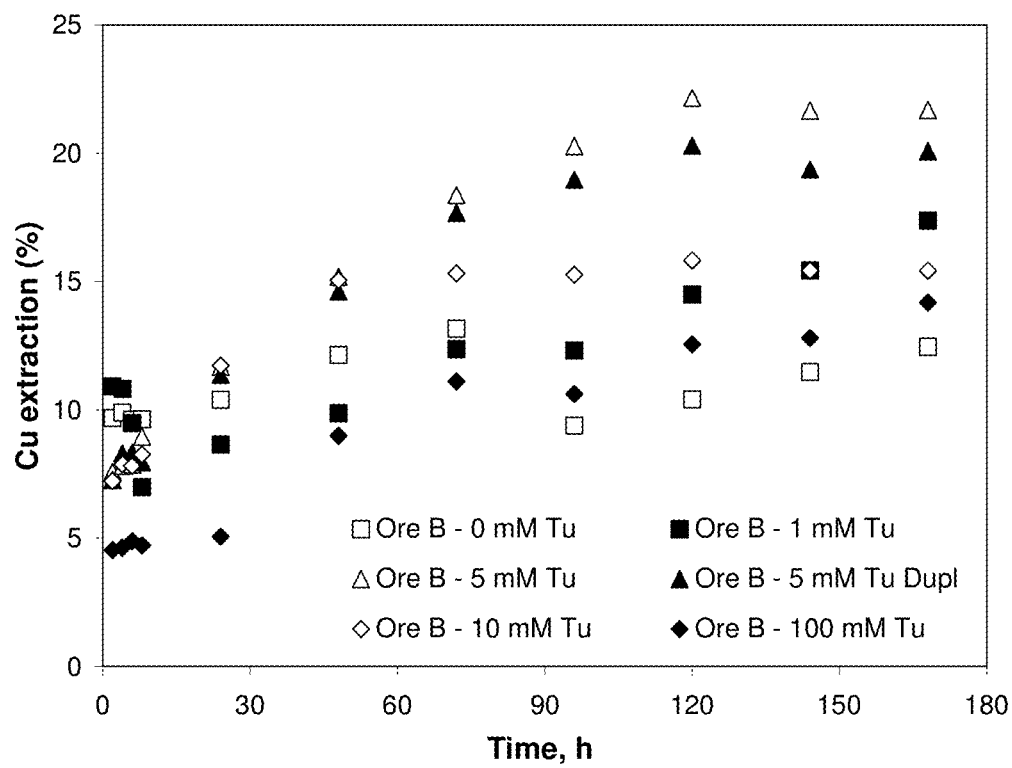
FIG. 12 is a graph showing the effect of thiourea concentration on copper dissolution for coarse Ore B in bottle roll experiments.

As may be observed from FIG. 12, 5 mM Tu yielded higher copper dissolution results than the other Tu concentrations tested for ore B. As with ore A, a plateau in dissolution is not observed until after approximately 80 to 120 hours, which varied with Tu concentration as shown in FIG. 12. Periodic addition of Tu resulted in increased copper dissolutions and produced a delay in the dissolution plateau.

Interestingly, solutions containing 100 mM Tu did not appear to be much more effective on copper extraction than those containing no Tu, and even worse at some time points. This is consistent with the results of Deschenes and Ghali, which reported that solutions containing 200 mM Tu (i.e. 15 g/L) did not improve copper extraction from chalcopyrite. Tu is less stable at high concentrations and decomposes. Accordingly, it is possible that, when initial Tu concentrations are somewhat higher than 30 mM, sufficient elemental sulfur may be produced by decomposition of Tu to form a film on the chalcopyrite mineral and thereby assist in its passivation. It is also possible that, at high Tu dosages, some copper precipitates from solution (e.g. see FIG. 17) to account for some of the low extraction results.

Example 2 Extraction from Chalcopyrite, Covellite, Chalcocite, Bornite, Enargite, Pentlandite, Violarite, and Greenockite Using Thiourea The catalytic effect of Tu was further demonstrated in stirred reactor tests. All reactors contained 1.9 L of ferric sulfate solution at pH 1.8 and total iron concentration of 40 mM. 1 g of mineral samples was used in each reactor test. These experimental conditions were designed to maintain an unlimited supply of oxidant.

In order to demonstrate the catalytic effect on chalcopyrite, 100% pure synthetic chalcopyrite was used instead of chalcopyrite concentrate which contains various impurities. The chalcopyrite was synthesized via a hydrothermal approach. CuCl, $FeCl_3$ and Tu were first mixed with a molar ratio of 1:1:2 and dissolved in 150 mL DI water. The solution was transferred to a Teflon-lined reaction vessel and heated up to 240° C. for 24 hours. At the end of the reaction, the precipitated powder was washed with acidic water (pH=1) and dried in air at room temperature. XRD analysis in showed that the synthetic chalcopyrite was free of any impurities compared with chalcopyrite mineral concentrate. This synthetic chalcopyrite was used in all the tests carried out in stirred reactors as disclosed herein.

TABLE 2

List of bottle roll leaching experiments involving Ore A and Ore B.

| Experiment | Brief description of experimental conditions |
|---|---|
| #1 | Coarse ore A, 0 mM Tu in solution, 40 mM ferric in solution, acid curing, no Tu replenishment |
| #2 | Coarse ore A, 2 mM Tu in solution, 40 mM ferric in solution, acid curing, no Tu replenishment |
| #3 | Coarse ore A, 4 mM Tu in solution, 40 mM ferric in solution, acid curing, no Tu replenishment |
| #4 | Coarse ore A, 6 mM Tu in solution, 40 mM ferric in solution, acid curing, no Tu replenishment |
| #5 | Coarse ore A, 8 mM Tu in solution, 40 mM ferric in solution, acid curing, no Tu replenishment |
| #6 | Coarse ore A, 10 mM Tu in solution, 40 mM ferric in solution, acid curing, no Tu replenishment |
| #7 | Coarse ore B, 0 mM Tu in solution, 40 mM ferric in solution, acid curing |
| #8 | Coarse ore B, 1 mM Tu in solution, 40 mM ferric in solution, acid curing, periodic addition of Tu to replenish 1 mM concentration in solution |
| #9 | Coarse ore B, 5 mM Tu in solution, 40 mM ferric in solution, acid curing, periodic addition of Tu to replenish 5 mM concentration in solution |
| #10 | Coarse ore B, 10 mM Tu in solution, 40 mM ferric in solution, acid curing, periodic addition of Tu to replenish 10 mM concentration in solution |
| #11 | Coarse ore B, 100 mM Tu in solution, 40 mM ferric in solution, acid curing, periodic addition of Tu to replenish 100 mM concentration in solution |

The covellite mineral used in the experiment disclosed herein was also synthesized via a hydrothermal approach. CuCl and Tu were mixed with a molar ratio of 1:1 and dissolved in 150 mL DI water. The solution was transferred to a Teflon-lined reaction vessel and heated up to 220° C. for 24 hours. The synthesized CuS was acid-washed and dried in air. XRD analysis showed that it had 100% purity with no interference of other species.

The chalcocite mineral sample used in the experiments disclosed herein was 100% pure natural mineral.

The bornite mineral used in the experiments disclosed herein was obtained from Butte, Mont. with copper content of 58.9% based on ICP-AES. XRD analysis showed that the mineral contains 76.8% bornite, 8.1% chalcopyrite, 6.3% pyrite, 5.8% tennatite and 3.0% enargite. The copper content calculated from XRD was 55.6%, which is relatively consistent with the chemical assay.

The enargite mineral used in the experiments disclosed herein was in the form of an enargite concentrate, which contained approximately 70% enargite (34% copper) according to XRD analysis.

The Greenockite mineral used in this experiment was synthesized via a hydrothermal approach. $CdCl_2$ and Tu were mixed with a molar ratio of 1:1 and dissolved in 100 mL DI water. The solution was transferred to a Teflon-lined reaction vessel and heated up to 150° C. for 24 hours.

The synthesized CdS was acid-washed and dried in air. XRD analysis showed that it has 100% purity with no interference of other species.

The violarite used in the experiments disclosed herein was natural violarite mineral that contains 15.8% Ni according to ICP-AES. XRD analysis showed that the mineral had approximately 42% violarite and 13.1% $NiSO_4.6H_2O$.

Figure 13:
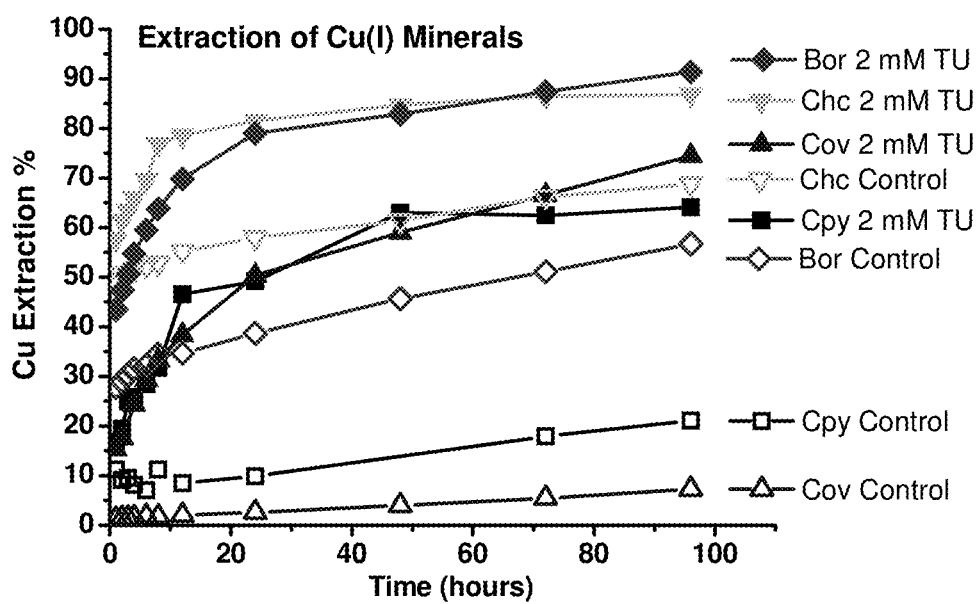
FIG. 13 is a graph showing the effect of Tu addition on various minerals that contain Cu(I). Diamonds pertain to bornite, triangles refer to covellite, inverted triangles pertain to chalcocite, and squares pertain to chalcopyrite. Open symbols refer to control treatments without Tu, whereas solid symbols refer to minerals treated solutions having an initial Tu concentration of 2 mM.

The sulfur on thiocarbonyl groups contains a lone electron pair and a filled π-orbital which can be used for donor-acceptor type bonding with a transition metal, together with a π*-antibonding orbital that could potentially accept the back-donation of electrons from the filled d-orbitals on the transition metal. Accordingly, without wanting to be bound by theory, it is suspected that the interaction between the surface ion and the thiocarbonyl functional group, especially back donation from metal to ligand, is responsible for the catalytic effect. Moreover, it is suspected that the catalytic effect should be more pronounced for the transition metals with higher d-electron numbers, with the catalytic effect being most pronounced for minerals with $d^{10}$ electronic configuration FIG. 13 shows that Tu catalyzes the leaching of common copper sulfide minerals, including chalcopyrite, covellite, chalcocite, and bornite, which all contain Cu(I). After 96 hours of leaching, chalcopyrite extraction reaches 64.1% with 2 mM of Tu compared to 21.1% without Tu; covellite extraction reaches 74.4% with 2 mM of Tu compared to 7.2% without Tu; chalcocite extraction reaches 85.6% with 2 mM of Tu compared to 65.1% without Tu; bornite extraction reaches 91.4% with 2 mM of Tu compared to 56.7% without Tu.

Figure 14:
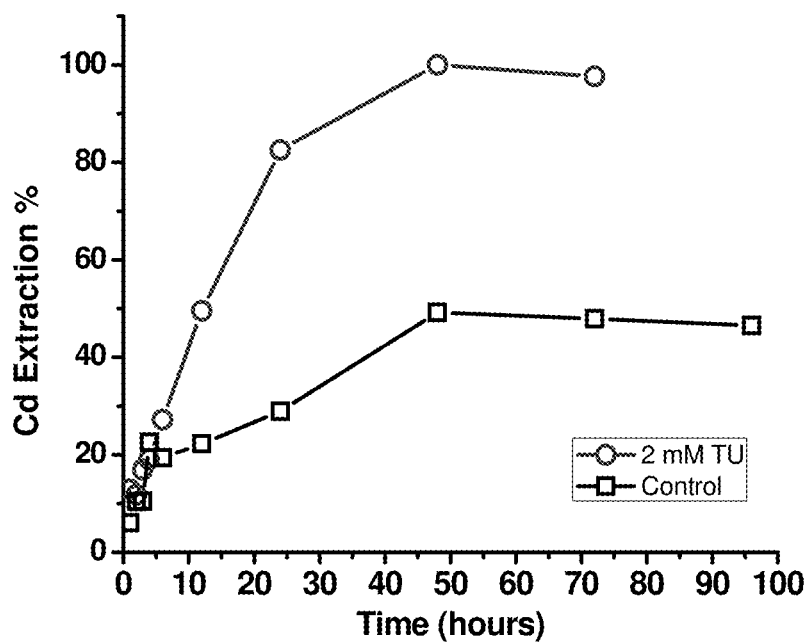
FIG. 14 is a graph showing the effect of Tu on cadium extraction from greenockite.

Like Cu(I), Cd(II) also contains the $d^{10}$ electronic configuration. FIG. 14 shows that leaching of CdS mineral is significantly enhanced with the addition of Tu. With Tu, the extraction of cadmium reaches 100% at 48 hours whereas extraction in the noncatalyzed reaction plateaued at 47% after 96 hours.

Figure 15:
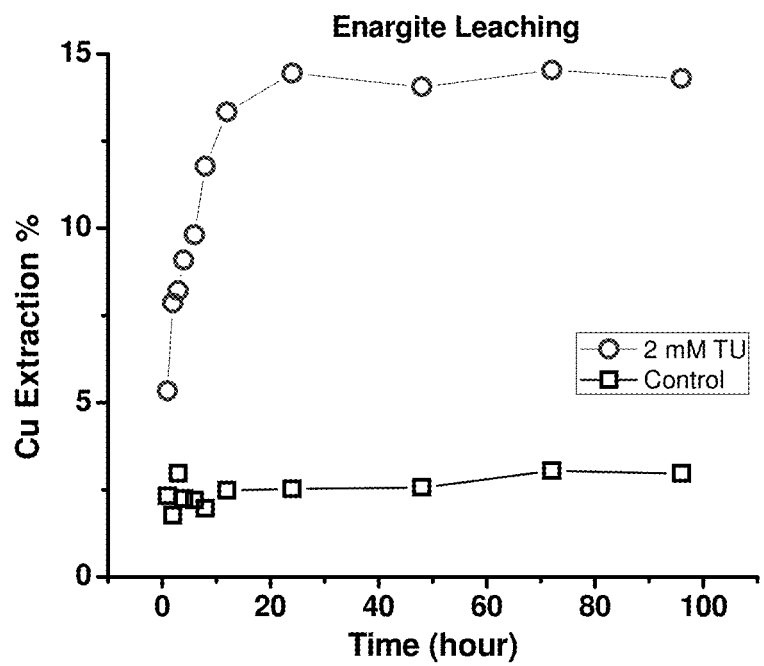
FIG. 15 is a graph showing the effect of Tu on copper extraction from enargite.

The copper ion in the enargite mineral has fewer d-electrons than other primary and secondary sulfides, and thus it may be expected that the catalytic effect should be slower than that for Cu(I) minerals. Nevertheless, the results shown in FIG. 15 clearly demonstrate that leaching with a leach solution comprising an initial concentration of 2 mM Tu increases the leach rate of copper from enargite compared to a control without Tu, which did not show any significant extraction after 96 hours of leaching.

Figure 16:
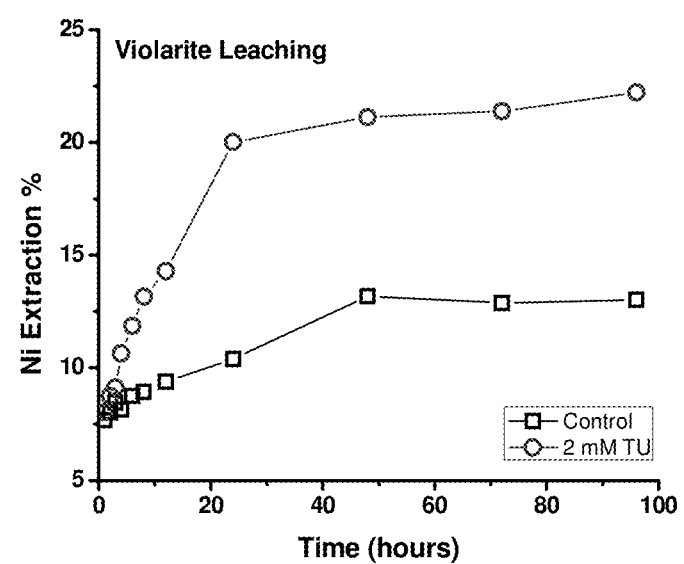
FIG. 16 is a graph showing the effect of Tu on nickel extraction from violarite.

Minerals that contain transition metal ions with $d^7$ electronic configuration, such as Ni(III), may also undergo catalyzed leaching with the addition of Tu. Similar to Cu(II), as Ni(III) is the highest stable oxidation state with 7 d-electrons, the catalytic effect is not expected to be as dramatic as for $d^{10}$ minerals. Referring to FIG. 16, leaching with a leach solution comprising an initial concentration of 2 mM Tu increases the leach rate of nickel from violarite compared to a control without Tu.

Results of leaching experiments referred to in Example 2 are summarized in Table 3, in which the extraction percentages under non-catalyzed and catalyzed conditions (with an initial Tu concentration of 2 mM) are compared.

TABLE 3

Comparisons of reactor leaching for various minerals under uncatalyzed and 2 mM Tu catalyzed conditions

| Mineral | 96-Hour Extraction (No Tu) | 96-Hour Extraction (2 mM Tu) |
|---|---|---|
| Chalcopyrite, $CuFeS_2$ | 21.1% | 64.1% |
| Covellite, CuS | 6.8% | 74.4% |
| Chalcocite, $Cu_2S$ | 65.1% | 85.5% |
| Bornite, $Cu_5FeS_4$ | 56.7% | 91.4% |
| Greenokite, CdS | 46.5% | 100.0% |
| Enargite, $Cu_3AsS_4$ | 2.1% | 10.0% |
| Violarite, $FeNi_2S_4$ | 13.0% | 22.2% |

Example 3 Reagent Dosage

Figure 17:
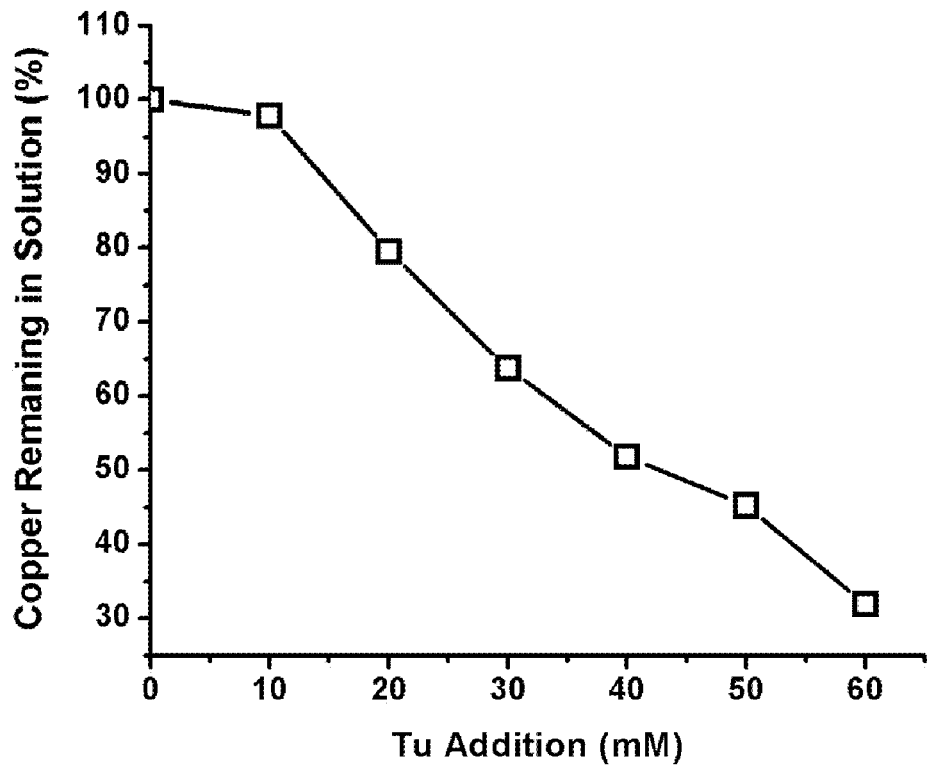
FIG. 17 is a graph showing the percentage of Cu ions remaining in solution after various amounts of Tu addition.

Optimum dosage of reagent may increase the efficiency of leaching. First, at certain concentrations, the reagent may form an insoluble complex with the metal ion of interest and precipitate. For example, Tu can form an insoluble complex with Cu(I) ions at a 3:1 molar ratio. A precipitation test was performed to examine the concentration range at which Cu-Tu complex precipitation may occur. 20 mL of Cu solution was divided into several identical portions followed by the addition of various Tu dosage (i.e. 0 to 60 mM). The solution was stirred for 24 hours, and the Cu remaining in the solution phase was analyzed by AAS. The results are shown in FIG. 17, plotted as the percentage of Cu remaining.

Second, heap leaching of metal sulfides is based on a bioleaching mechanism, an excessive amount of reagent may be detrimental to bioleaching microbes. For example, bacteria commonly used for bioleaching, such as *Acidithiobacillus ferrooxidans* and *Acidithiobacillus thiooxidans*, have very slow growth in a solution containing 10 mM Tu, and cannot survive at 100 mM Tu.

Third, with respect to Tu specifically, ferric reacts with Tu and converts it to FDS (see *Hydrometallurgy* 28, 381-397 (1992)). Although the reaction is reversible under certain conditions, a high concentration of FDS tends to decompose irreversibly into cyanamide and elemental sulfur (see *J Chromatogr* 368, 444-449).

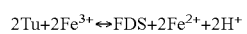

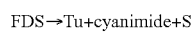

Therefore, over-addition of Tu in the lixiviant may cause the loss of $Fe^{3+}$ and Tu due to oxidation and decomposition. The irreversible decomposition of FDS has been observed when adding 4 mM of Tu into a 40 mM ferric sulfate solution at pH 1.8.

To further investigate the effect of Tu dosage on copper extraction, stirred reactor tests were performed using 1 g of synthetic chalcopyrite in 1.9 L of 40 mM ferric sulfate solution at pH 1.8 with various initial Tu concentrations. The treatments were run for 172 hours to approach maximum extraction. The results are presented in FIG. 18, and shows that, for 1 g of chalcopyrite, higher Tu dosage results in faster leaching kinetics among the Tu concentrations tested.

Figure 18:
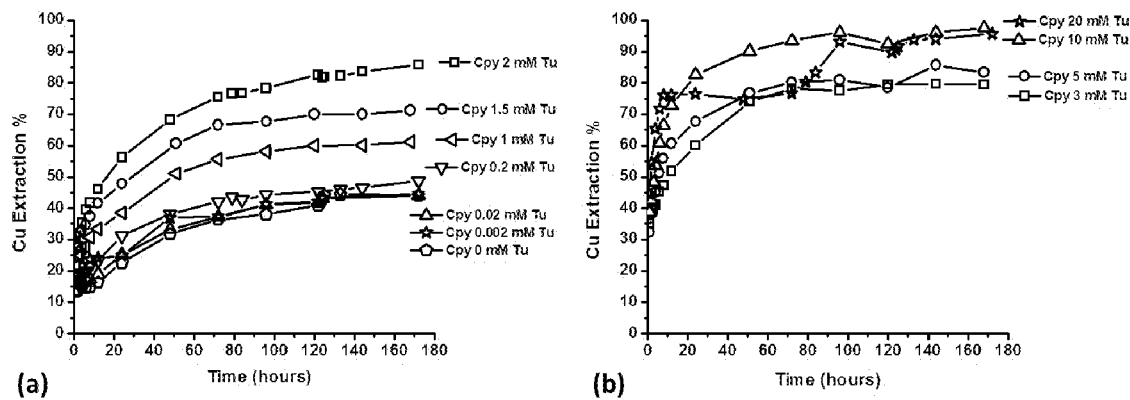
FIG. 18 is a graph showing extraction of Cu from chalcopyrite under various Tu dosages.

For Tu dosages of 5 mM and under, the initial 40 mM ferric sulfate solution can be considered as a sufficient supply of oxidant. However, for higher dosages such as 10 mM and 20 mM of Tu, extra ferric (in 1:1 ratio with Tu) had to be added to the solution to allow the oxidation of Tu to FDS. For 10 mM Tu, an extra 10 mM of $Fe^{3+}$ was added at time zero. For 20 mM Tu, an extra 20 mM of $Fe^{3+}$ was added at 72 hours, which led to the continuation of extraction as shown in FIG. 18.

Figure 19:
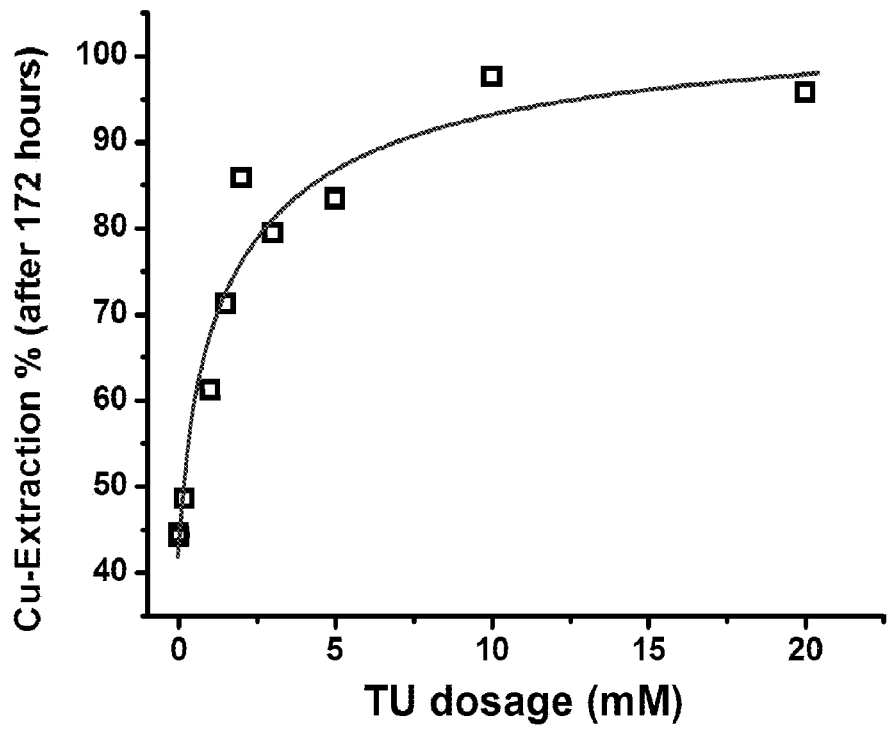
FIG. 19 is a graph showing the relationship between Tu dosage and Cu extraction after 172 hours.
Figure 20:
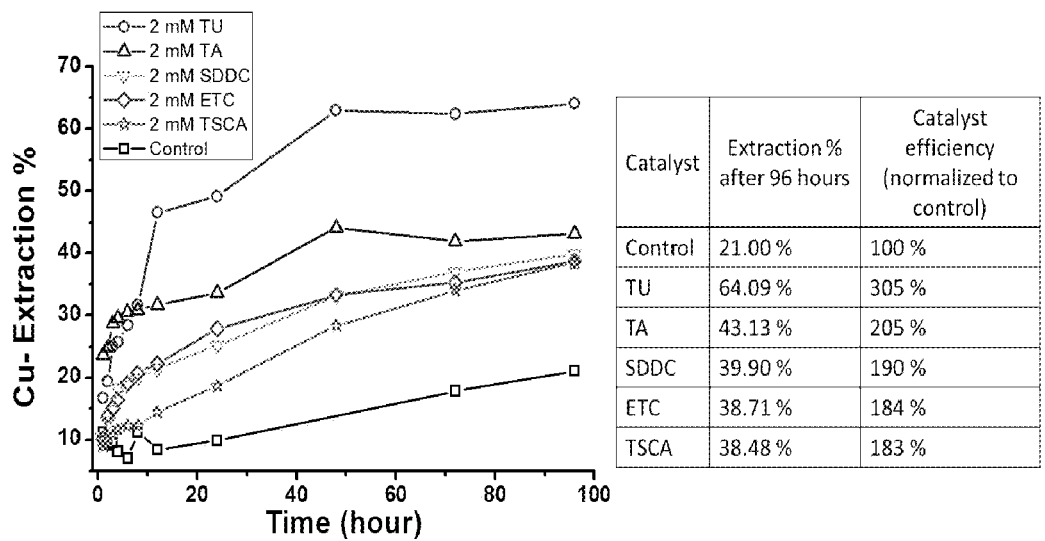
FIG. 20 is a graph showing leaching of copper from chalcopyrite in stirred reactor tests using reagents comprising thiocarbonyl functional groups. Circles pertain to Tu, triangles pertain to TA, inverted triangles pertain to SDDC, diamonds pertain to ETC, stars pertain to TSCA, and squares pertain to controls.
Figure 21:
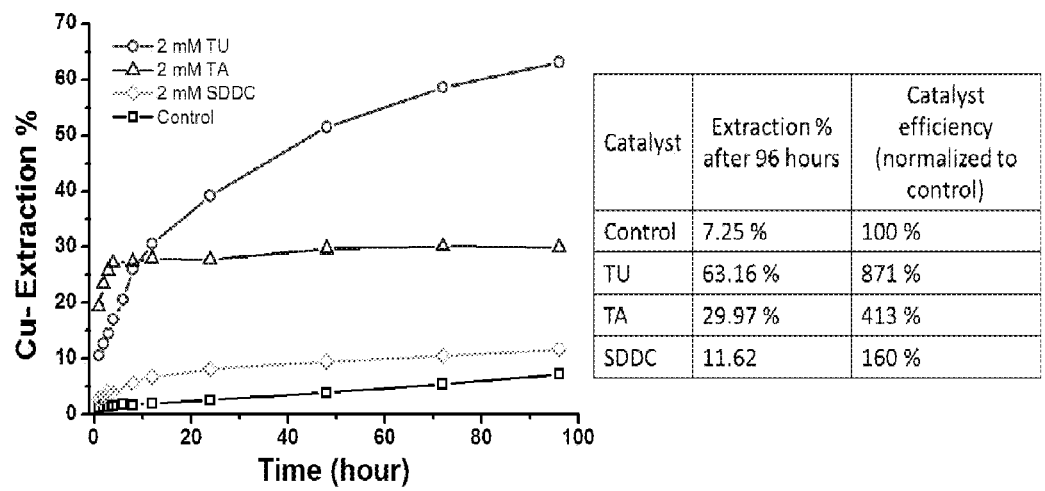
FIG. 21 is a graph showing leaching of copper from covellite in stirred reactor tests using reagents comprising thiocarbonyl functional groups. Circles pertain to Tu, triangles pertain to TA, diamonds pertain to SDDC, and squares pertain to controls.
Figure 22:
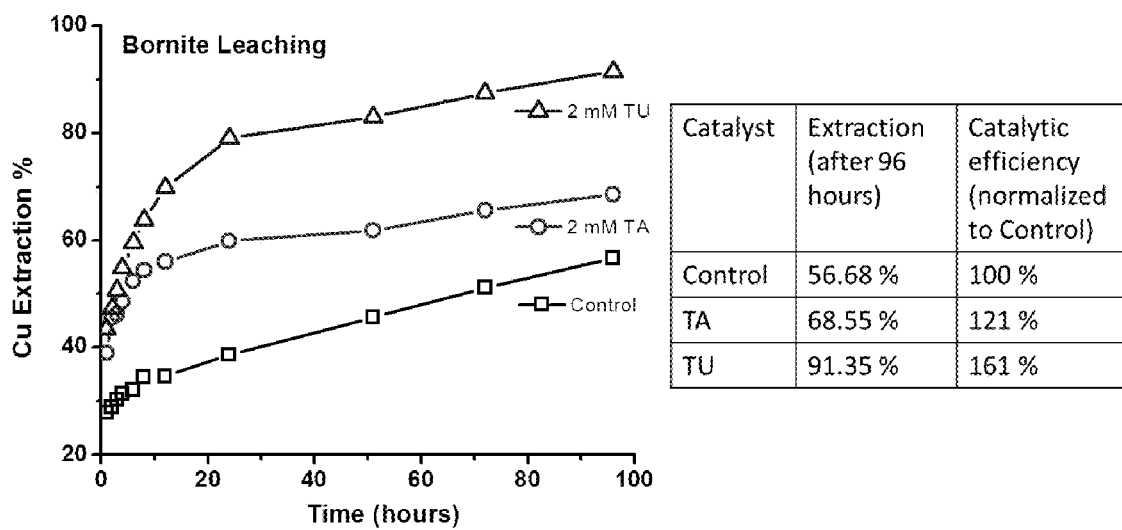
FIG. 22 is a graph showing leaching of copper from bornite in stirred reactor tests using reagents comprising thiocarbonyl functional groups. Triangles pertain to Tu, circles pertain to TA, and squares pertain to controls.
Figure 23:
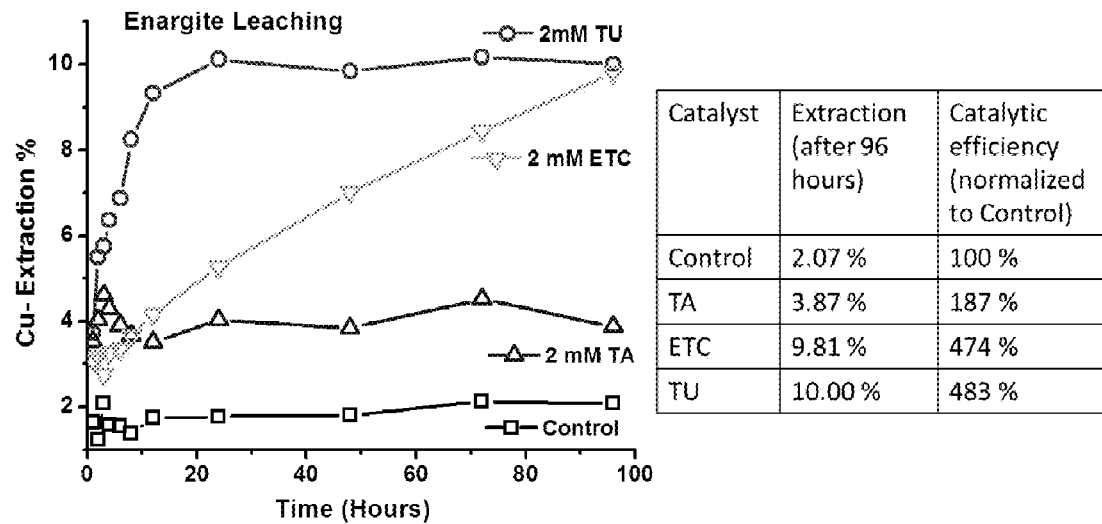
FIG. 23 is a graph showing leaching of copper from enargite in stirred reactor tests using reagents comprising thiocarbonyl functional groups. Circles pertain to Tu, triangles pertain to TA, inverted triangles pertain to ETC, and squares pertain to controls.

The Tu dosage vs. Cu extraction at 172 hours is plotted in FIG. 19. An initial Tu dosage up to 5 mM appears to have the most pronounced effect on the dissolution of Cu.

As indicated above, in previous shakeflask tests with acidic solutions (pH 1.8) containing various concentrations of $Fe^{3+}$ and $Cu^{2+}$ ions, slight precipitation occurred upon the addition of 4 mM of Tu due to the decomposition of FDS. Accordingly, concentrations of Tu concentration below 4 mM may avoid such precipitation. A series of shakeflask tests were performed on solutions containing initial concentrations of 2 mM Tu and various concentrations in a matrix containing $Fe^{3+}$ (0-100 mM) and $Cu^{2+}$ (0-50 mM) in order to identify concentration ranges of $[Fe^{3+}]$ and $[Cu^{2+}]$ that do not result in Cu complex precipitation. The results showed that no precipitation and no loss of Cu from the solution phase resulted using 2 mM of Tu in this wide range of Fe and Cu matrix concentrations.

Example 4 Alternative Reagents

The catalytic effect of several other reagents having a thiocarbonyl functional group was examined on the leaching of synthetic chalcopyrite, covellite, bornite, and enargite. Experiments were carried out in stirred reactors containing 40 mM ferric sulfate solution at pH 1.8. 1 g of chalcopyrite or covellite was added to the reactors along with an initial concentration of 2 mM of various thiocarbonyl reagents including Tu, TA, SDDC, ETC and TSCA. The Cu extraction curves for chalcopyrite, covellite, bornite, and enargite using all or a subset of the above reagents are shown in FIGS. 20, 21, 22, and 23.

From FIGS. 20 to 23, it is clear that each of these further reagents that have a thiocarbonyl functional group show a beneficial effect in the ferric sulfate leaching of each of chalcopyrite, covellite, bornite and enargite.

Figure 24:
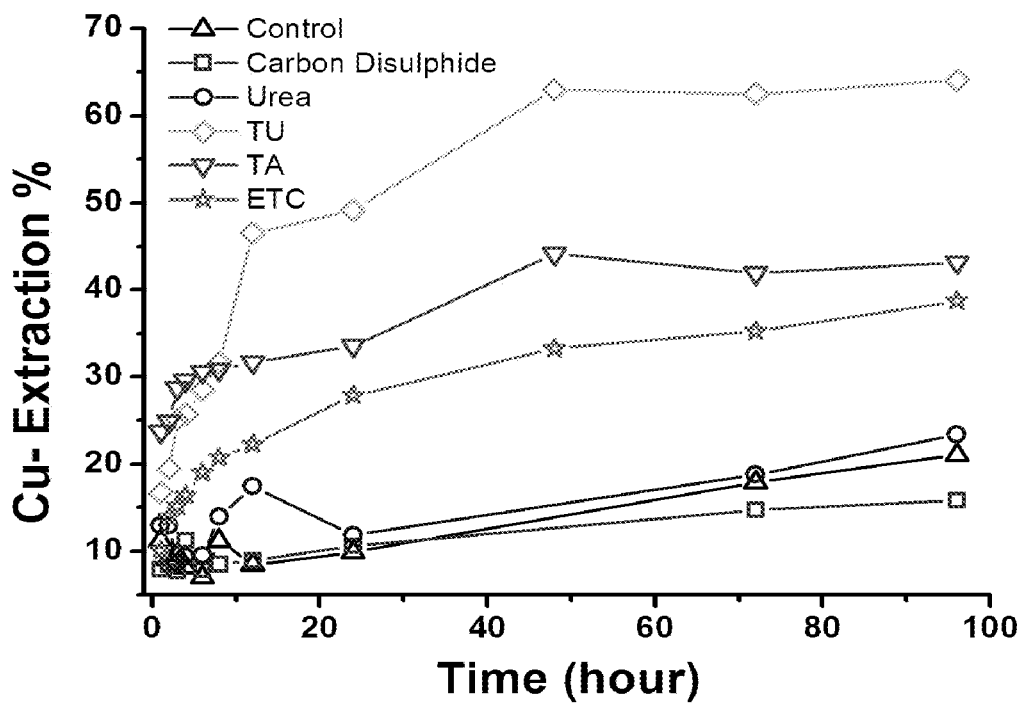
FIG. 24 is a graph showing the leaching of copper from chalcopyrite in stirred reactor tests using reagents comprising thiocarbonyl functional groups, urea, and carbon disulfide. Circles pertain to urea, triangles pertain to controls, inverted triangles pertain to TA, diamonds pertain to Tu, stars pertain to ETC, and squares pertain to carbon disulfide.

FIG. 24 summarizes the results of further stirred reactor tests on chalcopyrite that additionally investigate urea and carbon disulfide. These results confirm that, as expected, neither urea nor carbon disulfide are effective reagents.

Example 5 FDS

The catalytic effect of leaching solutions prepared with FDS on chalcopyrite, bornite, covellite, and chalcocite leaching was determined in stirred reactor tests. All reactors contained 1.9 L of ferric sulfate solution at pH 1.8 and total iron concentration of 40 mM. 1 g of mineral samples was used in each reactor test. An initial FDS concentration of 1 mM or an initial Tu concentration of 2 mM Tu was used.

Figure 25:
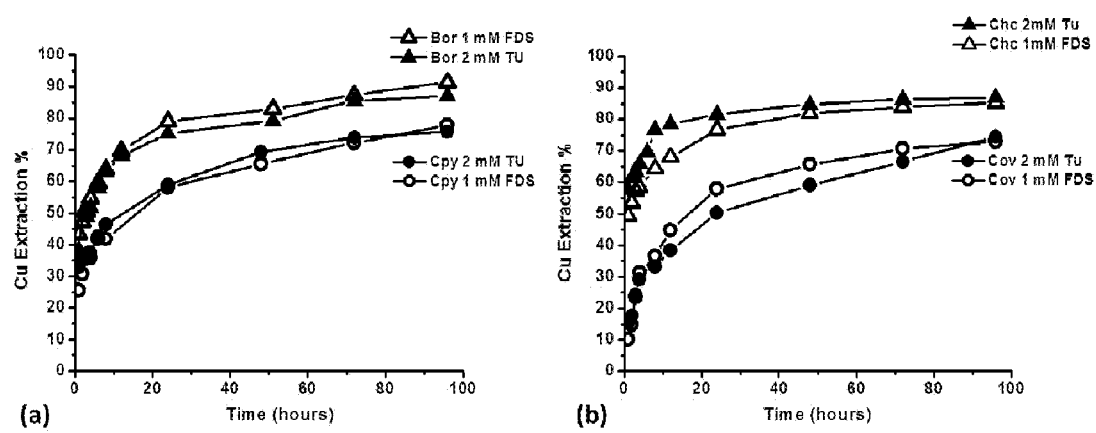
FIG. 25a is a graph comparing the leaching of copper from chalcopyrite (circles) or bornite (triangles) using leaching solutions with either an initial concentration of 2 mM Tu (solid symbols) or an initial concentration of 1 mM FDS (open symbols)
FIG. 25b is a graph comparing the leaching of copper from covellite (circles) or chalcocite (triangles) using leaching solutions with either an initial concentration of 2 mM Tu (solid symbols) or an initial concentration of 1 mM FDS (open symbols)

The results from stirred reactor tests shown in FIGS. 25a and 25b demonstrate that FDS has comparable efficiency to Tu in the leaching of each of chalcopyrite, bornite, covellite, and chalcocite after 96 hours.

Example 6 Stepwise Closed Loop Bioleaching with Tu

A closed loop bioleach with Tu was conducted. 7 kg of ore contain approximately 0.25% Cu content, mainly in the form of $CuFeS_2$ was leached at a flow rate of 1 L/day at an aeration rate of approximately 300 mL/min.

The ore was pre-treated with sulfuric acid to leach oxides (e.g. chalcanthite and basic copper salts) using sulfuric acid. After the acid leaching period finished, residual solutions were collected and replaced by a ferrous sulfate solution with nutrients (40 mM $FeSO_4$, 0.4 g/L magnesium sulfate heptahydrate and 0.04 g/L potassium dihydrogen phosphate, with pH adjusted to 1.6-1.8). The ferrous and nutrients solution was flushed through the column to establish a good habitat for bacterial growth. Inoculation of bacteria showed an increase in the ORP from 274 mV to 550 mV within 48 hours. The solution used in this step and future steps was kept circulating through the column, forming a self-sustaining closed-loop system.

At this stage, the remaining copper source is mainly $CuFeS_2$. After the bacteria had survived in the column, Tu was progressively added to the leaching solution. As discussed above Tu is converted to FDS at a molar ratio of 2:1 in the presence of 40 mM $Fe^{3+}$. Operating potential (ORP) was used as the indicator for bacterial activity, and HPLC was used to monitor FDS content. From day 0 to day 50, the leaching solution included 40 mM $Fe^{3+}$ with inoculated bacteria (with no Tu addition). From day 90 to day 98, a total of 1.878 g of Tu was progressively added, upon which the HPLC analysis on the effluent showed that the FDS was being maintained at approximately 1.5 mM, and no more Tu was added.

Figure 26:
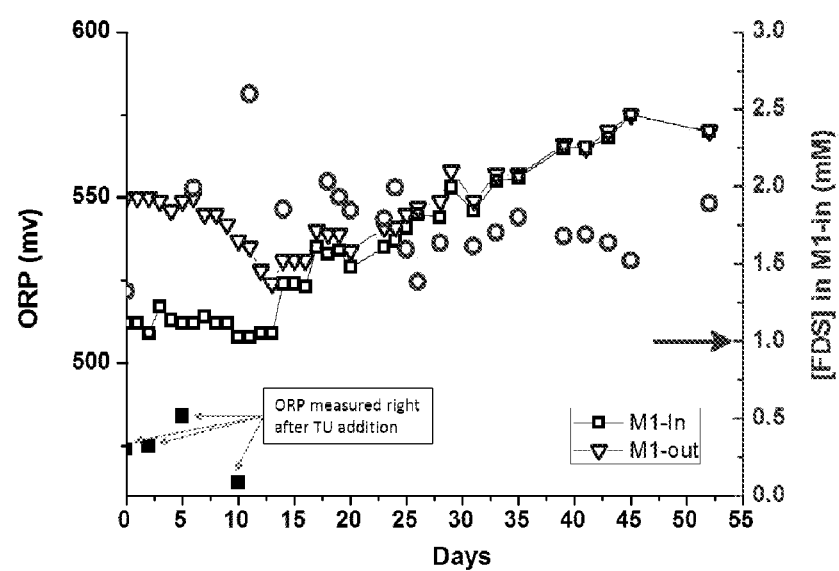
FIG. 26 is a graph monitoring bacterial activity and FDS content with ORP and HPLC.

As shown in FIG. 26, the ORP of the effluent was always equal to or higher than the influent, indicating that bacteria were actively oxidizing $Fe^{2+}$ to $Fe^{3+}$. The FDS contents were analyzed by HPLC, showing that approximately 1.5 mM of FDS (equivalent to 3 mM of Tu added) existing in the solution phase without any precipitation being observed. Therefore, it appears that 1.5 mM FDS (3 mM Tu equivalent) may be used in the solution without precipitation of ferric.

Figure 27:
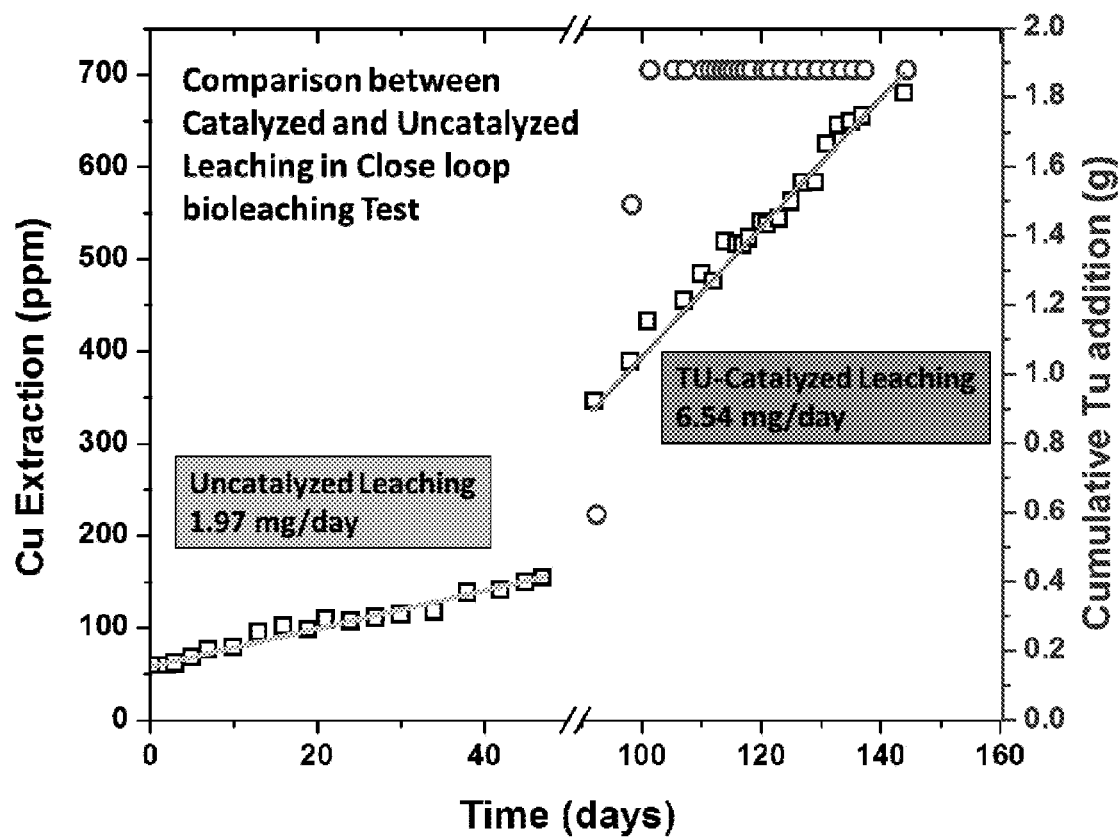
FIG. 27 is a graph showing the bioleaching of $CuFeS_2$ using only $Fe^{3+}$ (day 0-50) and using $Fe^{3+}$+Tu (day 90-150) in closed loop experiments.

The results of closed loop leaching test are shown in FIG. 27. From day 0 to day 50, bacteria were able to maintain high activity and oxidize $Fe^{2+}$ to $Fe^{3+}$. However, with the constant flow rate (1 L/day), the leaching rate was only 1.97 mg Cu/day for the first 50 days. Addition of Tu starting on day 90 increased the Cu extraction rate to 6.54 mg/day, which remained constant after day 98. This indicates that the reagent did not undergo decomposition and remained effective in the closed-loop system.

Example 7 Extraction from Chalcopyrite in the Presence of Chloride Using a Reagent Having a Thiocarbonyl Functional Group Example 7.1

The effect of chloride on the ability of Tu to facilitate leaching from a copper sulfide was tested in stirred reactors. Each reactor contained 1 g of 100% pure synthetic chalcopyrite in 2 L of ferric sulfate solution at pH 1.7, with a total ferric concentration of 40 mM. Experimental reactors included Tu at an initial concentration of 2 mM, and a chloride concentration of 20 g/L, 50, g/L, 80 g/L, or 120 g/L. Reactors comprising no Tu, no chloride, and no Tu or chloride were included as controls. A further reactor containing 2 mM Tu and 80 g/L chloride with 200 ppm Cu was also included. These experimental conditions were designed to maintain an unlimited supply of oxidant.

Figure 28:
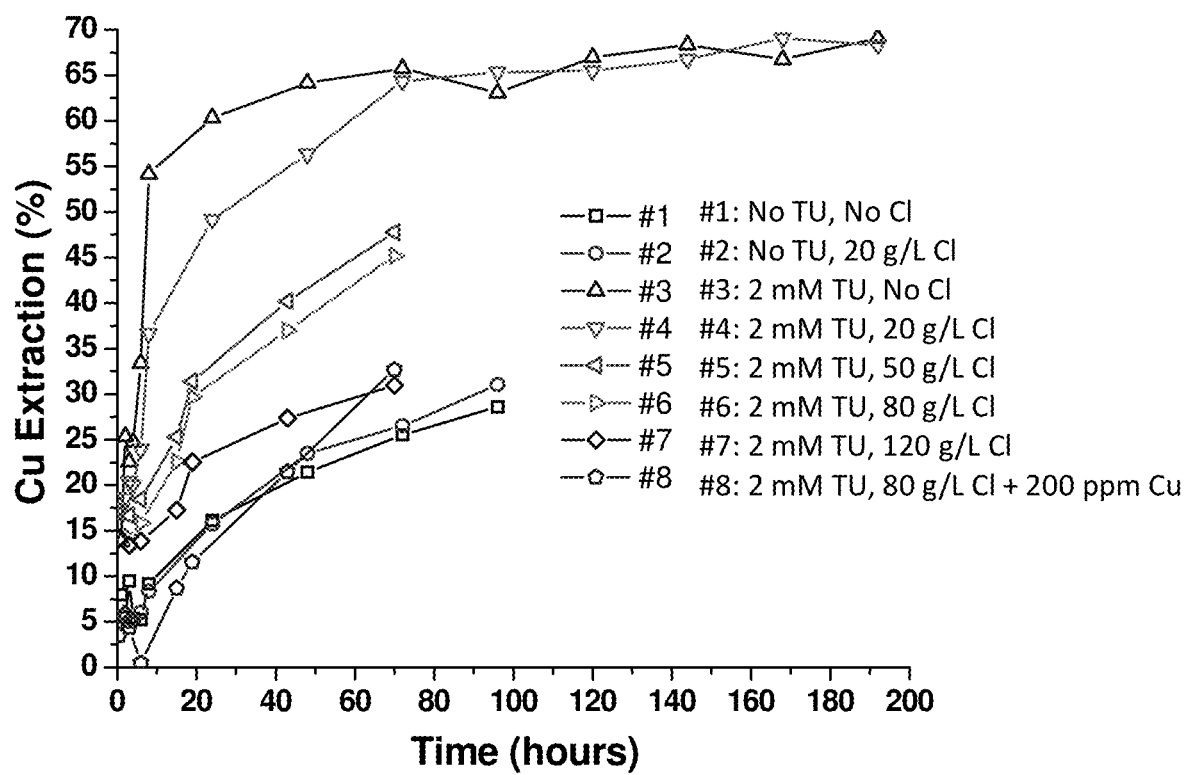
FIG. 28 are graphs showing the leaching of copper from chalcopyrite in the presence of Tu with varying concentrations of chloride.

As shown in FIG. 28, the presence of Tu has a positive effect on copper extraction from chalcopyrite in the presence chloride at a concentration as high as 120 g/L. While the amount of copper extracted decreased with increasing concentration of chloride, the extraction of copper was nevertheless higher in the presence Tu compared with the absence of Tu. For example, the extraction of copper was greater in solutions comprising Tu and 120 g/L chloride than solutions comprising no Tu and only 20 g/L.

Example 7.2

The effect of chloride on the ability of Tu or ETu to facilitate leaching from a copper sulfide was tested in stirred reactors. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 0 or 2 mM, and a chloride concentration of 0 g/L, 20 g/L, 80 g/L, or 200 g/L. Solution composition is listed in Table 4.

TABLE 4

Solution composition for test of compatibility of reagents having a thiocarbonyl function group with chloride

| Solution # | [Fe] g/L | [Cl] g/L | [Tu] mM | [ETu] mM |
| --- | --- | --- | --- | --- |
| 1 | 2.2 | 0 | 0 | 0 |
| 2 | 2.2 | 20 | 0 | 0 |
| 3 | 2.2 | 80 | 0 | 0 |
| 4 | 2.2 | 200 | 0 | 0 |
| 5 | 2.2 | 0 | 2 | 0 |
| 6 | 2.2 | 20 | 2 | 0 |
| 7 | 2.2 | 80 | 2 | 0 |
| 8 | 2.2 | 0 | 0 | 2 |
| 9 | 2.2 | 20 | 0 | 2 |
| 10 | 2.2 | 200 | 0 | 2 |

Figure 29:
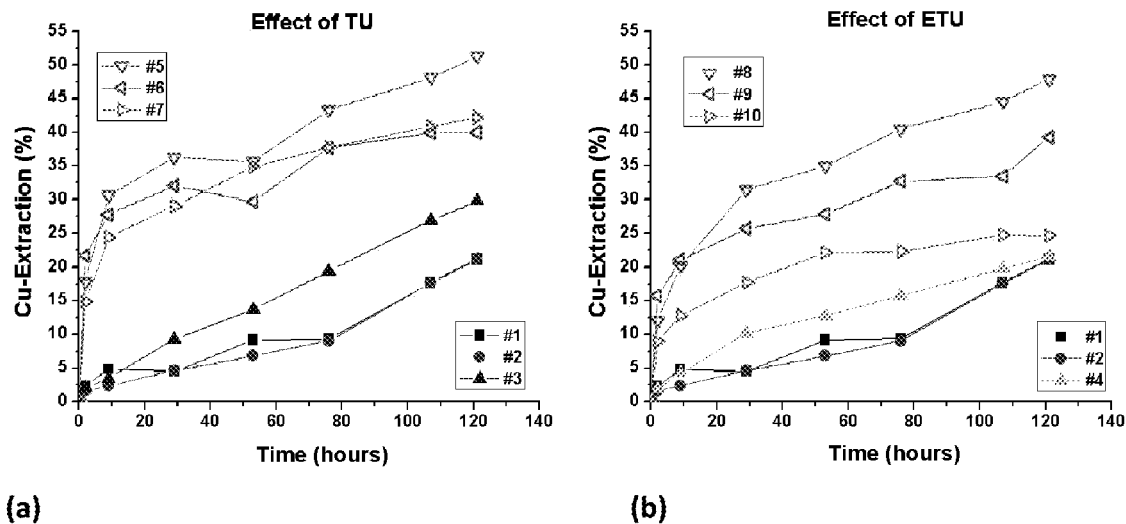
FIG. 29 are graphs showing the leaching of copper from chalcopyrite in the presence of (a) Tu and (b) ETu with varying concentrations of chloride.

As shown in FIGS. 29a and 29b, the presence of Tu or ETu has a positive effect on copper extraction from chalcopyrite in the presence chloride at a concentration as high as 200 g/L. While the amount of copper extracted decreased with increasing concentration of chloride, the extraction of copper was nevertheless higher in the presence of Tu compared with the absence of Tu. For example, the extraction of copper was greater in solutions comprising Tu and 120 g/L chloride than solutions comprising no Tu and only 20 g/L chloride.

Example 8 Extraction from Chalcopyrite in the Presence of Bromide Using Reagents Having a Thiocarbonyl Functional Group The effect of bromide on the ability of a reagent having a thiocarbonyl functional group to facilitate leaching from a copper sulfide was tested in stirred reactors over 180 h. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 2 mM and a bromide concentration of 10 g/L or 30 g/L (supplied in the form of potassium bromide). Reactors comprising neither Tu nor ETu were included as controls. The reactors were stirred at room temperature. Solution compositions are listed in Table 5.

TABLE 5

Solution composition for test of compatibility of reagents having a thiocarbonyl function group with bromide

| Solution # | pH | [Fe] g/L | [Br] g/L | [TU] mM | [ETU] mM |
|---|---|---|---|---|---|
| 1 | 1.7 | 2.2 | 0 | 0 | 0 |
| 2 | 1.7 | 2.2 | 10 | 0 | 0 |
| 3 | 1.7 | 2.2 | 30 | 0 | 0 |
| 4 | 1.7 | 2.2 | 10 | 2 | 0 |
| 5 | 1.7 | 2.2 | 30 | 2 | 0 |
| 6 | 1.7 | 2.2 | 10 | 0 | 2 |
| 7 | 1.7 | 2.2 | 30 | 0 | 2 |

Figure 30:
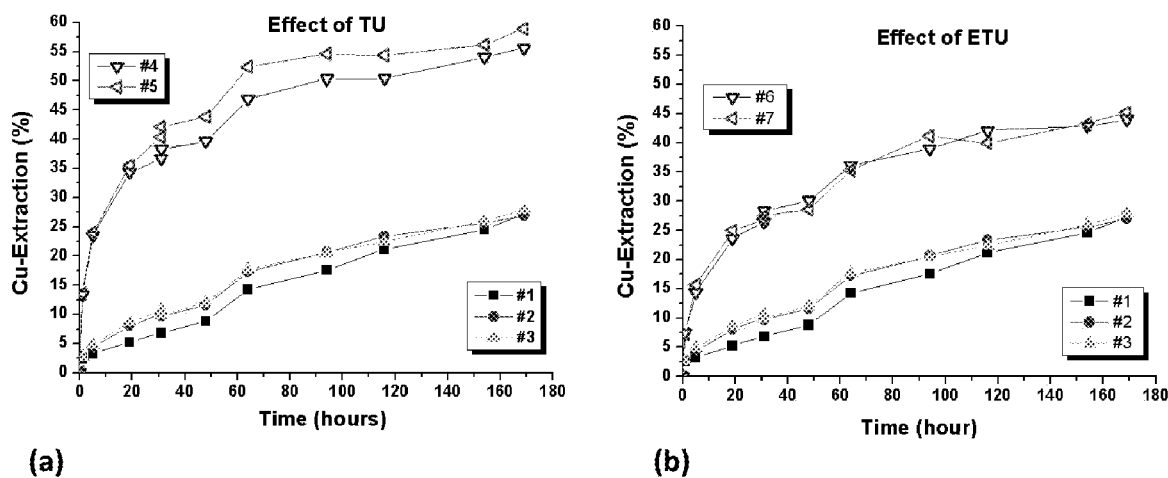
FIG. 30 are graphs showing the leaching of copper from chalcopyrite in the presence of (a) Tu and (b) ETu with varying concentrations of bromide.

As shown in FIGS. 30a and 30b, both Tu and ETu had a positive effect on copper extraction from chalcopyrite in the presence bromide at an initial concentration as high as 30 g/L.

Example 9 Extraction from Chalcopyrite in the Presence of Iodide Using Reagents Having a Thiocarbonyl Functional Group The ability of a reagent having a thiocarbonyl functional group to facilitate leaching from a copper sulfide in the presence of iodide was tested in stirred reactors over 180 h. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 2 mM and an iodide concentration of 100 ppm or 300 ppm (supplied in the form of potassium iodide). Reactors comprising neither Tu nor ETu were included as controls. The reactors were stirred at room temperature in a sealed condition. Solution compositions are listed in Table 3.

TABLE 6

Solution composition for sealed reactor tests of compatibility of reagents having a thiocarbonyl function group with iodide

| Solution # | pH | [Fe] g/L | [I] ppm | [TU] mM | [ETU] mM |
|---|---|---|---|---|---|
| 1 | 1.7 | 2.2 | 0 | 0 | 0 |
| 2 | 1.7 | 2.2 | 100 | 0 | 0 |
| 3 | 1.7 | 2.2 | 100 | 2 | 0 |
| 4 | 1.7 | 2.2 | 100 | 0 | 2 |
| 5 | 1.7 | 2.2 | 300 | 0 | 0 |
| 6 | 1.7 | 2.2 | 300 | 2 | 0 |
| 7 | 1.7 | 2.2 | 300 | 0 | 2 |

Figure 31:
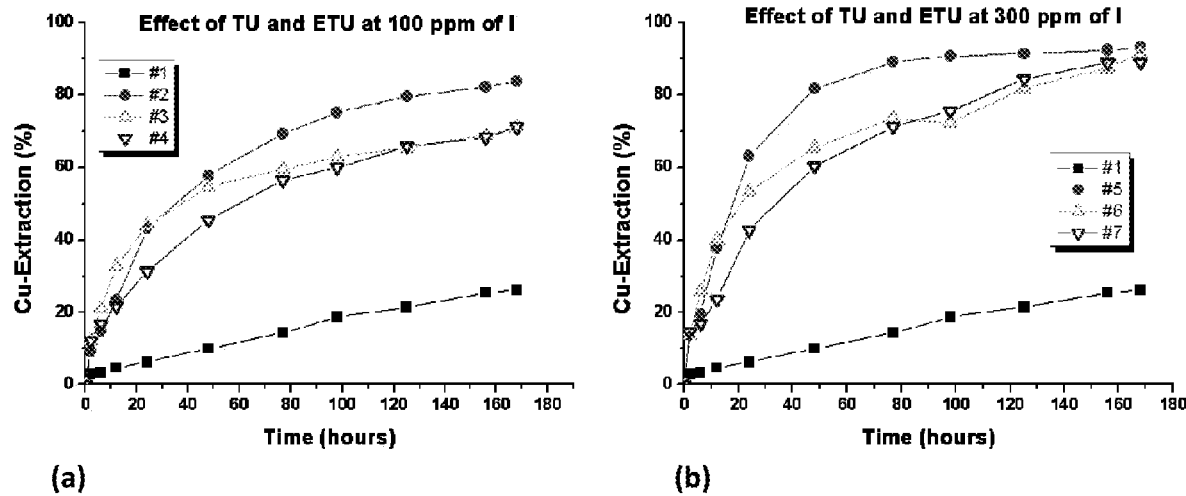
FIG. 31 are graphs showing the leaching of copper from chalcopyrite with Tu or ETu in the presence of (a) 100 ppm of iodine and (b) 300 ppm iodine in a sealed reactor.

As shown in FIGS. 31a and 31b, addition of thiocarbonyl compounds (TU and ETU here as examples) to an iodide medium results in slightly slower kinetics than the pure iodide leaching in sealed reactor tests. Previous study suggests that complexation can occur between metal, iodide, and thiocarbonyl species (Bowmaker et al., Inorganic Chemistry, 48:350-368).

Therefore the slower leaching kinetics are possibly due to the iodide entering those complexes and therefore not being as available for catalysis.

Given the equilibrium between iodine, iodide and tri-iodide

$$I_2 + I^- \leftrightarrow I_3^-  K_{eq} \approx 700 \text{ to } 770$$

and the fact that ferric ion can oxidize iodide to iodine by the following reaction

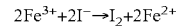

$$2Fe^{3+} + 2I^- \rightarrow I_2 + 2Fe^{2+}$$

the total iodine (in this case, iodide+iodine) can only be accurately detected by in-situ oxidation prior to ICP-AES detection. Accordingly, only conventional ICP-AES was performed, and the results were normalized.

Figure 32:
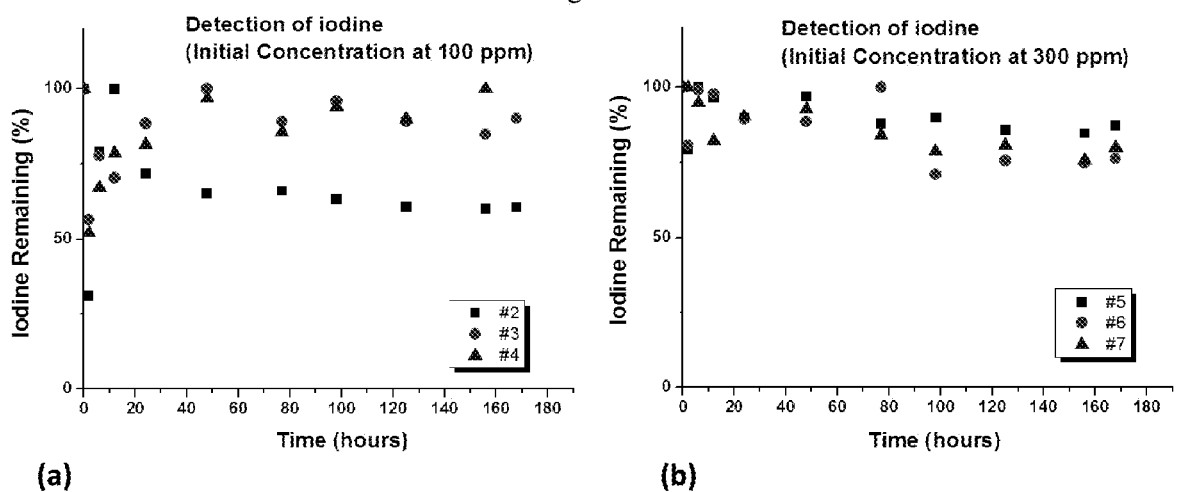
FIG. 32 are plots showing the concentration of iodine in a sealed reactor over time in the presence or absence of Tu and ETu at (a) 100 ppm of iodine and (b) 300 ppm iodine.

Referring to FIG. 32, analysis of the solutions in the sealed reactors indicates that most of the iodide remains in solution. In a practical, open-air setting, however, iodide is expected to be oxidized to iodine by ferric, with the iodine being lost from the lixiviant due to its volatility. Accordingly, the retention of iodide in simulated open air conditions was tested in the presence or absence of a reagent having a thiocarbonyl functional group. Two parallel open-surface evaporation tests were performed to demonstrate this phenomenon. Both vessels were placed under shade with the solution surface directly exposed to the air. Solution was kept stagnant (without agitation). The residual iodide was measured over a period of 72 hours. The solution compositions are listed in Table 7.

TABLE 7

Solution composition for the effect of thiocarbonyl compound on iodine (open surface, stagnant solution)

| Solution # | pH | [Fe] g/L | [I] ppm | TU [mM] |
|---|---|---|---|---|
| 1 | 1.7 | 2.2 | 200 | 0 |
| 2 | 1.7 | 2.2 | 200 | 2 |

Figure 33:
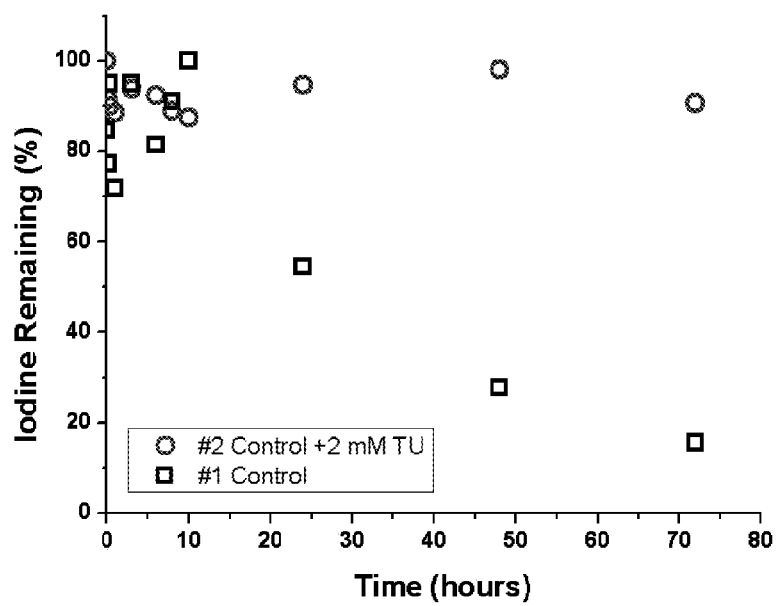
FIG. 33 is a plot showing the concentration of iodine in an open air reactor over time in the presence or absence of Tu.

Referring to FIG. 33, the results indicate that that when iodide enters acidic ferric sulfate solution, it rapidly turns into 12 and evaporates from the aqueous phase. In the presence of a reagent having a thiocarbonyl functional group, i.e. Tu, the total iodide concentration remained stable over the period of the test.

Accordingly, the ability of a reagent having a thiocarbonyl functional group to facilitate leaching from a copper sulfide in the presence of iodide was tested again in stirred reactors in open air conditions over 83 h. Each 2 L reactor contained 1 g of chalcopyrite concentrate that has 21.6% copper in 1 L of ferric sulfate solution at pH 1.7, with a total ferric concentration of 40 mM. Experimental reactors included Tu or ETu at an initial concentration of 2 mM and an iodide concentration of 100 ppm or 300 ppm (supplied in the form of potassium iodide). Reactors comprising neither Tu nor ETu were included as controls. The reactors were stirred at room temperature in a sealed condition. Solution compositions are listed in Table 8.

TABLE 8

Solution composition for TU-I compatibility tests in unsealed reactors

| Solution # | pH | [Fe] g/L | [I] ppm | [TU] mM | [ETU] mM |
|---|---|---|---|---|---|
| 1 | 1.7 | 2.2 | 100 | 0 | 0 |
| 2 | 1.7 | 2.2 | 100 | 2 | 0 |
| 3 | 1.7 | 2.2 | 100 | 0 | 2 |
| 4 | 1.7 | 2.2 | 300 | 0 | 0 |
| 5 | 1.7 | 2.2 | 300 | 2 | 0 |
| 6 | 1.7 | 2.2 | 300 | 0 | 2 |

Figure 34:
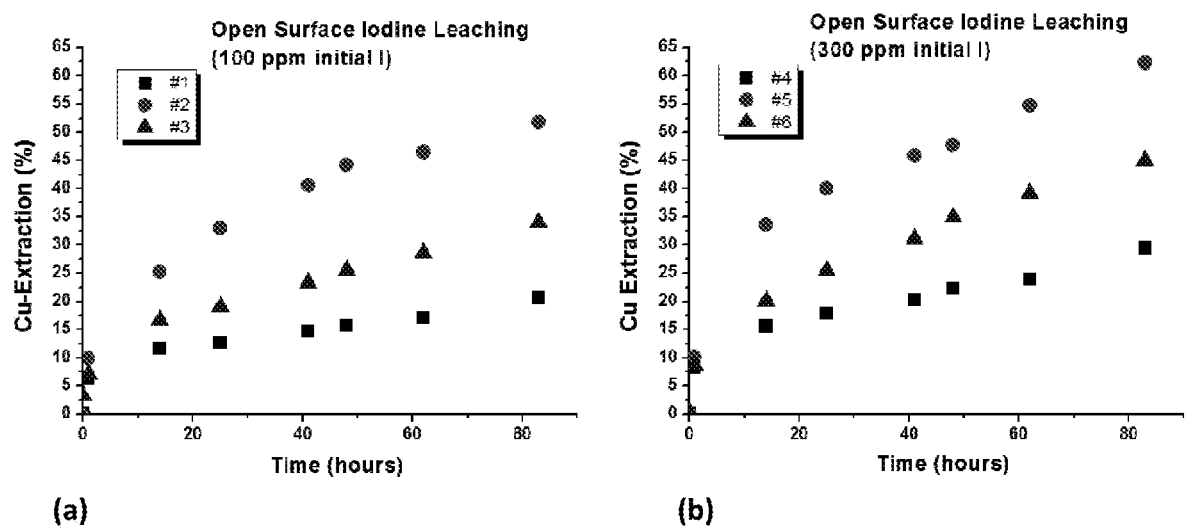
FIG. 34 are graphs showing the leaching of copper from chalcopyrite with Tu or ETu in the presence of (a) 100 ppm of iodine and (b) 300 ppm iodine in an unsealed (i.e. open air) reactor.

As shown in FIGS. 34a and 34b, both Tu and ETu had a positive effect on copper extraction from chalcopyrite in the presence iodide at an initial concentration as high as 300 ppm. While the amount of copper extracted increased with increasing concentration of iodide, the extraction of copper was nevertheless higher in the presence Tu and ETu compared with the absence thereof.

Figure 35:
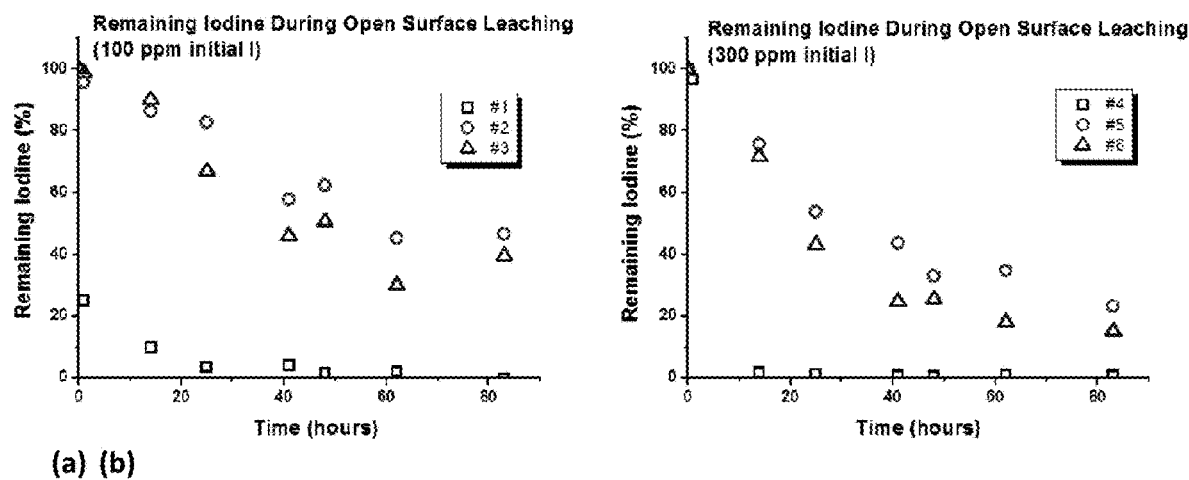
FIG. 35 are plots showing the concentration of iodine in an unsealed (i.e. open air) reactor over time in the presence or absence of Tu and ETu at (a) 100 ppm of iodine and (b) 300 ppm iodine.

The iodide concentration was also monitored during the course of leaching. The results presented in FIGS. 35a and 35b reveal that, under open-air conditions, iodide was rapidly lost from the aqueous phase. The amount of iodide in the solution decreased over time in each treatment, likely due to the volatility of iodine generated by oxidation of iodide by ferric. However, the decrease in iodide over time was significantly less for solutions containing Tu or ETu. Accordingly, reagents having a thiocarbonyl functional group may be useful in maintaining the stability of iodide in solution.

In general, reagents having a thiocarbonyl function group are compatible with leaching systems having a halide component. They facilitate copper extraction in chloride and bromide leaching environments. In the iodide system, while such reagents may not facilitate extraction under sealed conditions, under real operating conditions such as heap leaching, such reagents may increase the stability of the iodide species in solution.

Example 10 Recovery of a Thiocarbonyl Functional Group from a PLS

It is desirable to recover the reagent from the PLS for recirculation to the leach. However, it was initially unclear if it would be possible to effectively recover the reagents from the PLS. Reagents having a thiocarbonyl functional group are organics that may dissolve in the organic solvent used for solvent extraction. Such could potentially have the undesirable effect of removing all catalyst from the aqueous phase, thereby increasing cost by eliminating the possibility of catalyst recycle to the leach. This could also compromise or even destroy the effectiveness of the solvent extraction.

Reagents having a thiocarbonyl functional group are complexing agents for copper. This could prevent the reagents from being extracted efficiently from the copper complexes in solvent extraction.

Reagents having a thiocarbonyl functional group are also surface-active agents. They could interact with solvent extraction organics, causing a two-phase interlayer (also know as "crud"), which could compromise solvent extraction performance and recover.

Accordingly, tests were conducted to determine if the reagents having a thiocarbonyl functional group could be recovered from the PLS for recirculation to the lixiviant.

Example 10.1

A PLS from a chalcopyrite ore column leached with an acidic ferric sulfate solution containing Tu was mixed with an organic solvent containing a copper extractant for a specified period of time. The organic solvent was a mineral oil distillate comprising aliphatic hydrocarbons including naphthenic, paraffinic and isoparaffinic components (Exxsol™ D80). The copper extractant was a weak ester-modified aldoxime (Acorga® M5910). The copper extractant content in the organic solvent was 6% v/v. The PLS to organic solvent ratio during mixing was 5:1 v/v. The PLS contained 2.5 mM equivalent of free Tu.

After mixing, the organic solvent and aqueous phases were separated, and samples from the aqueous phase were analysed for reagent content. The feed PLS contained 2.5 mM equivalent of free Tu.

Table 9 shows the free Tu equivalent in the raffinate obtained after contacting the PLS with the organic solvent comprising the copper extractant for 2, 4 and 10 minutes. The table also shows the amounts of Tu and FDS in the PLS and the amounts of copper that remained in the aqueous phase (i.e the raffinate).

The results obtained indicate that:

the catalytic reagent (in the form of TU and FDS) is recovered from the PLS into the raffinate free of copper; and increasing the mixing time of the organic solvent and PLS increases the proportion of Tu to FDS in the raffinate compared with the PLS.

TABLE 9

| Sample | Contact time minutes | Copper remaining in Aqueous Phase | Concentration in Aqueous Phase | | |
|---|---|---|---|---|---|
| | | | Free TU mM | FDS mM | Total TU Equivalent* mM |
| PLS | 0 | 100% | 0.5 | 1.0 | 2.5 |
| Contact time A | 2 | 35% | 0.6 | 1.0 | 2.6 |
| Contact time B | 4 | 7% | 0.9 | 0.85 | 2.6 |
| Contact time C | 10 | 5% | 1.0 | 0.8 | 2.6 |

Example 10.2

Synthetic solutions with different concentrations of ferric, cupric, chloride, bromide, iodide and Tu were prepared in acidic sulfate media (pH=1.7) to simulate pregnant leaching solutions. Treatments involving halogen species were included to simulate the PLS obtained from different halogen leaching systems. The compositions of the solutions are listed in Table 10.

TABLE 10

| | | Synthetic PLS solution composition | | | | | |
|---|---|---|---|---|---|---|---|
| Solution # | pH | Iron (g/L) | Copper (g/L) | Cl (g/L) | Br (g/L) | I (ppm) | Tu (mM) |
| 1 | 1.7 | 1 | 1 | 0 | 0 | 0 | 1 |
| 2 | 1.7 | 1 | 1 | 1 | 0 | 0 | 1 |
| 3 | 1.7 | 1 | 1 | 0 | 1 | 0 | 1 |
| 4 | 1.7 | 1 | 1 | 0 | 0 | 100 | 1 |

The TU equivalent was then determined before and after solvent extraction of the synthetic PLS solutions with Acorga M5910 to form a synthetic raffinate. Elemental analysis was performed using ICP-AES. Thiocarbonyl compounds were analyzed using HPLC. Zinc dust was added to the synthetic PLS and synthetic raffinate prior to analysis as a reducing agent to convert all FDS species back into TU in order to facilitate accurate determination of Tu equivalent recovered.

$$2H^+ + FDS + Zn \rightarrow Zn^{2+} + 2TU$$

Figure 36:
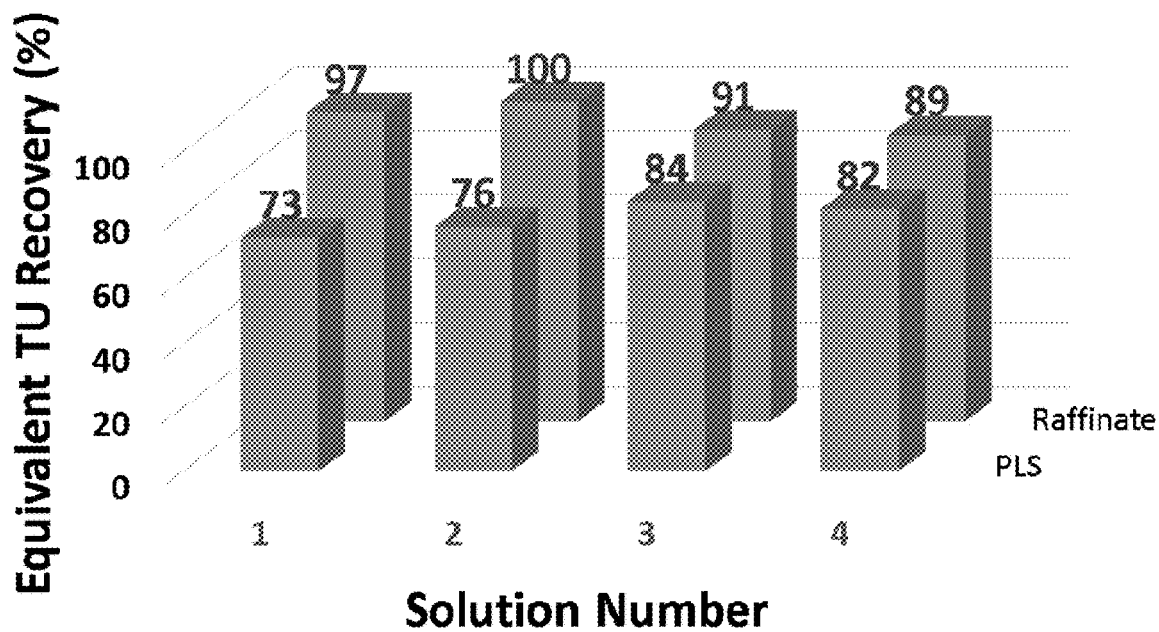
FIG. 36 is a bar diagram showing free Tu equivalents in a simulated PLS and in the resulting simulated raffinate after solvent extraction.

FIG. 36 is a bar diagram showing free Tu equivalents in a simulated PLS and in the resulting simulated raffinate after solvent extraction. The percentage of recovery is calculated based on the input concentration. More Tu was recovered from the synthetic raffinate than from the synthetic PLS, indicated that Tu/FDS species were released copper-complexed Tu/FDS after removal of the copper ions from solution by SX.

Example 10.3

Synthetic solutions with different concentrations of ferric, cupric, chloride, bromide, iodide and ETu were prepared in acidic sulfate media (pH=1.7) to simulate pregnant leaching solutions. Treatments involving halogen species were included to simulate the PLS obtained from different halogen leaching systems. The compositions of the solutions are listed in Table 11.

TABLE 11

| | | Synthetic ETu solution composition | | | |
|---|---|---|---|---|---|
| Solution # | pH | Iron (g/L) | Copper (g/L) | Cl (g/L) | ETU (mM) |
| 1 | 1.7 | 2.2 | 0 | 0 | 2 |
| 2 | 1.7 | 2.2 | 0.5 | 0 | 2 |
| 3 | 1.7 | 2.2 | 1 | 0 | 2 |
| 4 | 1.7 | 2.2 | 2 | 0 | 2 |
| 5 | 1.7 | 2.2 | 4 | 0 | 2 |
| 6 | 1.7 | 2.2 | 2 | 3 | 2 |

The ETu was then determined before and after solvent extraction of the synthetic PLS solutions with Acorga M5910 to form a synthetic raffinate. Elemental analysis was performed using ICP-AES. Thiocarbonyl compounds were analyzed using HPLC.

Figure 37:
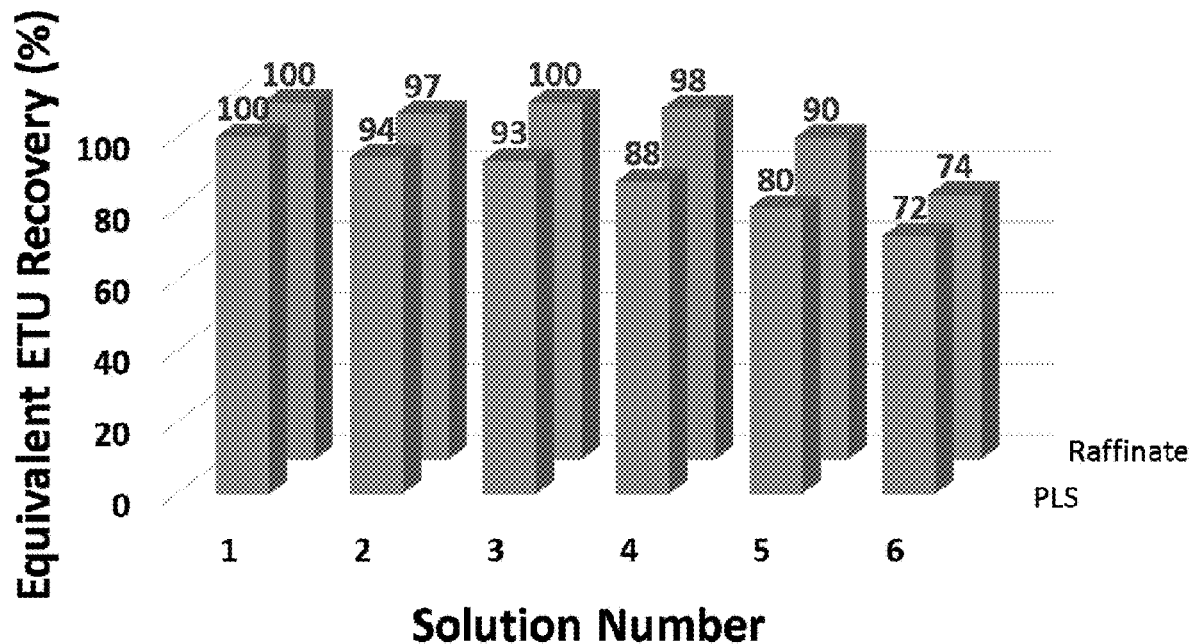
FIG. 37 is a bar diagram showing free ETu in a simulated PLS and in the resulting simulated raffinate after solvent extraction.

FIG. 37 is a bar diagram showing free ETu in a simulated PLS and in the resulting simulated raffinate after solvent extraction. The percentage of recovery is calculated based on the input concentration. More ETu was recovered from the synthetic raffinate than from the synthetic PLS, indicated that ETu species were released copper-complexed ETu after removal of the copper ions from solution by SX.

Example 11. Recovery to Reagents Comprising a Thiocarbonyl Functional Group from Spent Leach Materials Referring to FIGS. 38 and 39, the inventors have presently observed that some of the Tu provided to the material to be leached is sequestered within the materials during the initial stages of leaching. Columns of three different copper ore samples were irrigated with solutions containing Tu at a concentration of 2 mM (152 ppm). The effluent solutions were monitored for equivalent Tu concentration. When this concentration reached 2 mM, the irrigation was discontinued.

Figure 38:
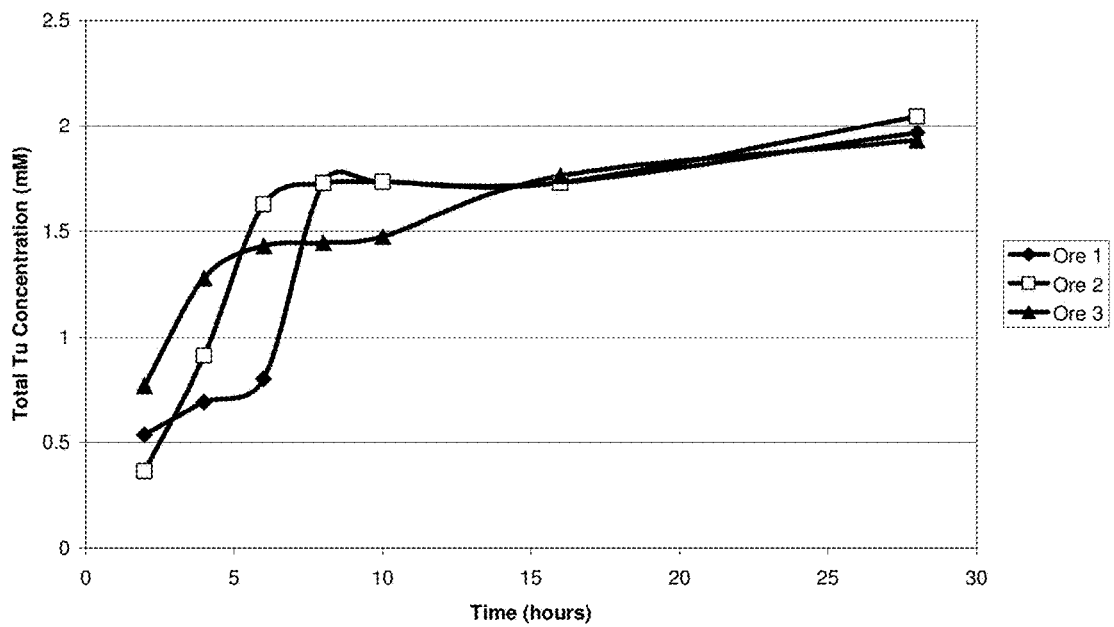
FIG. 38 is a graph of total thiourea concentration in effluent versus time for three ores during irrigation with a solution having an equivalent Tu concentration of 2 mM.
Figure 39:
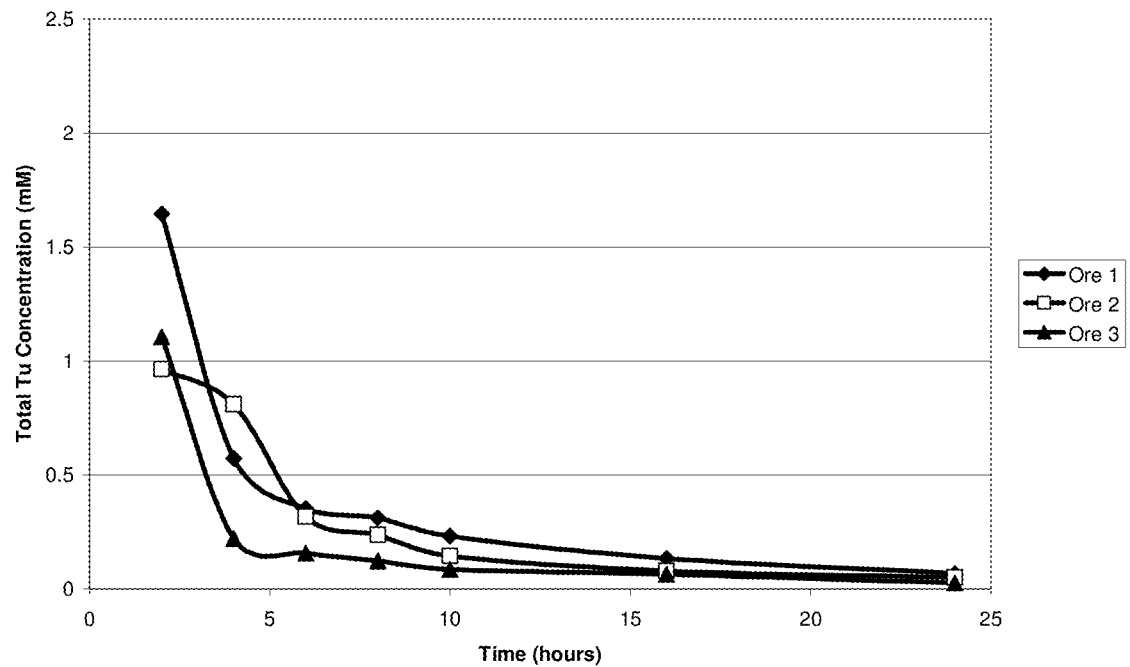
FIG. 39 is a graph of total thiourea equivalent concentration versus time for the three ore samples in FIG. 38 during washing with acidic water.

FIG. 38 shows graphs of the total Tu (i.e. equivalent Tu) concentrations in the effluent solutions. After roughly 28 hours of irrigation, the effluent concentrations were equal to the influent concentrations. FIG. 39 shows graphs of the effluent concentrations during the first of two acidic water (pH 1.8) rinsing stages for each ore sample. After 24 hours, the effluent concentrations of Tu fall to nearly zero in each case. However, as shown in Table 12, a significant amount of Tu remained sequestered in the columns, even after two such acidic washes.

TABLE 12

| Mass of total Tu (g) | Ore 1 | Ore 2 | Ore 3 |
|---|---|---|---|
| Fed during irrigation | 0.6477 | 0.6196 | 0.6151 |
| Left behind after irrigation | 0.1062 | 0.0971 | 0.0920 |
| Left after two acidic rinses | 0.0312 | 0.0311 | 0.0497 |
| Left after cupric rinsing | 0.0054 | 0.0031 | 0.0014 |
| [Cu] in rinsate, ppm | 100 | 500 | 1000 |
| Acidic rinsing only efficiency | 70.6% | 68.0% | 46.0% |
| Acidic + cupric rinsing efficiency | 94.9% | 96.9% | 98.4% |

Figure 40:
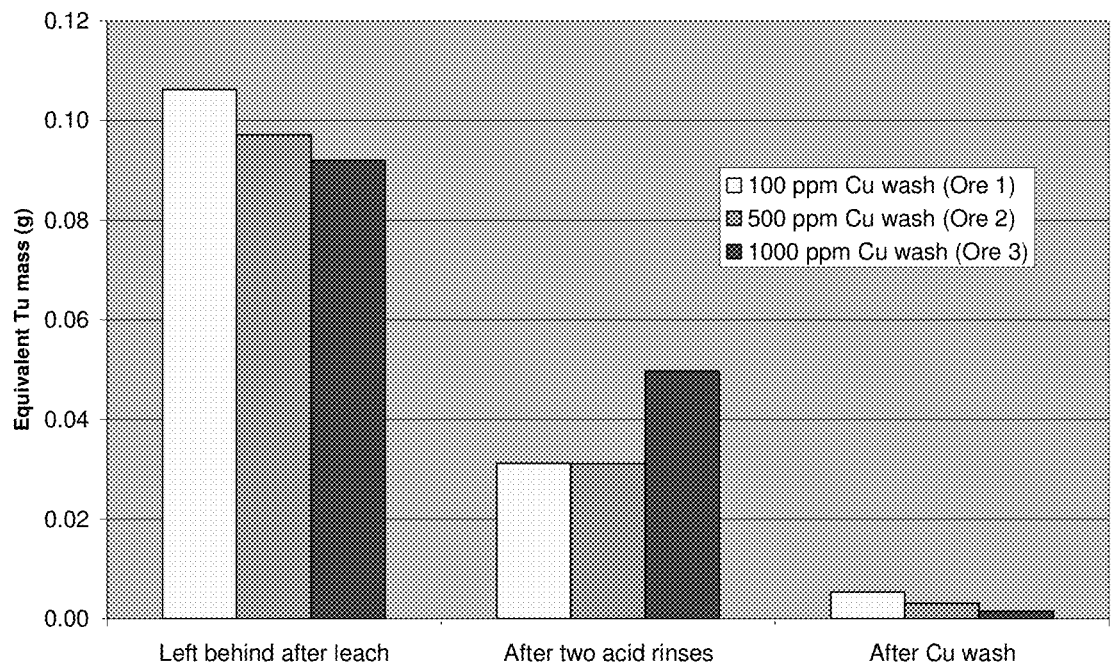
FIG. 40 is a bar diagram showing the amount of Tu equivalent remaining in columns of three ore samples after various treatments.

FIG. 40 is a bar diagram providing the data given in Table 12 in graphical form.

Without wishing to be bound by theory, sequestration may occur through the mechanisms of adsorption to the ore solid surfaces and/or by diffusion into the pore spaces of the ore solids. It would be desirable to recover this Tu from the spent leach material to minimize catalyst costs.

Accordingly, the inventors tested the ability of a dilute solution comprising base metal ions to recover Tu from the leach materials. More particularly, and referring to Table 12 and FIG. 38, rinsing the columns with dilute copper sulfate solutions (e.g. 100 ppm, 500 ppm, or 1000 ppm Cu) proved effective to recover Tu from the columns. Presuming that the interstitial and pore Tu is recovered during the acidic rinsing stages, dilute copper solutions would appear to be effective at recovering Tu adsorbed to ore surfaces. This is especially important given the highly variable performance of acidic rinsing alone with different ores. Furthermore, even though increasing the copper concentration in the rinse solution increased the amount of total Tu recovered, even the lowest concentration of 100 ppm provided significant results.

Indeed, the skilled person will understand that solutions comprising base metal ions other than copper ions may be useful in recovering, from depleted leach materials, catalyst reagents other than Tu that comprise a thiocarbonyl function group. "Depleted" or "spent", as used herein to refer to leach materials, may refer to materials, including ore or concentrate, that contain or contained at least one base metal sulfide that is amenable to leaching with acidic sulfate solutions comprising reagents having a thiocarbonyl functional group, and which has undergone some amount of leaching.

Thus, the skilled person will understand that this disclosure pertains to a general method of recovering a reagent comprising a thiocarbonyl functional group that is sequestered in leach materials from which at least one base metal sulfide has been leached. The method comprises rinsing the leach materials with a wash solution comprising base metal ions to produce a pregnant wash solution (PWS) comprising the reagent.

The skilled person will understand that the methods will work within a broad concentration range of base metal ion. In various embodiments. The concentration of base metal ions in the wash solution is at least 100 ppm, at least 500 ppm, or at least 1000 ppm.

Prior to rinsing the leach materials with the wash solution, the leach materials may be rinsed with an acidic solution. The acidic solution may have a pH of about 1.8.

In various embodiments, the base metal ions include copper ions. In various embodiments, the copper ions include cupric ions.

The PWS comprising base metal ions and recovered reagent may then be added to a lixiviant comprising an acidic sulfate solution for use in recovery of at least one base metal ion from materials comprising at least one base metal sulfide as discussed below and exemplified more thoroughly in PCT patent application no. PCT/CA2016/050444, filed Apr. 15, 2016, and which is incorporated herein by reference.

Alternatively, the PWS can be subjected to solvent extraction steps, as further discussed below to remove the base metal ions before the base metal ion-depleted solution is added to a lixiviant comprising an acidic sulfate solution for use in recovery of at least one base metal ion from materials comprising at least one base metal sulfide as discussed below. Since Tu has a stronger effect on enhancing leaching of base metals from materials containing base metal sulfides, subsequent leaches will be enhanced by the recirculation of a base metal ion-depleted solution with higher free Tu. Accordingly, more particular aspects of this disclosure relate to the addition of a reducing agent to a base metal ion-depleted solution comprising Tu and FDS to bias the equilibrium in favor of Tu prior to addition to a lixiviant.

The skilled person will understand that the recovered reagent may be used to supplement reagents having a thiocarbonyl functional group that are pre-existing in the lixiviant (i.e. have previously been added to the lixiviant). Alternatively, additional reagents having thiocarbonyl functional groups or FDS can be added to the lixiviant after the recovered reagent has been added.

The combination of acidic and cupric washes will allow for maximum recovery, perhaps complete recovery, of Tu from copper ore heaps, thus improving the economics of Tu-catalyzed heap leaching.

While specific embodiments of the invention have been described and illustrated, such embodiments should be considered illustrative of the invention only and not as limiting the invention as construed in accordance with the accompanying claims.

What is claimed is:

1. A method of recovering at least one base metal ion from a material comprising at least one base metal sulfide, the method comprising:
   contacting the material with an acidic solution comprising halide ions and a reagent having a thiocarbonyl functional group, wherein the concentration of the reagent in the acidic solution is in the range of 0.001 mM to 100 mM, to produce a pregnant solution comprising the at least one base metal ion; and
   recovering the at least one base metal ion from the pregnant solution.

2. The method of claim 1, wherein the acidic solution further comprises at least one oxidizing agent.

3. The method of claim 2, wherein the at least one oxidizing agent comprises a source of ferric ions.

4. The method of claim 3, wherein the source of ferric ions comprises ferric sulfate.

5. The method of claim 3, wherein the source of ferric ions comprises ferric ions generated at least in part by bacteria.

6. The method of claim 2, wherein the oxidizing agent comprises an oxidation-reduction potential of less than 900 mV.

7. The method of claim 1, wherein the concentration of the reagent in the acidic solution is sufficient to increase the rate of the at least one base metal ion recovery relative to an acidic solution that does not comprise the reagent.

8. The method of claim 1, wherein the acidic solution comprises a ferric sulfate solution.

9. The method of claim 1 wherein the acidic solution comprises a sulfate solution.

10. The method of claim 1, wherein the acidic solution comprises a ferric solution.

11. The method of claim 1, wherein the acidic solution comprises a ferric media.

12. The method of claim 1, wherein the acidic solution is replaced with a ferrous sulfate solution.

13. The method of claim 12, wherein the ferrous sulfate solution comprises a source of $F^{2+}$ ions that are actively oxidized by $F^{3+}$ by bacteria.

14. The method of claim 1, wherein the thiocarbonyl functional group of the reagent has a sulfur that bears a partial negative charge, bears a negative electrostatic potential surface, and has an empty $\pi^*$-antibonding orbital as its lowest unoccupied molecular orbital.

15. The method of claim 1, wherein the reagent is thiourea (Tu).

16. The method of claim 1, wherein the reagent is thioacetamide (TA).

17. The method of claim 1, wherein the reagent is sodium dimethyldithiocarbamate (SDDC).

18. The method of claim 1, wherein the reagent is ethylene trithiocarbonate (ETC).

19. The method of claim 1, wherein the reagent is thiosemicarbazide (TSCA).

20. The method of claim 1, wherein the reagent is not thiourea.

21. The method of claim 1, wherein the reagent is N-N' substituted thioureas; 2,5-Dithiobimea; Dithiobiuret; Thiosemicarbazide purum; Thiosemicarbazide; Thioacetamide; 2-Methyl-3-thiosemicarbazide; 4-Methyl-3-thiosemicarbazide; Vinylene trithiocarbonate purum; Vinylene trithiocarbonate; 2-Cyanothioacetamide; Ethylene trithiocarbonate; Potassium ethyl xanthogenate; Dimethylthiocarbamoyl chloride; Dimethyldithiocarbamate; Dimethyl trithiocarbonate; N,N-Dimethylthioformamide; 4,4-Dimethyl-3-thiosemicarbazide; 4-Ethyl-3-thiosemicarbazide; O-Isopropylxanthic acid; Ethyl thiooxamate; Ethyl dithioacetate; Pyrazine-2-thiocarboxamide; Diethylthiocarbamoyl chloride; Diethyldithiocarbamate; Tetramethylthiuram monosulfide; Tetramethylthiuram disulfide; Pentafluorophenyl chlorothionoformate; 4-Fluorophenyl chlorothionoformate; O-Phenyl chlorothionoformate; Phenyl chlorodithioformate; 3,4-Difluorothiobenzamide; 2-Bromothiobenzamide; 3-Bromothiobenzamide; 4-Bromothiobenzamide; 4-Chlorothiobenzamide; 4-Fluorothiobenzamide; Thiobenzoic acid; Thiobenzamide; 4-Phenylthiosemicarbazide; O-(p-Tolyl) chlorothionoformate; 4-Bromo-2-methylthiobenzamide; 3-Methoxythiobenzamide; 4-Methoxythiobenzamide; 4-Methylbenzenethioamide; Thioacetanilide; Salicylaldehyde thiosemicarbazone; Indole-3-thiocarboxamide;

S-(Thiobenzoyl)thioglycolic acid; 3-(Acetoxy)thiobenzamide; 4-(Acetoxy)thiobenzamide; Methyl N'-[(e)-(4-chlorophenyl)methylidene]hydrazonothiocarbamate; 3-Ethoxythiobenzamide; 4-Ethylbenzene-1-thiocarboxamide; Tert-butyl 3-[(methylsulfonyl)oxy]-1-azetanecarboxylate; Diethyldithiocarbamic acid; 2-(Phenylcarbonothioylthio) propanoic acid; 2-Hydroxybenzaldehyde; N-ethylthiosemicarbazone; (1R,4R)-1,7,7-Trimethylbicyclo[2.2.1]heptane-2-thione; Tetraethylthiuram disulfide; 4'-Hydroxybiphenyl-4-thiocarboxamide; 4-Biphenylthioamide; Dithizone; 4'-Methylbiphenyl-4-thiocarboxamide; Tetraisopropylthiuram disulfide; Anthracene-9-thiocarboxamide; Phenanthrene-9-thiocarboxamide; Sodium dibenzyldithiocarbamate; 4,4'-Bis(dimethylamino)thiobenzophenone; or any combination thereof.

22. The method of claim 1, wherein the material is an ore.

23. The method of claim 1, wherein the material is a concentrate of the at least one base metal sulfide.

24. The method of claim 1, wherein the concentration of the reagent in the acidic solution is in the range of 0.001 mM to 60 mM.

25. The method of claim 1, wherein the concentration of the reagent in the acidic solution is in the range of 0.001 mM to 30 mM.

26. The method of claim 1, wherein the concentration of the reagent in the acidic solution is in the range of 0.001 mM to 20 mM.

27. The method of claim 1, wherein the concentration of the reagent in the acidic solution is in the range of 0.001 mM to 10 mM.

28. The method of claim 1, wherein the concentration of the reagent in the acidic solution is in the range of 0.001 mM to 5 mM.

29. The method of claim 1, wherein the concentration of the reagent in the acidic solution is in the range of 0.001 mM to 2.0 mM.

30. The method of claim 1, wherein the concentration of the reagent in the acidic solution is in the range of 0.001 mM to 1.0 mM.

31. The method of claim 1, wherein the concentration of the reagent in the acidic solution is in the range of 0.001 mM to 0.2 mM.

32. The method of claim 1, wherein the concentration of the reagent in the acidic solution is in the range of 2 mM to 100 mM.

33. The method of claim 1, wherein the concentration of the reagent in the acidic solution is in the range of 2 mM to 60 mM.

34. The method of claim 1, wherein the concentration of the reagent in the acidic solution is in the range of 2 mM to 30 mM.

35. The method of claim 1, wherein the concentration of the reagent in the acidic solution is in the range of 2 mM to 20 mM.

36. The method of claim 1, wherein the concentration of the reagent in the acidic solution is in the range of 2 mM to 10 mM.

37. The method of claim 1, wherein the concentration of the reagent in the acidic solution is in the range of 2 mM to 5 mM.

38. The method of claim 1, wherein the at least one base metal comprises copper and the at least one base metal sulfide comprises chalcopyrite.

39. The method of claim 1, wherein the at least one base metal comprises copper and the at least one base metal sulfide comprises covellite.

40. The method of claim 1, wherein the at least one base metal comprises copper and the at least one base metal sulfide comprises a copper sulfide of the formula $Cu_xS_y$, wherein the x:y ratio is between 1 and 2.

41. The method of claim 40, wherein the copper sulfide comprises chalcocite.

42. The method of claim 40, wherein the copper sulfide comprises djurleite.

43. The method of claim 40, wherein the copper sulfide comprises digenite.

44. The method of claim 1, wherein the at least one base metal comprises copper and the at least one base metal sulfide comprises bornite.

45. The method of claim 1, wherein the at least one base metal comprises copper and the at least one base metal sulfide comprises enargite.

46. The method of claim 1, wherein the at least one base metal comprises cadmium and the at least one base metal sulfide comprises greenockite.

47. The method of claim 1, wherein the at least one base metal comprises nickel and the at least one base metal sulfide comprises pentlandite.

48. The method of claim 1, wherein the at least one base metal comprises nickel and the at least one base metal sulfide comprises violarite.

49. The method of claim 1, wherein the method comprises a leach.

50. The method of claim 49, wherein the leach comprises a percolation leach.

51. The method of claim 49, wherein the leach comprises a heap leach.

52. The method of claim 49, wherein the leach comprises a vat leach.

53. The method of claim 49, wherein the leach comprises a tank leach.

54. The method of claim 49, wherein the leach comprises a column leach.

55. The method of claim 1, wherein the leach comprises a temperature between 0° C. and 80° C.

56. The method of claim 1, wherein recovering the at least one metal from the pregnant solution comprises solvent extraction and electrowinning.

57. The method of claim 1, further comprising maintaining the operating potential of the acidic solution above 500 mV vs Ag/AgCl.

58. The method of claim 1, wherein the reagent does not complex/precipitate with the base metal ions.

59. The method of claim 1, wherein the halide ions comprise chloride ions.

60. The method of claim 59, wherein the concentration of the chloride ions in the acidic solution is in the range of about 1 g/L to about 200 g/L.

61. The method of claim 59, wherein the concentration of the chloride ions in the acidic solution is in the range of about 1 g/L to about 60 g/L.

62. The method of claim 59, wherein the concentration of the chloride ions in the acidic solution is in the range of about 1 g/L to about 20 g/L.

63. The method of claim 1, wherein the halide ions comprise iodide ions.

64. The method of claim 63, wherein the concentration of the iodide ions in the acidic solution is in the range of about 1 ppm to about 300 ppm.

65. The method of claim 63, wherein the concentration of the iodide ions in the acidic solution is in the range of about 1 ppm to about 100 ppm.

66. The method of claim 63, wherein the concentration of the iodide ions in the acidic solution is in the range of about 1 ppm to about 10 ppm.

67. The method of claim 1, wherein the halide ions comprise bromide ions.

68. The method of claim 67, wherein the concentration of the bromide ions in the acidic solution is in the range of about 1 g/L to about 30 g/L.

69. The method of claim 67, wherein the concentration of the bromide ions in the acidic solution is in the range of about 1 g/L to about 20 g/L.

70. The method of claim 67, wherein the concentration of the bromide ions in the acidic solution is in the range of about 1 g/L to about 10 g/L.

71. The method of claim 1, wherein the reagent is ethylene thiourea (ETu).

* * * * *